(12) United States Patent
Polish et al.

(10) Patent No.: US 11,962,628 B2
(45) Date of Patent: Apr. 16, 2024

(54) REAL-TIME EVENT AND PARTICIPANT COMMUNICATION SYSTEMS

(71) Applicant: Stretch Meetings, Inc., New York, NY (US)

(72) Inventors: Beth Polish, New York, NY (US); Nathaniel Polish, New York, NY (US); Seth Godin, Hastings on Hudson, NY (US); Robert Gehorsam, New York, NY (US)

(73) Assignee: Stretch Meetings, Inc., New York, NY (US)

( * ) Notice: Subject to any disclaimer, the term of this patent is extended or adjusted under 35 U.S.C. 154(b) by 0 days.

(21) Appl. No.: 17/373,724

(22) Filed: Jul. 12, 2021

(65) Prior Publication Data

US 2022/0014571 A1 Jan. 13, 2022

Related U.S. Application Data

(60) Provisional application No. 63/050,498, filed on Jul. 10, 2020.

(51) Int. Cl.
*H04L 12/18* (2006.01)
*G06F 16/23* (2019.01)
(Continued)

(52) U.S. Cl.
CPC ........ *H04L 65/403* (2013.01); *G06F 16/2379* (2019.01); *G06F 21/45* (2013.01);
(Continued)

(58) Field of Classification Search
CPC ............... H04L 65/403; H04L 65/1069; H04L 65/1093; H04L 65/4015; G06F 16/2379;
(Continued)

(56) References Cited

U.S. PATENT DOCUMENTS 6,608,636 B1 * 8/2003 Roseman ................. H04N 7/15
348/E7.083
9,288,166 B2 * 3/2016 Scherpa ................ H04L 51/216
(Continued)

FOREIGN PATENT DOCUMENTS

WO 2019/227062 11/2019

OTHER PUBLICATIONS

International Search Report and Written Opinion for International Application No. PCT/US2021/041344, dated Oct. 26, 2021, 16 pgs.
(Continued)

*Primary Examiner* — David P Zarka
*Assistant Examiner* — Wuji Chen
(74) *Attorney, Agent, or Firm* — Patent Law Works LLP

(57) ABSTRACT

A system and method for improving event and user communications and experiences. (e.g., managing meetings and their participants) is disclosed. By treating events such as meetings and their participants (meeting leaders and invited attendees) as a managed system, the present invention improves the quality and outcomes of meetings and the satisfaction of the participants. The present invention also makes joining of this intelligently-managed system particularly simple for new as well as returning participants, by providing a unique approach to the issues at the pre-meeting, meeting, and post-meeting phases in order to generate scores for the particular meeting, each participant (meeting leader and attendees), and a meeting graph linking the performance of each participant (meeting leader and attendees). This score is used to adjust and predict participant (meeting leader and attendees) behavior in subsequent meetings. The system advantageously is not intrusive into the meeting (and meeting set up), yet is configured to obtain useful changes in behavior in meetings.

20 Claims, 34 Drawing Sheets

(51) Int. Cl.
*G06F 21/45* (2013.01)
*G06N 5/04* (2023.01)
*G06N 20/00* (2019.01)
*G06Q 30/0203* (2023.01)
*H04L 65/1069* (2022.01)
*H04L 65/403* (2022.01)
*G06Q 10/0639* (2023.01)
*G06Q 10/101* (2023.01)
*G06Q 10/105* (2023.01)
*G06Q 10/1093* (2023.01)

(52) U.S. Cl.
CPC .............. *G06N 5/04* (2013.01); *G06N 20/00* (2019.01); *G06Q 30/0203* (2013.01); *H04L 65/1069* (2013.01); *G06Q 10/06398* (2013.01); *G06Q 10/101* (2013.01); *G06Q 10/105* (2013.01); *G06Q 10/1095* (2013.01)

(58) Field of Classification Search
CPC ......... G06F 21/45; G06F 16/252; G06N 5/04; G06N 20/00; G06Q 30/0203; G06Q 10/06398; G06Q 10/101; G06Q 10/105; G06Q 10/1095
See application file for complete search history.

(56) References Cited

U.S. PATENT DOCUMENTS

| | | | | |
|---|---|---|---|---|
| 10,229,164 | B1* | 3/2019 | Hampson | G06F 16/9535 |
| 2011/0107236 | A1* | 5/2011 | Sambhar | H04M 3/563 |
| | | | | 715/753 |
| 2012/0198012 | A1 | 8/2012 | Odell et al. | |
| 2013/0086670 | A1 | 4/2013 | Vangpat et al. | |
| 2013/0096981 | A1* | 4/2013 | Evans | G06Q 30/0252 |
| | | | | 705/7.29 |
| 2013/0297513 | A1 | 11/2013 | Kirillin et al. | |
| 2014/0164511 | A1* | 6/2014 | Williams | G06Q 50/01 |
| | | | | 709/204 |
| 2015/0127628 | A1* | 5/2015 | Rathod | G06Q 30/0251 |
| | | | | 707/710 |
| 2018/0060883 | A1* | 3/2018 | Cheesman | G06Q 30/0201 |
| 2018/0191851 | A1* | 7/2018 | Baughman | H04H 60/33 |
| 2018/0279063 | A1* | 9/2018 | Sun | H04S 7/302 |
| 2018/0295077 | A1* | 10/2018 | Scherpa | H04L 51/216 |
| 2018/0351756 | A1* | 12/2018 | Dave | H04N 21/4788 |
| 2020/0258104 | A1* | 8/2020 | Li | H04L 51/18 |
| 2021/0065223 | A1* | 3/2021 | Blecha-Ward | G06Q 30/0203 |
| 2021/0304450 | A1* | 9/2021 | Smith | G06F 3/011 |
| 2021/0306387 | A1* | 9/2021 | Smith | G02B 27/0172 |
| 2021/0399911 | A1* | 12/2021 | Jorasch | H04L 65/403 |
| 2021/0400142 | A1* | 12/2021 | Jorasch | H04M 3/567 |
| 2022/0138775 | A1* | 5/2022 | Mamdur | G06Q 30/0201 |
| | | | | 705/7.29 |

OTHER PUBLICATIONS

International Search Report and Written Opinion for International Application No. PCT/US2021/041145, dated Oct. 13, 2021, 15 pgs.

* cited by examiner

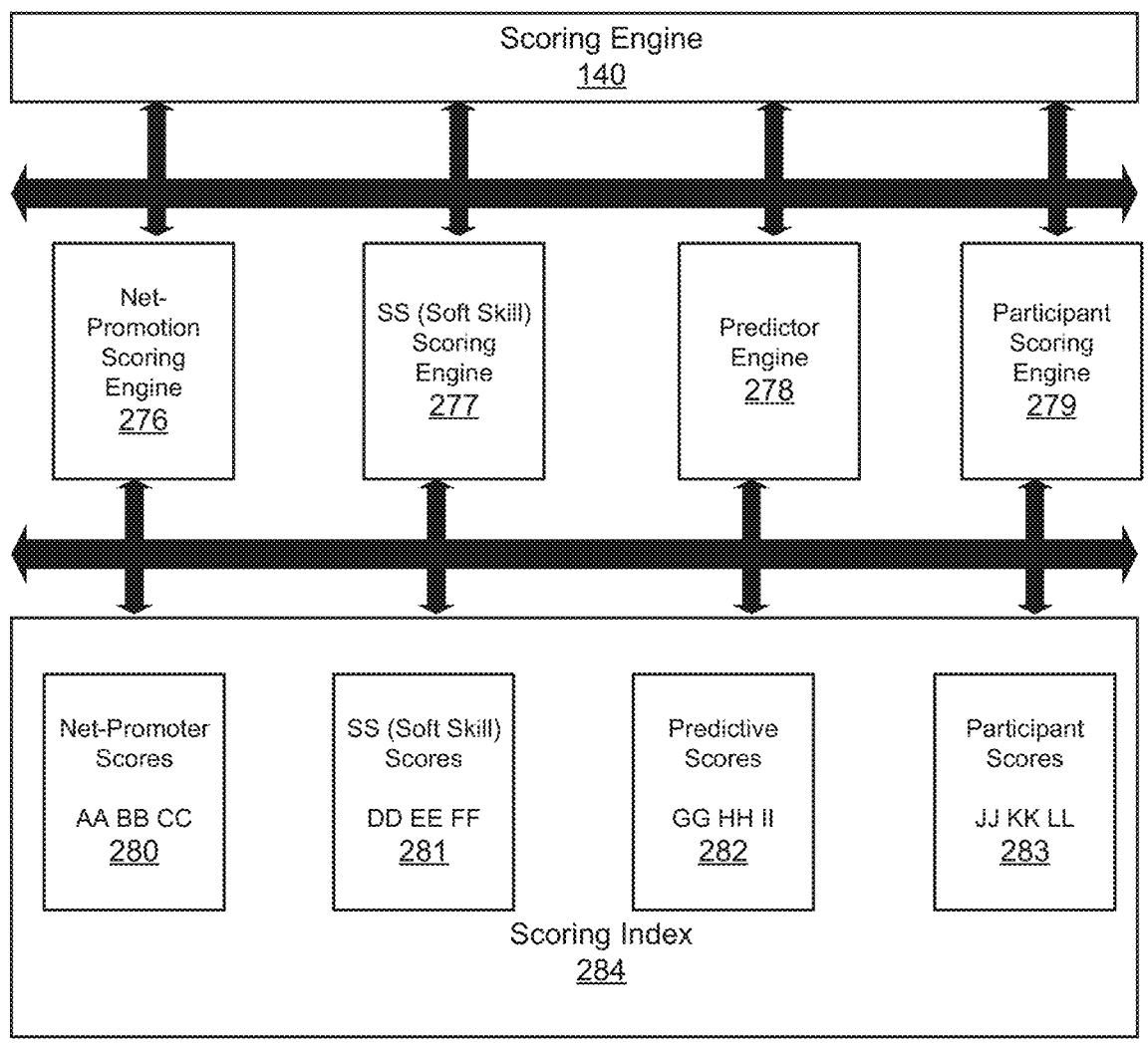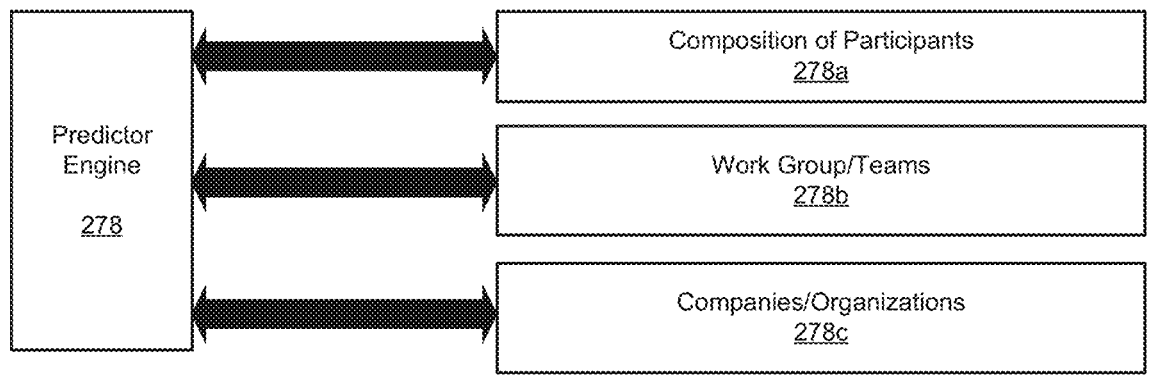
Figure 2B

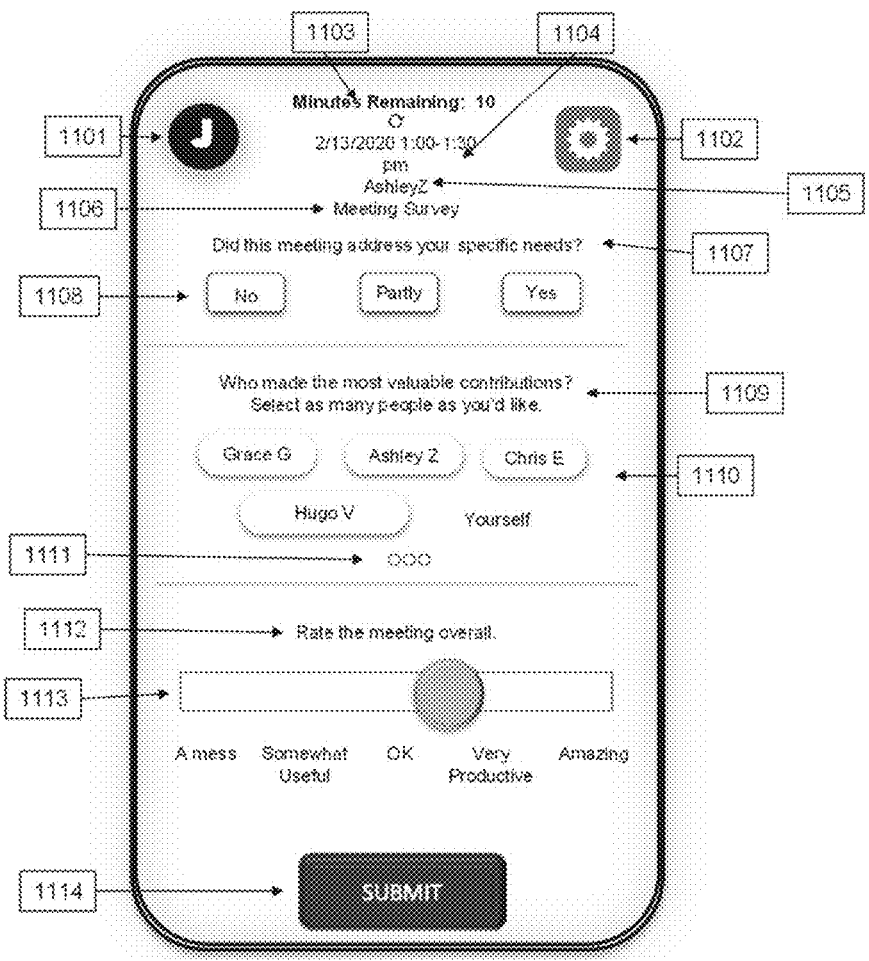

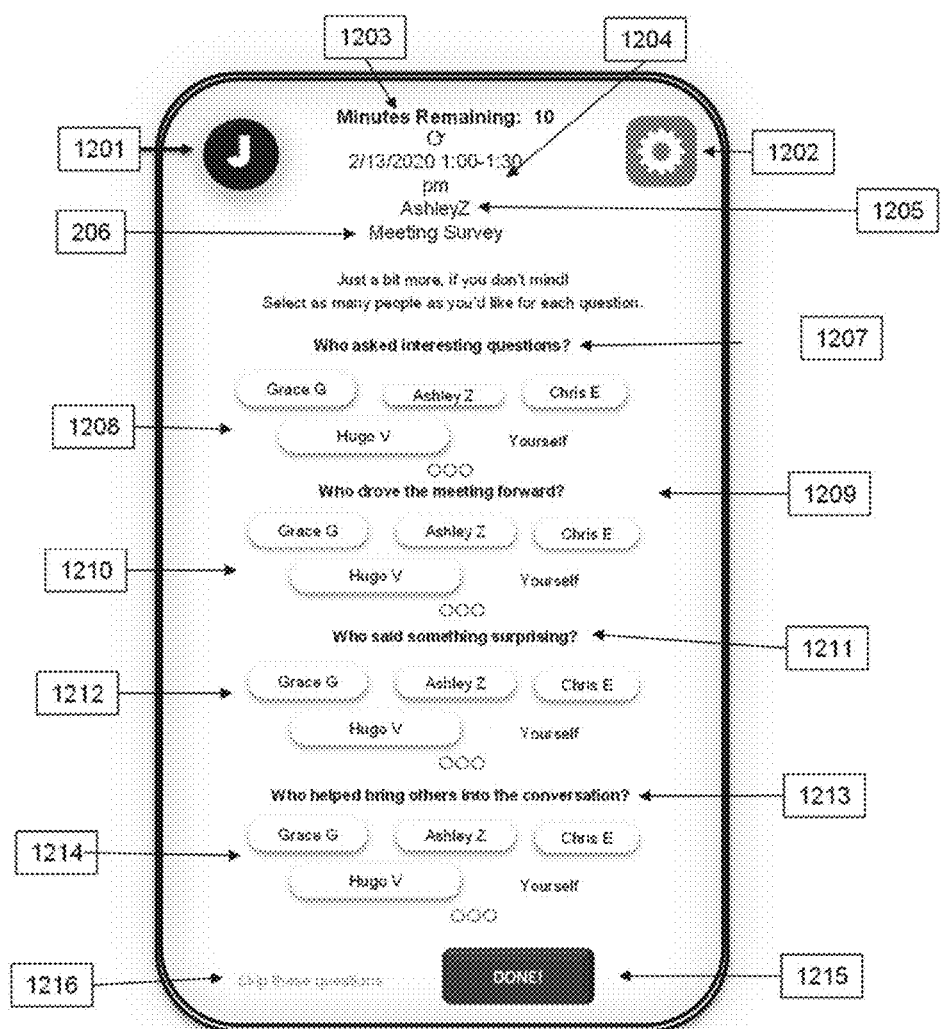
FIGURE 12: Meeting Survey Part 2

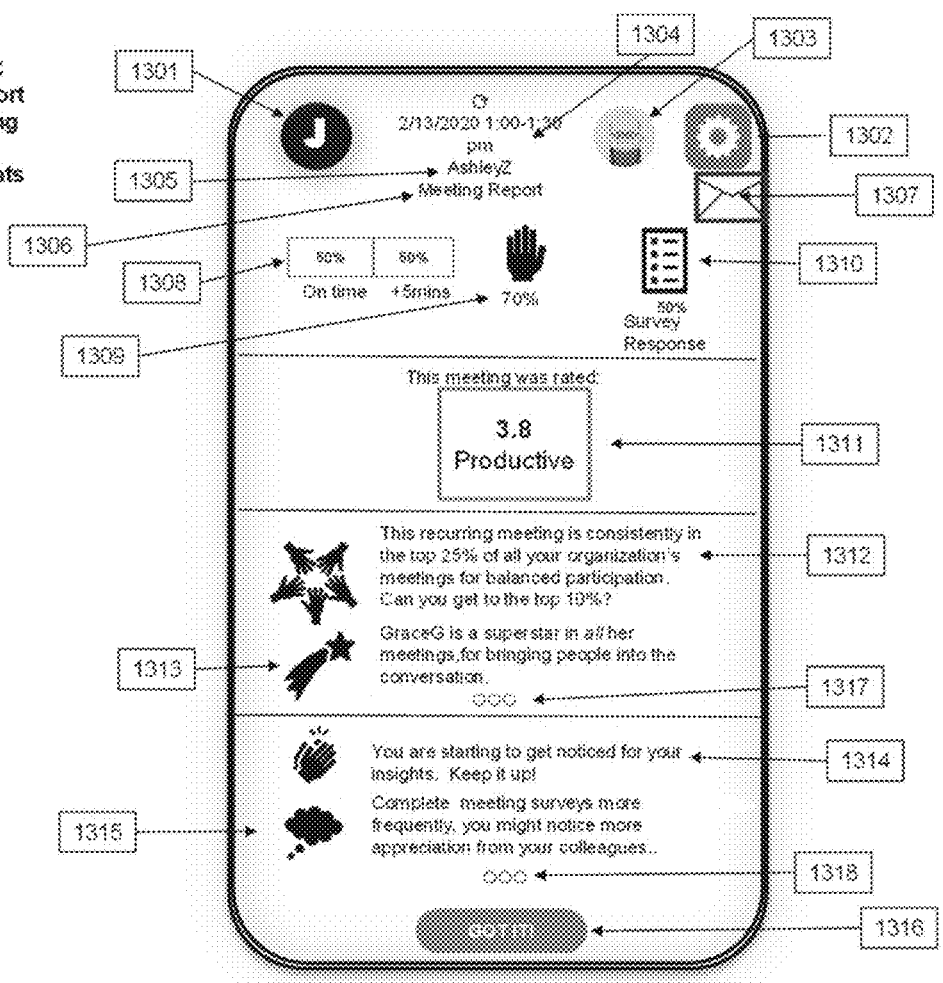

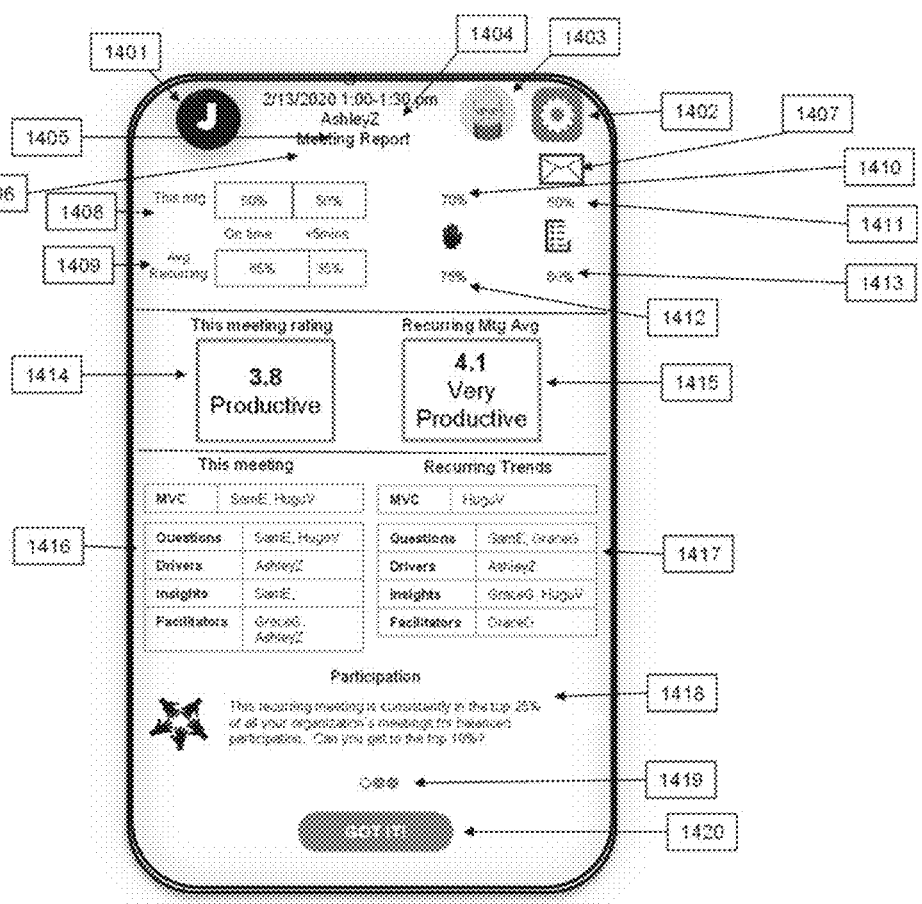

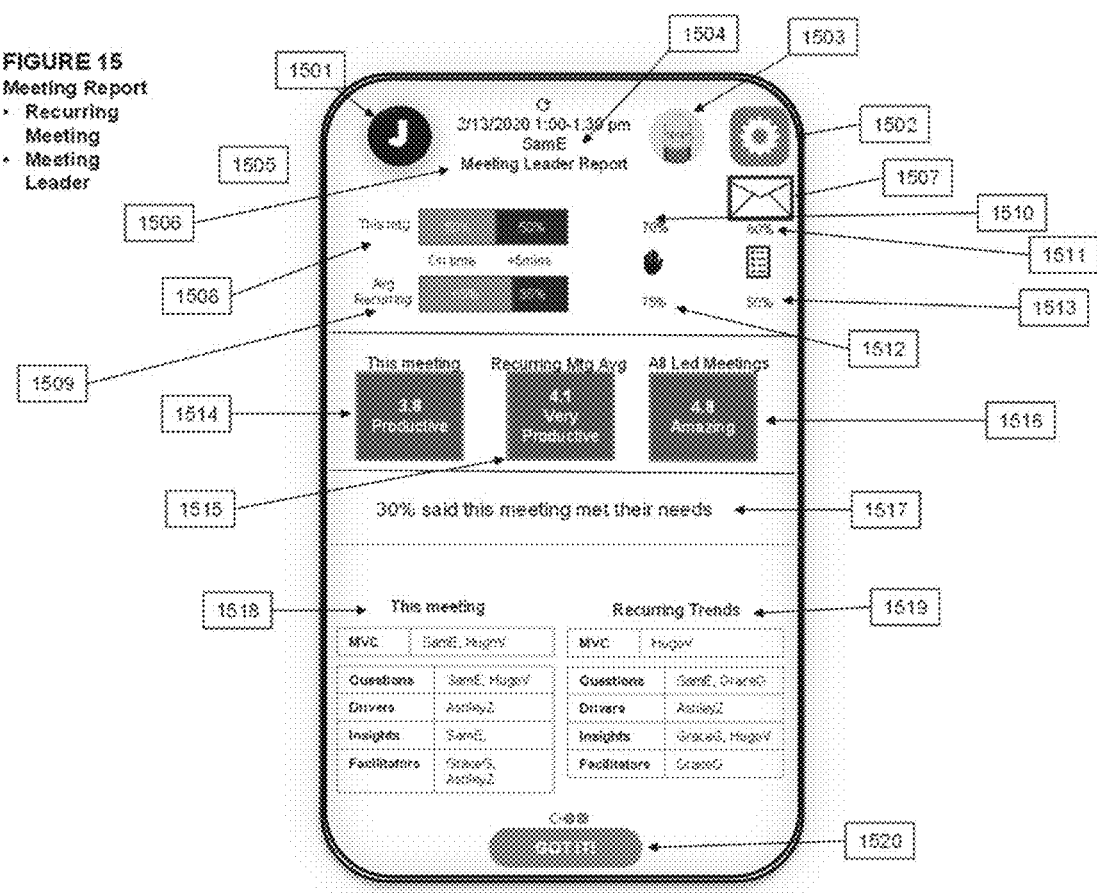

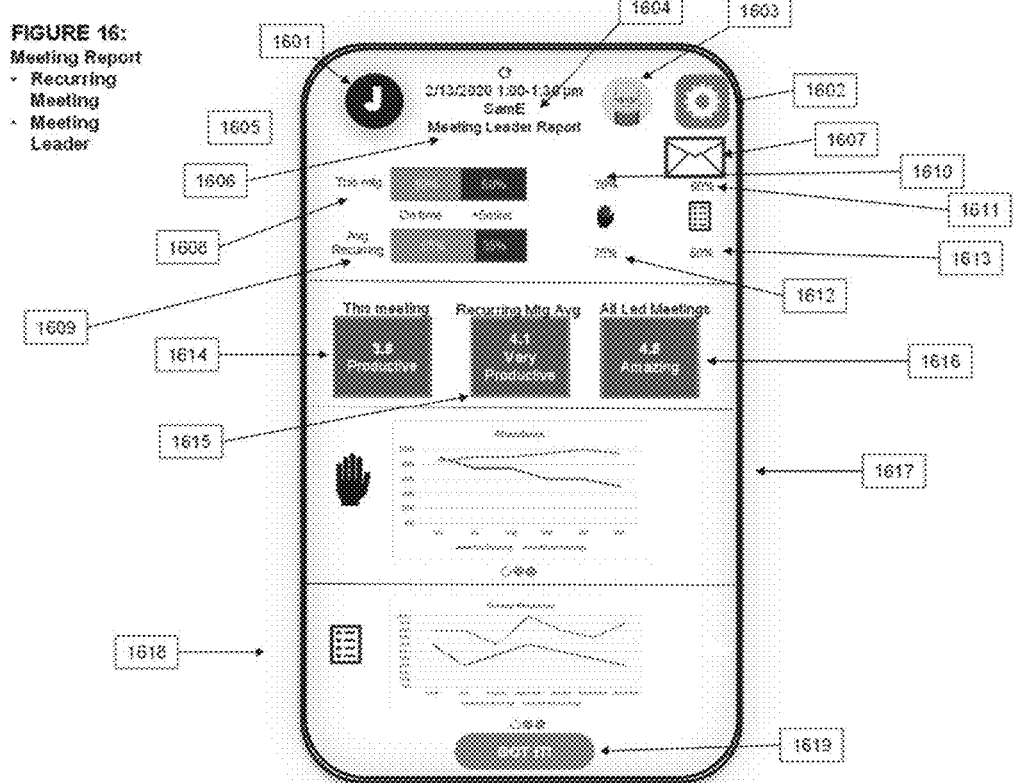

User Profile –
Overview

User Profile –
Another View

User Profile
Meeting Leader

User Profile --
Featured
Leaderboard

User Profile – Key Network Insight (Current Network and Connections)

User Profile –
Your Meeting
History

REAL-TIME EVENT AND PARTICIPANT COMMUNICATION SYSTEMS

RELATED APPLICATION

This application claims the benefit of U.S. Provisional Patent Application No. 63/050,498, titled "System and Method for Improving Real-Time Event and Participant Communications and Experiences," filed on Jul. 10, 2020, the entirety of which is incorporated by reference herein for all purposes.

BACKGROUND

1. Field of the Invention

The present invention relates generally to the field of communication systems, for example, video-conferencing, teleconferencing, and/or in-person or hybrid events, meetings, or team experiences for one-one-one, group or team communications. In particular, the present invention is directed to creating and executing intelligent actions via an event-driven platform that manages and improves encounters among participants, for example, leaders/hosts, invitees, and attendees, while generating dynamic communication metrics and data on the participants and events. The event-driven platform facilitates meetings and connections among remote participants and improves their overall experience by implementing controls, coordinating tasks in different phases, and providing effective and timed interface actions.

2. Description of the Related Art

As one example of an event in communication systems, meetings are often managed as single, isolated events with two or more participants, even if recurring over time. Although used extensively by many, there are many problems that are experienced. One key problem in managing events or meetings is that they are typically handled as one-time, single events or sessions among people who may not have met before. Many efforts have been made to facilitate the manner in which meetings are created or called. Efforts have also been made to facilitate collaboration by participants to work together during a meeting. Attempts are made to gather data to determine how the meeting fared. Yet, problems still exist.

Over the years, various attempts have been made to manage the existing drawbacks in the different phases of meetings and events, for instance, before, during, and after a meeting or event. The pre-meeting phase has organizational drawbacks. For example, agendas are used sporadically. Meeting leaders sometimes distribute agendas and sometimes they do not. Many leaders wait until immediately before a meeting to send an agenda, allowing little time for participants to review the agenda, much less, to suggest changes in advance of the meeting. Some organizations may require that agendas are distributed in advance, with enough time for others to participate. Some existing software platforms even provide assistances with creating a meeting agenda and facilitating collaboration on that agenda. Yet, these platforms have limitations because of inconsistent use and enforcement and the negative impact of social norms. Their structures are often inflexible, forcing organizations to use the platform's preferred agenda format with a uniform approach that applies equally to all organizations, with no existing capability to customize the approach and content. For example, there is no way to either prioritize topics or indicate a time frame to address each. Meeting leaders must determine and create their own meeting agendas to prioritize their topics for the meeting and indicate a time limit for each topic, which many fail to do. Even in scenarios where the meeting leaders create an agenda, they fail to circulate them in advance to solicit constructive feedback.

Some existing software platforms have developed systems with interactive meeting agendas that may be changed during the meeting. These platforms are also limited and therefore, not used consistently. They fail to assist meeting leaders with determining the right order for agenda items or allocating time to each item. Such systems are adopted and used subject to social norms within the meeting leader's organization.

Yet, in today's complex business environment, different types of meetings or events require different management and approaches. For example, there are many types of meetings in every organization, each directed to one or more distinct purposes. Typically, there are meetings for a status update, a brainstorming session, decision-making, planning, or review. Each type of meeting requires a different type of agenda, participation, outcome, and flow (e.g., how a meeting is run). In different scenarios, some meeting leaders declare the nature and purpose (e.g., type of meeting) and some do not. Meeting participants often participate without a clear understanding of the type of meeting, how the meeting will be run as a result, or if the meeting is even necessary.

Meeting leaders and participants often attempt to solve these drawbacks in existing platforms, by spending their own time, either reading books and articles that inform best practices, attending workshops or seminars that promise some form of self-improvement to enhance their skills. Some existing platforms offer software that guides meeting leaders on different types of meeting, by offering templates and content for the different types of meetings. These approaches are sporadically used and often use a uniform approach within a category of meeting type. They are adopted and used subject to social norms within a particular meeting leader's organization.

Different types of meetings require different skill sets, for example, in ways of collaborating and work experience of meeting participants. In the different types of meetings, such as status update, brainstorming, decision-making, planning and review, each type typically requires a different complement of participants. For example, some participants are adept at decision-making but not the best at brainstorming ideas. Some meeting leaders have access to some information they need to enable them to assemble the right group of participants for their meeting to meet their goals and objectives. Others are not able to. Some, in the absence of real and/or unbiased information about potential participants, feel pressure to include people that they might not otherwise select.

Some existing platforms offer software that provides professional information on people at work and their careers. Other platforms offer personality and soft-skill assessments, which are becoming increasingly desirable. These platforms are limited because the information shared is not vetted for accuracy. Furthermore, the personality and soft-skill assessments are take in an instance in time, with few mechanisms that account or track growth and changes in the person being evaluated. Nor do these platforms provide behavioral information or data on the participants, which is valuable.

These platforms lack mechanisms to accomplish clear outcomes. For instance, with respect to desired outcomes for a meeting or event, many meeting leaders do not clearly articulate the goals of a meeting to the meeting participants in advance of the meeting. Stating the topics in an agenda (should one be circulated) as content does not inform on the goals or desired outcomes for the meeting. Furthermore, different types of meetings imply different types of outcomes. For example, decision-making meetings imply subsequent interface actions that specific items will be decided on or voted on by the participants. The current interface methodologies do not provide any interface actions that facilitate subsequent actions by participant based on the meeting type. As another example, brainstorming meetings imply that solutions will be uncovered and next steps identified during the meeting. As yet another example, presentation meetings imply that the attendees will learn new information and why such information is relevant to the participants. In many scenarios, the meeting leaders are not clear themselves about what they hope to achieve during the meeting. "Calling" or "scheduling" a meeting in current platforms does not require a meeting leader to indicates objectives. A significant disadvantage lies in the fact that these types of meetings often result in significant lost productivity and diminished team morale.

Different existing approaches attempt to solve this problem. Some meeting participants will push the meeting leader for clear "action items" or "next steps" or "decisions" that are to come out of the meeting. Many meeting leaders push back as they often are not clear themselves on what the purpose of the meeting is. Some existing software platforms offer software that is designed to automatically generate action items that have been agreed upon, next steps and/or decisions. These software approaches have significant limitations. They are not used consistently. Moreover, they rely on the software to accurately understand what was discussed and agreed to in the meeting. Their adoption and use are also subject to social norms within the meeting leader's organization.

Yet, another drawback is that participants do not receive preparation materials in advance. With respect to materials for the meeting, many leaders distribute meeting materials that will be used or necessary for the meeting. In many instances, they do not. If they do distribute materials in advance, it if often immediately before the meeting, giving participants limited or no time to review in advance of the meetings, much less, be able to suggest changes or add additional materials. Some organizations attempt to enforce guidelines that materials must be distributed to allow sufficient amount of time in advance for participants to prepare properly for the meeting. Others assume no one has read the materials in advance and therefore, allocate time at the beginning of the meeting for all participants to read the materials while together. Some software platforms have developed application software to aggregate or store meeting materials in a single place. These approaches have drawbacks as these actions are inconsistent and subject to social norms. The drawbacks are exacerbated by the increasing use of different and sometimes incompatible methods and software systems, even within organizations. Moreover, there is no way to track if participants have actually read the materials provided in advance.

A disadvantage in existing software platforms is that participants and others who prepare meeting materials are not given clear instructions. When the creation and submission of meeting materials is the responsibility of meeting participants (either new materials specifically created for the meeting or existing materials they already have), meeting leaders sometimes let meeting participants know in advance that they are responsible for meeting materials. Many meeting leaders communicate this sufficiently in advance so the responsible parties have the time to prepare and submit them, while others do not. The challenge of effective preparation and in-advance distribution of meeting materials manifests in several ways. For example, when meeting leaders request that meeting materials are prepared and/or submitted by meeting participants, they may make it clear to the responsible individual(s) why the materials are needed and how they will be used. This aids in the quality of the materials. Others may not. And meeting leaders may be inconsistent from meeting to meeting—for some meetings they let meeting participants know, while for other meetings they do not. In other scenarios, some meeting leaders are clear what format the materials should be prepared and submitted in (such as Word, PowerPoint, Keynote, Excel, Portable Document Format (e.g., PDF by Adobe Acrobat or like application software and web services to view, create manipulate, print, and manage files in a portable document format. Yet, many meeting leaders are not. Often, they are submitted in incompatible formats. And meeting leaders may be inconsistent from meeting to meeting; for some meetings they let meeting participants know, while for other meetings they do not. As a result, in some cases meeting participants may receive materials in formats incompatible with their own software. In other instances, some meeting leaders make it clear how far in advance the requested meeting materials are needed so they can be modified if necessary and circulated to meeting participants with enough time for review prior to the meeting. Many meeting leaders do not. And meeting leaders may be inconsistent from meeting to meeting. For some meetings they let meeting participants know, while for other meetings they do not. In still other instances, some meeting leaders make it clear where and by what means and by whom the material should be sent (i.e., the meeting participant sending it to the meeting leader vs. to the other participants directly). Other meeting leaders do not. And meeting leaders may be inconsistent from meeting to meeting—for some meetings they let meeting participants know, while for other meetings they do not.

In yet other scenarios, some organizations and/or teams and/or leaders attempt to make clear why meeting materials are needed, when they are needed by, what format they are to be submitted in, how they should be submitted, and how they should be accessed. Companies have developed application software platforms to address these challenges, for example, Dropbox, Google Drive, Soapbox, Lucid Meetings, and Parabol, Asana. Yet, all of these existing approaches have limitations. They cannot be easily enforced nor are they consistent and they are subject to social norms within and across teams and organizations. In modern organizations, meeting management is typically left to the discretion of the meeting organizer. These problems are exacerbated by the increasing use of different and sometimes incompatible methods and software systems even within organizations. All of these issues are even further exacerbated when meetings include participants from outside the organization or a business different unit, which is often the case.

It is common for agendas to be sent via inconsistent methods and in inconsistent formats and it is hard to keep track of them. If an agenda is created, many meeting leaders will circulate it via different and inconsistent methods. For example, it may be sent through email as an attached document, or embedded in the email message itself, or in some instances, through some other digital method. Meeting leaders will often (even inadvertently) vary from meetingto-meeting which method they use. This makes it difficult for meeting participants to know where to look for a meeting agenda, with the result that some participants may not be properly prepared for the meeting. Some organizations set "standards" for how they want meeting agendas circulated but these are not enforced and subject to the social norms of the team and organization, and the preferences of meeting leaders and management. Some companies (e.g., Soapbox, Stratsys, Lucid Meetings) offer software that standardizes agenda, keeps track of them during meetings, rolls over to the next meeting items not covered, "integrates" into some calendar systems, and allows for adding attachments. All these existing solutions have limitations in terms of enforcement and are subject to the social norms of the organization, teams, and preferences of individual meeting leaders and managers.

These existing problems are exacerbated by the increasing use of different and sometimes incompatible methods and software systems even within organizations. And are even further exacerbated when meetings include participants from outside the organization and business unit.

Other problems exist with meeting invites that convey inconsistent information about the meeting. When meeting leaders "call" or "schedule" a meeting, many of them will include in the meeting invitation, information about the meeting in addition to the day, time, and location (either in-person, virtual, or hybrid—conference call or video call). Such other information may include the reason for the meeting, agenda, desired outcomes, responsibilities, or required materials. Many meeting leaders do not include additional information, with the result that some participants may not be properly prepared for the meeting. Some companies have adopted new software solutions that make it possible for meeting leaders to include notes about the meeting in the meeting invitation (e.g., WebEx and Fuze). But these features and applications are inconsistently used and do not encourage the meeting leader to convey critical information about the meeting. In addition, some existing solutions do not allow a meeting leader to attach documents such as agenda, participant list, outcomes, or informational materials to the invitation itself. All these existing solutions have limitations in terms of enforcement and are subject to the social norms of the organization, teams, and preferences of individual meeting leaders and managers.

Meeting information including the agenda, other materials, etc., are seldom collected in a single place. With respect to the materials associated with a meeting (such as agenda, informational materials), many meeting leaders circulate them at different times and in different ways. For example, they might send the agenda in one email and then later send other materials in a series of subsequent emails. Some meeting leaders will try to "aggregate" the meeting materials in a single digital location making it easy for meeting participants to access. Many meeting leaders do not. And many meeting leaders are inconsistent from meeting to meeting. In some instances, some companies set "standards" or "procedures" such as using enterprise software (e.g., Google Drive, Microsoft SharePoint, Cisco WebEx, Dropbox, Lucid Meetings) for this purpose but their adoption and use varies greatly. Some meeting leaders use cloud-based solutions. Some do not. Some meeting participants conform to the meeting leader's solution, if set up, many do not. All these existing solutions have limitations in terms of enforcement and consistency and are subject to individual preferences and the social norms of the organization and teams.

In many instances, meeting participants don't know why they are invited or what they are responsible for. With respect to who is invited to meetings, many meeting leaders make clear who they want to attend the meeting and what is expected of each of them (such as materials, knowledge, opinion, participation). Many meeting leaders do not. Many meeting leaders are inconsistent from meeting to meeting. Some companies attempt to put procedures and expectations in place with regard to meetings and meeting participation. These are generally communicated verbally, in handbooks, performance reviews, memos. But these are not enforceable, nor are they consistently applied, which allows meeting leaders to make their own inconsistent choices.

Furthermore, scheduling meetings is challenging. With respect to scheduling meetings, many meeting leaders try to schedule them on their own. Many meeting leaders ask other people to schedule the meetings for them. In either instance, the person scheduling the meeting must figure out what time works for all the people who will be participating in the meeting and if that is not possible which time works best for the appropriate subset of meeting participants (in other words, whose schedule to accommodate and whose it is not important to.) Existing software solutions, either enterprise ones offered by the companies (e.g., WebEx, Fuze) or outside ones (e.g., Calendly, Doodle) used by individual meeting leaders who work within a company or outside, try to help meeting leaders be more efficient coordinating the calendars of the meeting participants. None of these approaches solves the problem of figuring out which meeting participants' schedules must be accommodated and which ones are not.

In many instances, people invited to meetings often don't RSVP. With respect to scheduling meetings, many people who are invited to meetings RSVP promptly, many do not. And if they do, it might be late or at the last minute or they may RSVP to overlapping meetings (in other words, double booking their time). In either instance, the person scheduling the meeting has to prepare for the meeting not knowing who of the people they have invited will attend. Nor is there any way to communicate the way in which users will participate, whether in person, by phone or video. This makes it difficult to properly plan for and manage a meeting. Many meeting leaders try to compensate for this by sending reminders to those that have not sent a RSVP. Some companies (e.g., Outlook and Google Calendar) offer software that puts all meetings that either have not received a RSVP to or that have received a RSVP "yes" or "maybe" on their calendar as a reminder. Yet, neither of these approaches solves the problem of assuring that meeting invitees will respond punctually. And for those meeting invitees that double book their meetings, some software lets meeting leaders see that the invitee has another meeting scheduled for the same time. This approach doesn't stop a person from double booking. Further, these existing solutions have limitations in terms of enforcement and consistency and are subject to individual preferences and the social norms of the organization and teams.

Often, people come to meetings who were not originally invited. With respect to the participants who attends a meeting, some meetings are attended only by the people who are officially invited on the meeting invite. Many other meetings include people who were not on the meeting invite and whose attendance is a surprise to other attendees. This often confuses attendees about why they are at the meeting, or what the purpose of the meeting is, and can have a negative impact on participation. Many meeting leaders navigate such situations by making introductions at the start of a meeting as a way to make sure that the participants "know" each other. This approach is not consistently used.

When it is used, it often results in a large percentage of the meeting being focused on introductions rather than to accomplish the reason for the meeting in the first place. The frequency of such situations depends upon the ramifications subject to the individual preferences and the social norms of the organization and teams.

To date, there are no existing software solutions that avoid the challenge of people attending meetings uninvited via a meeting invite; appearing as a surprise to the "official" meeting invitees.

Even during the meeting, in many situations, participants arrive late, despite knowing the real start time. While many meeting participants arrive at the meeting at the scheduled time, many participants arrive late, including meeting leaders who may arrive late for their own meetings. In some meetings, the meeting cannot begin until at least certain or all of the participants have arrived. Meetings where one or more participants arrive late result in lost productivity, workplace friction, and reduced morale.

Companies currently offer software (e.g., Google Calendar, Microsoft Outlook, Lucid Meetings) to solve the problem of tardiness, with features including alerts (for example, tied to calendars and meeting invitations) to remind meeting leaders and meeting participants of the scheduled start time of the meeting. These features have limitations, including that such alerts are easily ignored or overlooked. Moreover, they are not easily enforceable. And, they do not communicate the late status to other meeting participants, and are subject to the social norms of the organization, teams, and of meeting leaders and management.

In many instances, meetings start late, often after the scheduled start time. For instance, many meetings start as scheduled, but many meetings do not. And while many meeting leaders will adhere to the scheduled start time even though some participants have not yet arrived, many meeting leaders will delay starting the meeting until all participants are present. This can result in uncertainty about the meeting's actual start time as opposed to the scheduled start time. In some instances, some meeting participants arrive late because they do not believe that meeting will start as scheduled.

In the case of virtual meetings (i.e., conference calls and video meetings), there are companies that offer software (e.g., Google Meet, Microsoft Teams, Zoom and Cisco WebEx) to help meeting leaders regulate the start of meetings by, for example, keeping all meeting participants on hold when they call in until the meeting leader "arrives" for the meeting, or until the meeting leader indicates that the meeting is to start. These approaches have limitations, both inherently, such as creating de facto delays in starting the meeting and degrading the meeting experience for some participants, and also due to inconsistent use of the software, and varying social norms of the organization, teams, and meeting leaders and management.

In some instances, participants come unprepared. Many meeting participants may come prepared for the meeting, while others many not. In addition, many participants do not bring the materials specified as being necessary to the meeting. Companies offer software that enables meeting leaders to remind meeting participants to review meeting materials (for example by an email message or by adding a note to the calendar reminder of the meeting, or by resending links to the materials or the materials themselves). These approaches have limitations including that they are cumbersome to use and are often used inconsistently because of the varying social norms of the organization, teams, and meeting leaders and managers. Some firms even go as far as forcing participants to review the materials in the first few minutes of a meeting. This is perhaps an indication of the pervasiveness of this problem.

Participants don't know why they were invited or what role they are expected to play. Although many meeting participants know why they were invited to the meeting and what the expectations are for their participation, some participants do not. And if they are told in advance, it might be right before the meeting with limited or no time to prepare in advance of the meeting. And with limited time, if any, to suggest changes to their role or participation. This challenge is further exacerbated when some expected meeting participants don't attend and others attend unexpectedly.

In addition, participants don't often know each other. Although many meeting participants will know the other meeting participants and their purpose in the meeting, some meeting participants do not. Nor do they know any information about each participant in advance of the meeting, therefore, unable to set or manage expectations. Existing systems such as Crystal Knows and LinkedIn often provide unreliable information that is often out of date or taken out of context. In particular, the system Crystal Knows attempts to fit users into a template or pre-determined box, resulting in disparate ideas or narrative presented in similar ways. And if they don't, they don't have time in advance to adjust either their participation or preparation so they can make the best contribution to the meeting and get the most out of the meeting. Many meeting leaders will do introductions at the start of the meeting as a way to make sure that the participants "know" each other. This technique is inconsistently used and when it is used often results in a large percentage of the meeting being focused on introductions rather than on the reason that the meeting was put together in the first place.

Participants don't know in advance who has been invited to the meeting. Participants are surprised by who is at the meeting. While for many meetings only those who are on the meeting invitation (which everyone else on the invitation can see) go to the meeting. Many meetings include people who were not originally invited and whose attendance is a surprise to the other participants. Many meeting leaders will do introductions at the start of the meeting as a way to make sure that the participants "know" each other. This technique is inconsistently used and when it is used often results in a large percentage of the meeting being focused on introductions rather than on the reason that the meeting was put together in the first place.

In some instances, divergent voices are suppressed. In many meetings different and even directly opposing opinions are expressed. In many meetings they are not. Many meeting participants offer their opinion regardless of how popular they believe it will be, but many meeting participants will not offer their opinions because they think those opinions are contrary to those of the meeting leader or to the meeting consensus, or for other reasons. Many meeting leaders do not share early in the meeting their opinion about the topics being discussed. Many meeting leaders do make their opinions known early in the meeting. When this happens, divergent opinions may not be heard or considered. Existing software platforms (e.g., Meeting Sift, Poll Everywhere, Zoom, and Cisco WebEx) solve the lack of diverse and divergent opinions in meetings by offering such features as interactive polling during the meeting. These approaches have limitations due to inconsistent use and social norms of the organization, teams, and meeting leaders and management.

In some scenarios, one or more participants dominate the conversation. Many meetings end up being dominated by one or a few people. Some meetings are ones where everyone participates. Some meeting leaders are successful moderating their meetings to get everyone to participate and limit some participants from taking over the meeting. Many meeting leaders do not moderate their meetings in a way that facilitates balanced participation by all participants. Software platforms offer digital solutions (e.g., Lucid Meetings or Meeting Sift) or hybrid software solutions to solve the problem of a subset of meeting participants dominating the meeting and/or the lack of participation of many of the meeting participants (either hiring a person to moderate the meeting in-person or where there is a person remotely moderating the meeting using lots of screens—both require people real-time to go alongside software technology). These approaches have limitations due to inconsistent use and social norms of the organization, teams, and meeting leaders and management.

In some meeting scenarios, some participants don't contribute. Although many meetings have all meeting participants speaking and contributing, many meetings do not. Some meeting leaders are successful at moderating their meetings to get everyone to participate. Many meeting leaders do not moderate their meetings in a way that includes meeting participation by all meeting participants. Companies offer hybrid software solutions (described above) to solve the problem of a subset of meeting participants dominating the meeting and/or the lack of participation of many of the meeting participants (e.g., Meeting Sift). These approaches have significant limitations due to inconsistent use and social norms of the organization, teams, and meeting leaders and management.

Another drawback is that the agenda is not adhered to. Many meetings actually follow an agreed-upon agenda. Many meetings do not follow the agenda, if there is one. Many meetings decide on the agenda only at the start of the meeting. Many meetings change the pre-circulated agenda during the meeting. Adding or changing an agenda leaves no time for preparation and/or may make the preparation not worthwhile. Many meetings have a time allocated to each agenda item. Many meetings do not estimate how much time is planned for each agenda item. Many meeting leaders stick to the meeting agenda and schedule. Many meeting leaders do not, leaving some agenda items not covered before the end of the meeting.

Some software platforms offer software that allows meeting agendas to be interactive (collaborated on and/or changed in real-time) or created within the meeting (e.g., Soapbox). These applications have limited efficacy because they don't solve the lack of agenda in the first place or the problems that arise when the agenda is changed real time. Some companies offer meeting moderators to help meetings stick with the agenda. These approaches have significant limitations in that their enforcement is inconsistent and subject to social norms of the organization, teams, and meeting leaders and management.

Often, no clear goals are defined for the meeting. Some meeting leaders make clear what the goals are of the meeting prior to the meeting. Yet, others do not. Some meeting leaders state the goals of the meeting at the meeting or ask the meeting participants to help decide what the goals of the meeting should be. In the latter situation, participants are not prepared. Some organizations attempt to require meeting goals be distributed in advance of the meeting. Companies have developed software that aids in the creation of the agenda for a meeting, and collaboration on its creation (e.g., Soapbox, Stratsys, Lucid Meetings). Some software includes features to help identify the goals associated with agenda items or with the meeting. These approaches have significant limitations in that their enforcement is inconsistent and subject to social norms of the organization, teams, and meeting leaders and management. This problem is exacerbated by the increasing use of different and sometimes incompatible methods and software systems even within organizations.

In many instances, participants leave the meeting without obtaining value. Many participants come to the meeting for a real reason seeking a useful outcome, for example, learning some new information to help them with their own work or seeking a decision regarding a course of action. In many instances, participants leave the meeting without achieving the outcome they were seeking.

In several instances, meeting longer than desirable. While some meetings may end on time, others do not. Sometimes meeting leaders as well as participants will exit the meeting before it is declared over if the meeting takes longer than the allotted time. In some scenarios, meeting leaders will end a meeting when the official time is over even if the meeting fails to accomplish its goals or complete its agenda. Yet others will keep a meeting going beyond the official time. This may result in meeting participants (including meeting leaders) not attending the entire meeting or being late for subsequent meetings. Meetings that run into overtime leave the participants in a quandary. There are no current systems that offer software that directly assists meeting leaders and participants to end a meeting on time.

Meetings do not end with automatically generated minutes or an agreed-upon summary of what occurred in the meeting. Meeting minutes are taken by a designated participant. Some meeting leaders require them and others do not. Left to the participant's will, the minutes may not be comprehensive or complete nor circulated to any or all of the meeting participants. Some meeting participants may take their own notes on the meeting and only infrequently share them with others. Others may fail to take notes. Typically, the notes are not the same, causing confusion in recollections of what transpired in the meeting. Some organizations attempt to create an official record of the meeting by having meeting participants submit their notes or otherwise compiling notes on the meeting. Some software solutions to capture the communications within meetings exist, including audio, speech-to-text transcription, or video recordings as transcriptions (e.g., Zoom, WebEx, Lucid Meetings, Stratsys, Hendrix AI, Voicera). However, these approaches have limitations. Their features are cumbersome to use, are sometimes inaccurate, and are subject to social norms within organizations, teams, and meeting leaders and management.

In many current scenarios with virtual meetings, some participants don't know how to use the virtual meeting technology or can't find the call-in information. There are many different virtual meeting technology solutions, leaving participants lost when switching systems. The burden falls on the meeting participants and meeting leaders to keep track of the "dial-in" information for the virtual meeting (e.g., conference call or video call). If one meeting attendee fails to join, the outcome of the entire meeting is affected. Some organizations attempt to solve the problems caused by inconsistent and varied meeting technologies by adopting one virtual as the standard for their organization, especially in organizations that have legal requirements such as law firms, accounting firms and other professional services organizations. These problems are magnified when a meeting includes one or more people from one or more outside organizations.

Virtual meetings often have background noise. Many virtual meetings (e.g., conference call or video call) have no background noise; the meeting participants and leader mute their microphones except to talk. Yet others have background noise. To avoid background noise, in some instances, meeting leaders and participants attempt to limit it by requesting or reminding meeting participants to mute their microphones (on their phone or computer or other device) when they are not speaking. Some are able to mute the microphones, while others cannot or forget to re-mute their microphone after they speak. Some organizations attempt to require that microphones be muted. Some software solutions have created features in their virtual meeting software to enable muting either by the individual participant or by the meeting "host." These approaches have limitations because their use is subject to social norms of the organization, teams, and meeting leaders and management. In addition, toggling between muted and unmuted states causes a lag that often results in participants talking over each other.

Not all meeting participants use the video camera in video meetings. Many video meetings (e.g., conference call or video call) have all participants (including meeting leader) using their camera. Many video meetings have some participants using video and other participants not. Variability in network speed can cause video to be "jerky" and slow, affecting the flow of the meeting. And when the video/camera is used, there is background noise, some meeting leaders and meeting participants try to limit it by asking or reminder meeting participants to mute their microphones (on their phone or computer or other device) when they are not speaking. Many meeting participants successfully mute their microphones when reminded. Others do not if they do not know how. Yet others forget to re-mute their microphone after they speak. Some organizations may attempt to require that microphones be muted. Some solutions have features in their virtual meeting software to enable muting either by the individual participant or by the meeting "host." These approaches have limitations because their use is inconsistent and subject to social norms of the organization, teams, and meeting leaders and management. In addition, toggling between muted and unmuted states causes a lag which often results in participants talking over each other.

Meeting participants may log into video meetings both with their phone and with their computer. For video meetings, some participants will use one device for both the video and audio elements of the meeting; the camera so other participants can see them and the microphone so they can hear the conversation in the meeting and enable them to speak and be heard. Many meeting participants will use two different devices; they use their computer for the camera to view other participants and materials that may be shared in the meeting or use other video meeting functionality such as chat, voting, reactions. They also log into the meeting with their phone as the method for hearing the meeting and for speaking. If a participant logs into the virtual meeting with two devices it shows as two participants rather than linking the two as one resulting in a single participant taking up the space of two participants. Virtual meeting software systems provide participants with a participant ID that allows them when they log in to connect their computer log in with their phone log in as a way to solve the problem of two independent log ins for an individual participant. This approach has inherent limitations because use by participants is inconsistent. When this approach is not used by a meeting participant, if the meeting host on his or her own recognizes an unidentified (via the participant ID) phone number as belonging to an individual who has separately logged in with their computer, then he or she may be able to merge the two log-ins. This approach has inherent limitations as the meeting host may not know how to use their feature, or know the name of the person who has logged in on an unidentified phone number. In all the cases, solving for this approach is highly dependent on the actions of the meeting participants and is inconsistently applied including merged for some participants and not for others in the same video meeting.

In the phase after a meeting has ended, the participants seldom remember the same things in the same way. With respect to what is reported, discussed, and decided in a meeting (information/data, decisions, follow-ups), many meeting attendees (leaders and participants) may remember the meeting the same way, yet others do not. Few attendees attempt to reconcile their recollections with the recollections of others. Some organizations attempt to confirm meeting attendees' same recollections of the meeting by, for example, closing the meeting by restating what happened in the meeting or distributing meeting materials. Companies have developed software (e.g., Cisco WebEx) that aids in making sure all meeting attendees were exposed to and heard the same thing, such as with audio records and transcriptions of the meeting. These approaches have limitations because their use is inconsistent and subject to social norms.

Meetings end with no official record of the meeting. To help create an official record (sometimes referred to as minutes) of a meeting, many meeting leaders and participants will take notes. Some meeting leaders may designate a person to take notes on the meeting. Many meeting leaders do not. Many meeting participants don't take notes or do so inconsistently. If there are meeting notes, some meeting leaders ask participants to share their notes for the meeting in an effort to create one set of meeting notes. Many meeting participants share their notes, yet others do not. Some meetings leaders use notes that they may have taken or that may have been taken by one or more participants. In that case, some meeting leaders will create a consolidated record of the meeting, while others may not. Many leaders who have meeting minutes prepared distribute them to participants shortly after the meeting ends, but many do not. Some organizations attempt to require that official records or minutes of meetings be created after each meeting. Companies have developed software that aids in creating the record of the meeting such as audio recording of the meeting and/or speech-to-text transcriptions of meetings (e.g., Lucid Meetings, Cisco WebEx, Stratsys, Parabol, Zoom). The output generated by the software often requires manual input from the meeting leader or someone else who attended the meeting to make it usable as a record of the meeting. While some meeting leaders may decide to put in that effort, many do not. These approaches have limitations in that they are not consistently used and are subject to social norms and the availability of meeting leaders or others to make an official record.

Moreover, it is not always clear what follow-ups have been agreed to and who is responsible for them. Meeting leaders may provide clear guidelines on what has been agreed to in the meeting (such as a list of follow-ups, possibly showing responsibility, time frame, other aspects of each follow-up item, as well as any outstanding and undecided follow-ups). Many meeting leaders are clear before the meeting what follow-ups or decisions they are looking for from the meeting and are focused on them during the meeting. Many meeting leaders are not. And if they are clear, many do not memorialize the follow-up agreements that result from the meeting. There are different approaches to solving this problem with lack of clarity on the agreed-to follow-ups. For example, many meeting leaders circulate a memorandum that lists the follow-up item and the responsibilities associated with each one. Many meeting leaders communicate individually with meeting participants on their individual follow-up responsibilities. If the meeting participants edit or disagree with the list of follow-ups, they often communicate one-on-one with the meeting leaders. If changes are made as a result, many meeting leaders will share the changes with all meeting attendees, yet others do not. Companies have developed software that aids in the collection of meeting follow-up information (e.g., Lucid Meetings, Stratsys, Cisco WebEx, Soapbox, Parabol, Asana). Yet all of these approaches have limitations. Their use is inconsistent and subject to social norms of the organization and team, resulting from the amount of effort they require from meeting leaders and participants.

There is no reliable way to know if the meeting achieved its objectives. There is no concluding survey to sum up the meeting or event, or know if the meeting leader and participants are satisfied with the meeting (e.g., did they get what they needed from it, have remaining questions). With respect to the meeting leader, meeting participants, and their management knowing whether the meeting achieved its objective or not, many meeting leaders make clear whether or not this has happened. Many do not. The ability to measure the success of the meeting is dependent on whether or not the meeting leader made clear the agenda and expected outcomes (such as decisions, follow-ups) for the meeting before or at the start of the meeting. Many meeting leaders do this. Many do not. And even if they do, many do not return to the agenda or desired outcomes (such as decisions, follow-ups) during the meeting, or declare that the meeting achieved its objective and if it did not, what to do. While some meeting leaders may glean from participants if they thought the meeting achieved the objectives, others may not. If they do, it is often unclear when the participant gives their opinion what standard they are applying. For example, is it against the stated objectives of the meeting (if any are supplied) or is it measured by their personal objectives for the meeting and why they may have attended it; these responses are at best inconsistent. Some organizations attempt to encourage meeting leaders to create and use agendas that indicate the goals for each agenda item. They may, for example, suggest books for meeting leaders to read or offer other professional development to assist them with this. Some organizations attempt to encourage meeting leaders to check to see if the agenda items were covered and/or be clear if the meeting was successful or not from their perspective and/or from the participants'. For example, some companies offer software that allows participants to provide feedback on the meeting (e.g., Lucid Meetings). In the case of professional development, this approach has limitations because their enforcement is inconsistent and subject to the social norms of the organization and the teams.

There are no current mechanisms to link or relate results from one meeting to another. There is no tracking of progress, much less, by subject matter, content, objective, participant, team or other criteria. Tracking, linking or connecting meetings to each other is absent, therefore, there are no insights. There is no way of knowing if participants (leaders or attendees are doing better, worse, etc.

There is no clarity as to who participated in a given meeting, how valuable their participation was, and who did not participate. With respect to participation in a meeting, many meeting leaders attempt to keep track of which participants spoke, what they said, and whether it was valuable, or which participants were prepared. In addition, many meeting leaders will keep track of such things as how much a participant spoke, who did not, whether the meeting participation was balanced, and if any meeting participants overpower other meeting participants. Many leaders do not try to keep track. And if they do, they often have incomplete notes or misattribute participation. Some organizations attempt to require meeting leaders to keep track of meeting participation and engagement by, for example, including it as part of performance reviews. Companies have developed software that aids in the memorialization of meeting participation such as audio recordings, video capture, and speech-to-text transcriptions. Another approach is feedback from participants (e.g., Lucid Meetings). All these approaches have limitations because their enforcement is inconsistent and subject to social norms of the organization and teams, and in that they require significant human intervention to be of use. None measure against a formal set of best practices and metrics, much less ones that are set by the organization, team, or by project.

In addition, all the current systems only provide a single approach for all, stifling any creativity in the participants. For example, if a particular person qualifies as a "good" meeting leader (or participant) and he or she wants to find a way to better manage his or her meetings and encourage better meetings and better meeting participation, he/she has to stop his/her way of running meetings or creating agendas and use the existing software's way. All the existing software solutions "tell" or inform the meeting leader and participants how they should manage their meetings. As a result, many meeting leaders and participants (especially ones who are good at meetings) choose not to adopt these software solutions because they fail to give them what they need. For example, a meeting leader may consistently create meeting agendas that work. What they may lack is a better way of circulating those agendas. Software solutions that help with the circulation insist that the meeting leader insert his/her agenda into that software solutions one-size fits all agenda template which may not make sense to that meeting leader who may view it as restrictive. This is a crucial problem with existing software solutions. They are limited in their capabilities, restricting and not tailored to meet the user's perspective or preference.

Many existing software solutions are designed for (1) one-to-one meetings rather than meetings of 3+ participants and (2) managers (or the boss) for direct report interactions rather than peer-to-peer or team meetings.

Therefore, many drawbacks exist and better solutions are needed.

SUMMARY

In accordance with some embodiments, the present invention is directed to a real-time event and participant communication system with intelligent interface actions that enhance user experience. This system creates an integrated and unified approach that intelligently and efficiently manages meetings and their participants (meeting leaders, invited attendees, and uninvited attendees) with allocating resources as and when needed. The present invention improves the quality and outcomes of meetings and the satisfaction of the participants.

In accordance with some embodiments, the present invention facilitates entry into the integrated system simple for new as well as returning participants. The integrated system effectively provides insights on "soft skills" of the participants by observing behavior patterns. For the purpose of this description, "soft skills" are personal habits and traits that shape how people work, on their own, and with others. The significance of soft skills is widely recognized and appreciated as much or more than hard skills, especially for enterprise success. The integrated system of the present invention has an intelligent process to measure "soft skills" accurately including creativity, persuasion, collaboration, adaptability, and emotional intelligence in a systematic way and with dynamic systems configured to collaborate.

The present invention has developed solutions that may be used for or across all meetings or events that a participant (leader or attendee) goes to, participates in or attends either actively or as a passive observer. These solutions provide a unique approach to the issues faced at the pre-meeting, meeting, and post-meeting phases in order to generate packets of data specific to the user, event or an organization that includes scores for a particular meeting, each participant whether meeting leader or attendee, and a meeting graph linking and comparing the performance of each participant (meeting leader or attendee) with others or themselves (their earlier meetings). This score is advantageously used to adjust and predict participant (meeting leader and attendees) behavior in subsequent meetings.

The present invention has tools that prevents intrusion by the system into the actual meeting and during meeting set up, while gleaning useful changes in behavior during meetings. The present system and method focus on user perspective rather than the perspectives of the organization, project, or team and creates and maintains a user data packet for each individual user by continuously gathering scores and ratings from meetings or events that a particular user has been part of, as a leader or an attendee. Scores and ratings are gathered from different meetings and events, identified either by tracking a user history within an organization and its platforms, or across organizations, either linked or not, as identified or by project. This user packed is created and dynamically enhanced or supplemented with one or more data sets acquired from each instance of use or appearance by each individual user in an event. It serves as a "floating" user data packet with many variables that are used as technical filters to identify information of interest. For example, data on a particular user's leadership scores may be easily extracted for selective reporting to an end user that is identified. As another example, data on a particular user's participant score may be identified and compiled. Any data that is extracted may be compiled into a subset of data and exported to a designated entity.

In some embodiments of the present invention, the user data packet may gather scores and rankings based on user activities, for example "brainstorming" versus "decision making." The system may determine skill levels from this information. In yet other embodiments, the scores and rankings may be used to designate companies and enterprises, for example, financial companies versus media companies. These scores and rankings are created by adding up individual scores derived from different meetings and events.

Events or meetings are classified by phase and may be in the sequence illustrated or changed. In the pre-meeting phase, the present invention uses technology in several ways that facilitate the present invention's solution. First, the present invention includes features and tools that make it simple for participants to be invited into the system. These tools and features are easily applied to participants known to the system as well as new participants or participants using different contact information or identity credentials than used before.

In some embodiments, the participants may be invited to an event or a meeting using a traditional meeting scheduling system. The meeting and its participants may be automatically added by identifying and including an email address to the system, which informs the present system that it has been invited.

Upon receiving the invitation, the system harvests the email addresses or other contact information for the other participants. These indicia for the participants are automatically reconciled and resolved with existing records of prior participants and meetings to determine if the system recognizes them or if they are new. This process makes adding new participants efficient. The system also tracks participants with use of different or changing contact information and identity credentials. The present system in some embodiments, tracks participants regardless of the nature and type of meetings they are participants in, independent of the "situation" or company associated with their meetings. If the system discovers new participant solicitations, they may be added to the system or they may be maintained as guests.

Some embodiments of the present invention include prediction and recommendation engines to enhance and advance user experiences.

BRIEF DESCRIPTION OF THE DRAWINGS

FIG. 2B is a block diagram illustrating the scoring engine and the predictor engine in the integrated system in accordance with some embodiments of the present invention.

FIG. 11 is an example graphical user display of part 1 of a meeting survey.

FIG. 12 is an example graphical user display of part 2 of a meeting survey.

FIG. 13 is an example graphical user display illustration of a meeting report of a non-recurring meeting with all participants.

FIG. 14 is an example graphical representation of a graphical user interface (display) of a meeting report for a recurring meeting with trend information for all participants.

FIG. 15 is an example graphical representation of a graphical user interface (display) of a meeting report format for a recurring meeting with trend information for the meeting leader.

FIG. 16 is another example graphical representation of a graphical user interface (display) of another meeting report format for a recurring meeting with trend information for the meeting leader.

FIG. 24 illustrates the system making specific recommendations for others for a particular user to connect with. The system makes these recommendations based on machine learning and those who are not in a particular network may be added based on recommendations.

FIG. 26 illustrates information on one of the persons a user meets with most often. FIG. 26 is a click-through that is displayed by clicking on one of the names listed above.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

The detailed description discloses certain embodiments of the present integrated system for creating and executing intelligent actions via an event-driven platform that manages and improves encounters among participants, for example, leaders/hosts, invitees, and attendees, while generating dynamic communication metrics and data on the participants and events. The event-driven platform facilitates meetings and connections among remote participants and improves their overall experience by implementing controls, coordinating tasks in different phases, and providing effective and timed interface actions.

Figure 1:
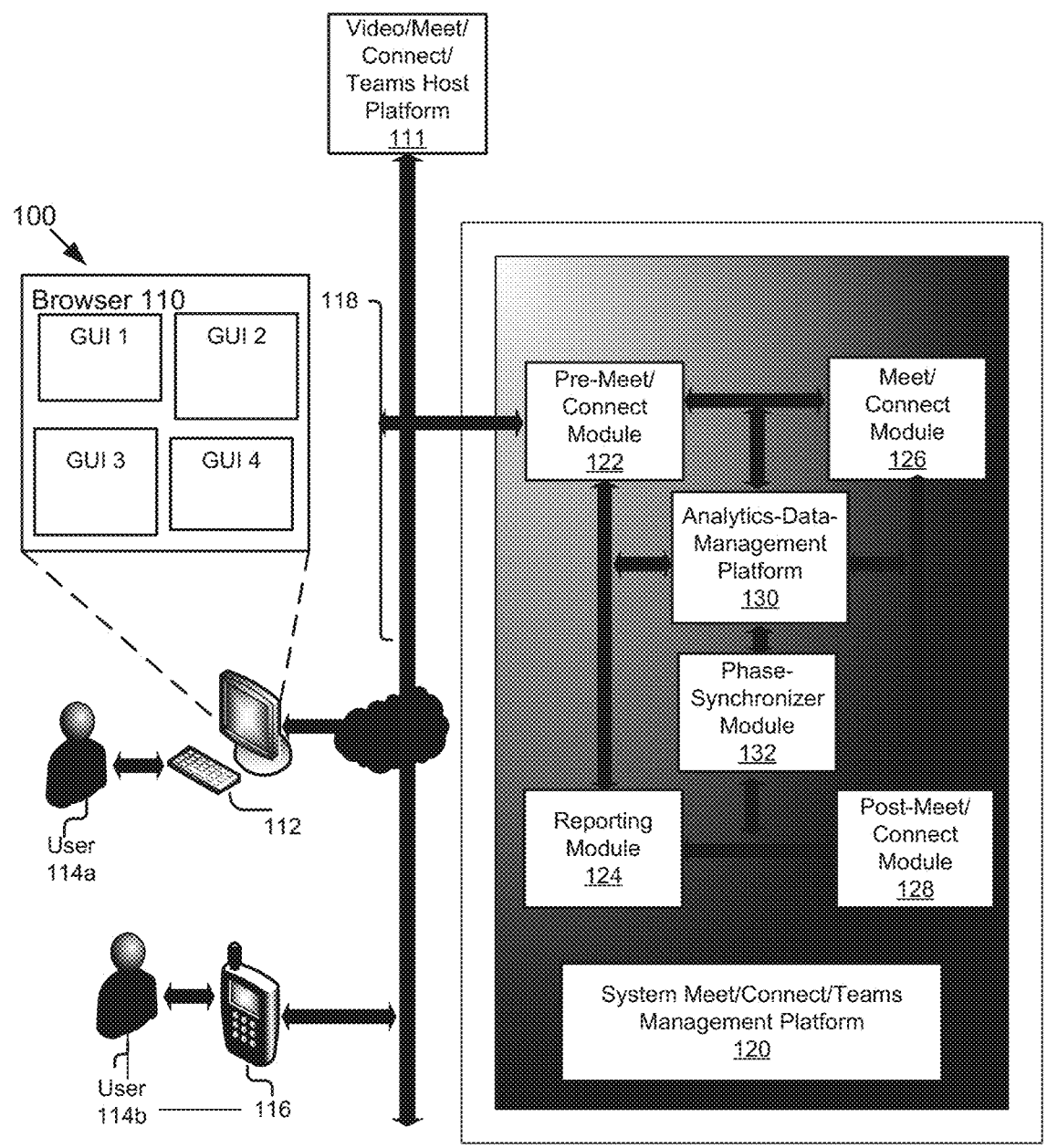
FIG. 1 is a high-level block diagram of one embodiment of an integrated system architecture for the real time event and participant communication system in accordance with the present invention.

Referring to FIG. 1, the overall system architecture for the integrated system or platform 100 is illustrated. One or more users 114a and 114b and so on, use an electronic device such as a desktop, tablet, or watch designated by reference numeral 112 or a mobile phone 116, by which users may access a communication instance or session of a meeting, an event, an encounter, or make a connection with others as created by the system 100. The users may access the system or platform 100 via any videoconferencing host platform 111 via a browser 110. Before and during a video conference, event, or meeting (in person, virtual or hybrid) that takes place and progresses, various graphical user interface displays (GUI 1, GUI 2, GUI 3, and GUI 4) enable interactions between the users and the system 100 of the present invention. Various example graphical user interface displays (GUI 1, GUI 2, GUI 3, and GUI 4) are illustrated in the screenshots shown in FIGS. 11-27.

The system 100 integrates events, meetings and their participants (meeting leaders and invited attendees) into an intelligently managed system and applications, improving the quality and outcomes of the events and the satisfaction of the participants. It should be recognized by those skilled in the art that any reference here to a meeting or event describes scenarios that are in person, virtual or a hybrid situation. For in person events, the tools and features described here are used to supplement the experience rather than effect communications among the participants. In virtual or hybrid communication scenarios, the system 100 has an easy log-in feature to enable users to join it with relative ease. This feature is for new as well as returning participants. The system 100 includes a pre-meet/connect module 122, a meet/connect module 126, a post-meet/connect module 128, and a reporting module 124. The overall system architecture of the system meet/connect/teams management platform is designated by reference numeral 120. Each of the modules is coupled to an analytics-data-management platform 130, which serves as a repository for all the data. Each of the modules is also coupled to a phase-synchronizer module 132, which coordinates timing, transition, and data use and storage in each phase of the integrated process.

The unique approach of the present system 100, through the various phases generates scores for a particular meeting, event or connection, each participant (meeting leader and/or attendees), and uses a meeting graph linking the performance of each participant (meeting leader and/or attendees). This score may be used to adjust and predict participant (meeting leader and/or attendees) behavior in subsequent meetings. The scores are dynamically tracked and updated for each of the leaders, participants, types of meetings, recurring meetings etc., by each occurrence of a meeting or event or by each instance of participation by a leader or participant in a meeting or event. This continuous gathering and compiling of data with ongoing analytics enable prediction schemes for participant and meeting behavior. The system 100 does not intrude into the meeting (and meeting set up), but is able to obtain useful changes in behavior in meetings as they are underway.

Figure 1A:
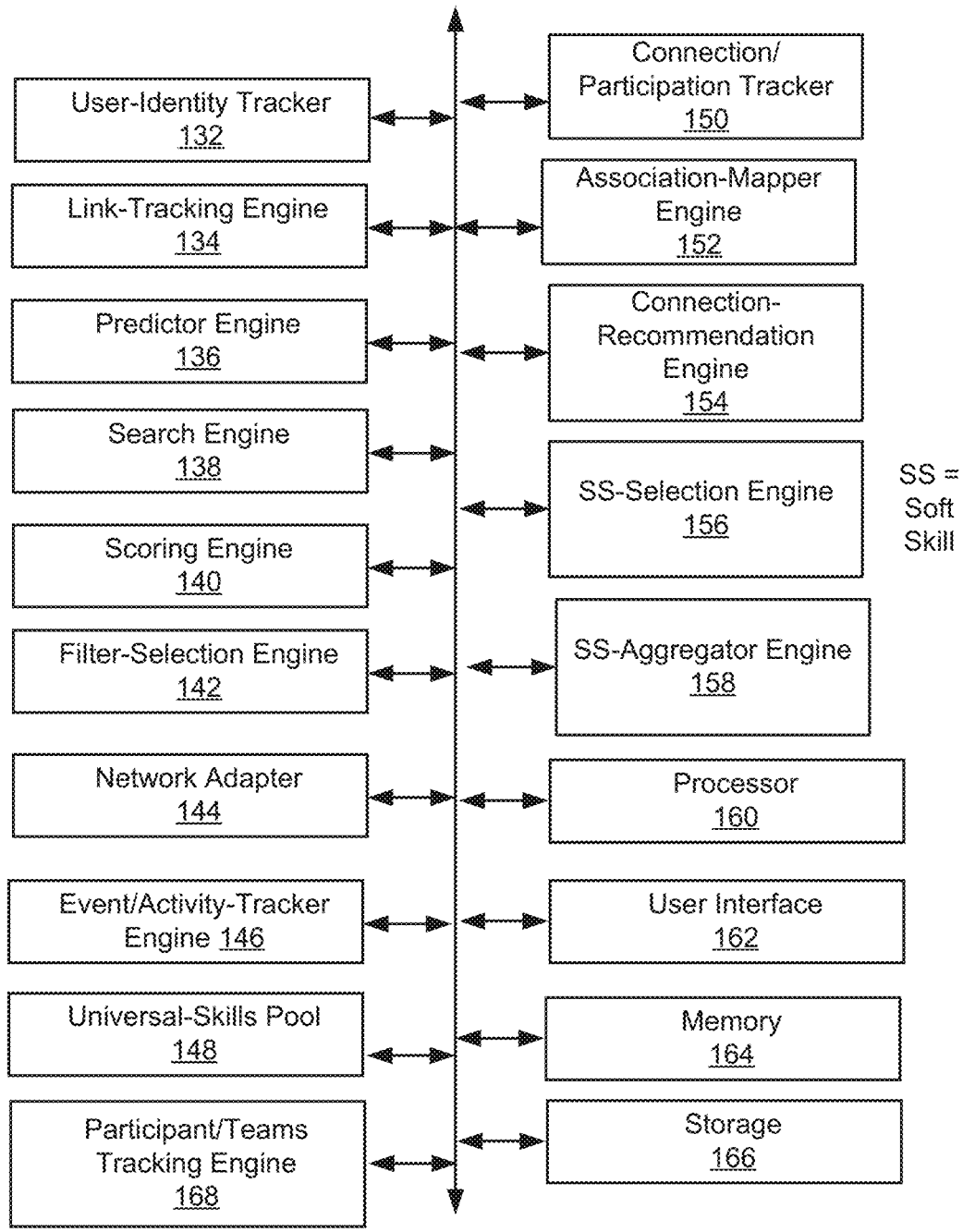
FIG. 1A is block diagram illustrating the hardware and software engines in the system architecture of the present invention in accordance with the present invention.

Referring now to FIG. 1A, the various software engines of the integrated platform 100 (FIG. 1) are illustrated. The integrated platform 100 includes a user-identity tracker 132, a link-tracking engine 134, a predictor engine 136, a search engine 138, a scoring engine 140 a filter-selection engine 142, a network adapter 144, an event/activity tracker engine 146, a universal-skills pool 148, a participant/teams tracking engine 168, a connection/participation tracker 150, association-mapper engine 152, a connection-recommendation engine 154, a SS-selection engine 156, and a SS-aggregator engine 158. It should be recognized that "SS" refers to "soft skill or skills." The integrated platform 100 further comprises a processor 160, a user interface 162, a memory 164, and storage 166. Each of the engines illustrated here are software operations stored in the memory 164 and executed by the processor 160 to interact and work together to produce complementary outputs to execute dataflow and effective application performance to drive the user experiences create by the integrated system 100. In accordance with some embodiments, the user-identity tracker 132 comprises one or more instructions for performing functions that track each of the participants who participate in the meetings or events. The link-tracking engine 132 comprises one or more instructions for performing functions that keep track of the connections or links between the participants, by meeting or event, organization, content, behavior compatibility or the like. The predictor engine 136 comprises one or more instructions for performing functions that make predictions based on analyzing participant or meeting data, scores etc. The operations of the predictor engine are described in greater detail later. The search engine 138 comprises one or more instructions for performing functions that may be used to search for data on participants or meetings by applying filters or as needed. The scoring engine 140 comprises one or more instructions for performing functions that score participants, events, meetings or organizations. The filter-selection engine 142 comprises one or more instructions for performing functions that filter data as desired, for example by type of meeting or event, particular soft skills etc. If a group or team is required with a certain soft skill, historical data may be perused to isolate a set of people.

In some embodiments of the present invention, the network adapter 144 is configured to perform interface actions to execute the functions of each of these engines and software modules to ensure improved user experiences. The event/activity-tracker engine 146 comprises one or more instructions for performing functions that track each event or activity conducted via the integrated platform 100. The universal-skills pool 148 comprises one or more instructions for performing functions that create a list of skills as they are determined. The universal-skills pool 148 may be stored in the storage 166, which may be local or distributed as required. The participant/teams tracking engine 168 comprises one or more instructions for performing functions that track the particular participants in a team. This data is useful for compiling and recommending teams for future meetings or events by project, skill, organization or the like. This data is also useful in reverse, for a user to gather data to get insights into what companies or organizations to join or what project or team to be a part of. The connection-participation tracker 150 comprises one or more instructions for performing functions that track the connections of and participation by each participant. The metrics compiled are critical for decisions by the predictor engine 136. The association-mapper engine 152 comprises one or more instructions for performing functions that map associations between participants including relationships. For example, participants in the same organization, department or business group may be tagged and pulled into an event in a single instance defined by the integrated system 100. The connection-recommendation engine 154 comprises one or more instructions for performing functions that collaborate with the predictor engine 136. The connection-recommendation engine 154 is configured to recommend connections. For example, artificial intelligence may keep track of participant and meeting or event metrics and anticipate next action and make recommendations that facilitate completion of the next actions. The SS-selection engine 156 comprises one or more instructions for performing functions that collaborate with the other engines in the system 100 to filter and make recommendations based on particular soft skills. In particular, when the system 100 is able to discern the soft skill required for next action, the predictor engine 136 in collaboration with the SS-selection engine 156 proceeds to execute next tasks. The SS-aggregator engine 158 comprises one or more instructions for performing functions that serve to aggregate a list of soft skills that are stored in the storage 166 and identified and used as desired for the functionalities of the integrated system 100. As described above, the processor 160 in conjunction with the user interface 162, memory 164, and storage 166 executes the software functions and routines described.

Figure 2:
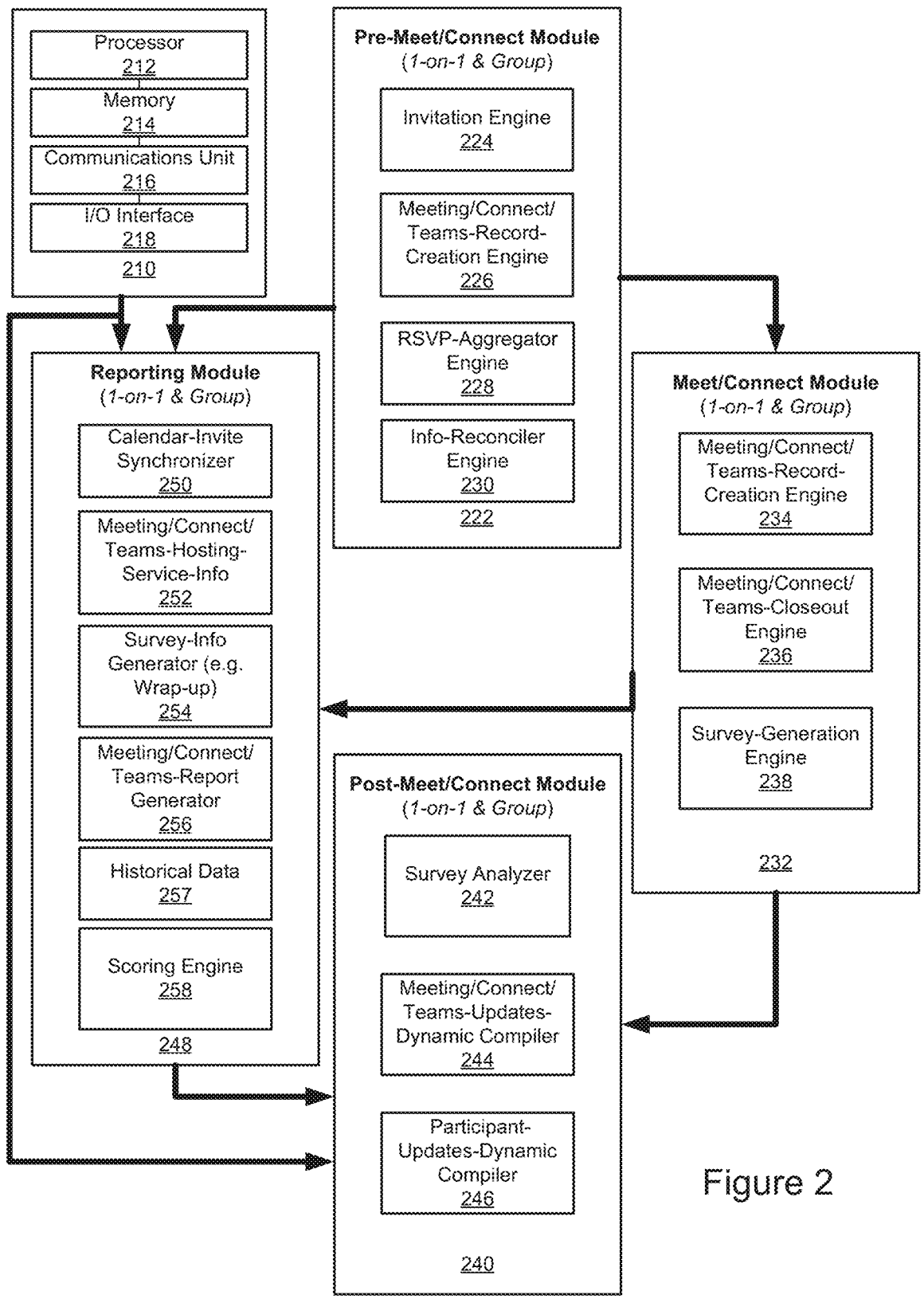
FIG. 2 is a block diagram illustrating the software modules and engines in the three phases of meeting/connection flow in addition to the associated hardware and reporting module of the integrated architecture of the present invention in accordance with the present invention.

FIG. 2 illustrates the various phases of an event or meeting flow including pre-meet/connect module (for 1-on-1 and group) 222, meet/connect module (for 1-on-1 and group) 232, post-meet/connect module (for 1-on-1 and group) 240, and reporting module (for 1-on-1 and group) 248. The hardware unit 210 comprises the processor 212, memory 214, communications unit 216, and I/O interface 218. The processor 21 executes the instructions stored in memory to drive each of the modules. The pre-meet/connect module 222 further comprises an invitation engine 224, meeting/connect/teams-record-creation engine 226, RSVP-aggregator engine 228, and info-reconciler engine 230. Each of these engines are configured as software modules to execute the programmed functionalities. The invitation engine 224 comprises one or more instructions for performing functions to send invitations to a designated group of participants. These invitations may be defined for single event and recurring meetings. The meeting/connect/teams-record-creation engine 226 comprises one or more instructions for performing functions to create records for a meeting, participant, organization etc. The RSVP-aggregator engine 228 comprises one or more instructions for performing functions to aggregate responses from the participants, which is a precursor to executing a meeting or event. The info-reconciler engine 230 comprises one or more instructions for performing functions to reconcile and resolve conflicting information, for example participant identity credentials in instances when multiple participants provide the same information.

The meet/connect module 232 (for 1-on-1 and group) comprises a meeting/connect/teams-record-creation engine 234, a meeting/connect/teams-closeout engine 236, and a survey-generation engine 238. The meeting/connect/teams-record-creation engine 234 comprises one or more instructions for performing functions to create records on participants, meeting or event or the like. The meeting/connect/teams-closeout engine 236 comprises one or more instructions for performing functions that closeout meetings when complete or at designated times as specified by the leader, organization or the integrated system 100. The system 100 may solicit preferences in advance and execute them at stated times or upon occurrence of pre-defined events when they are triggered. The survey-generation engine 238 comprises one or more instructions for performing functions to generate surveys (wrap-up documents or live instances) that are sent to participants (attendees and/or leaders), observers, as designated or desired. These survey instance may be variously configured with queries as needed and are directed by meeting type, for example one-on-one or teams.

The post-meet/connect module (for 1-on-1 and group) 240 comprises a survey analyzer 242, a meeting/connect/teams-updates-dynamic compiler, and a participant-updates-dynamic compiler 246. The survey analyzer 242 comprises one or more instructions for performing functions to analyze surveys for relevant data to inform either the leader, attendees, organization or to update the user data packet with behavior-related patterns.

The reporting module (for 1-on-1 and group) 248 comprises a calendar-invite synchronizer 250, a meeting/connect/teams-hosting service-info unit 252, a survey-info generator 254 to create wrap-up instances and actions, a meeting/connect/teams-report generator 256, a historical data repository 257, and a scoring engine 248. The functions of the reporting module 248 collaborate with various other engines to take relevant data and information to create tailored reports. The calendar-invite synchronizer 250 comprises one or more instructions for performing functions to synchronize current and future invitation based on comparing with historical data 257. The meeting/connect/teams/hosting-service info compiles data on the host entities and their functions or services. The survey-info generator 254 identifies the data and information relevant to creating surveys, whether short or detailed, depending upon preferences. The meeting/connect/teams-report generator 256 comprises one or more instructions for performing functions to generate reports for either the meeting, an individual participant (attendee or leader) or the team or work group.

The scoring engine 258 comprises one or more instructions for performing functions to inform the scores for participants, meetings etc.

Figure 2A:
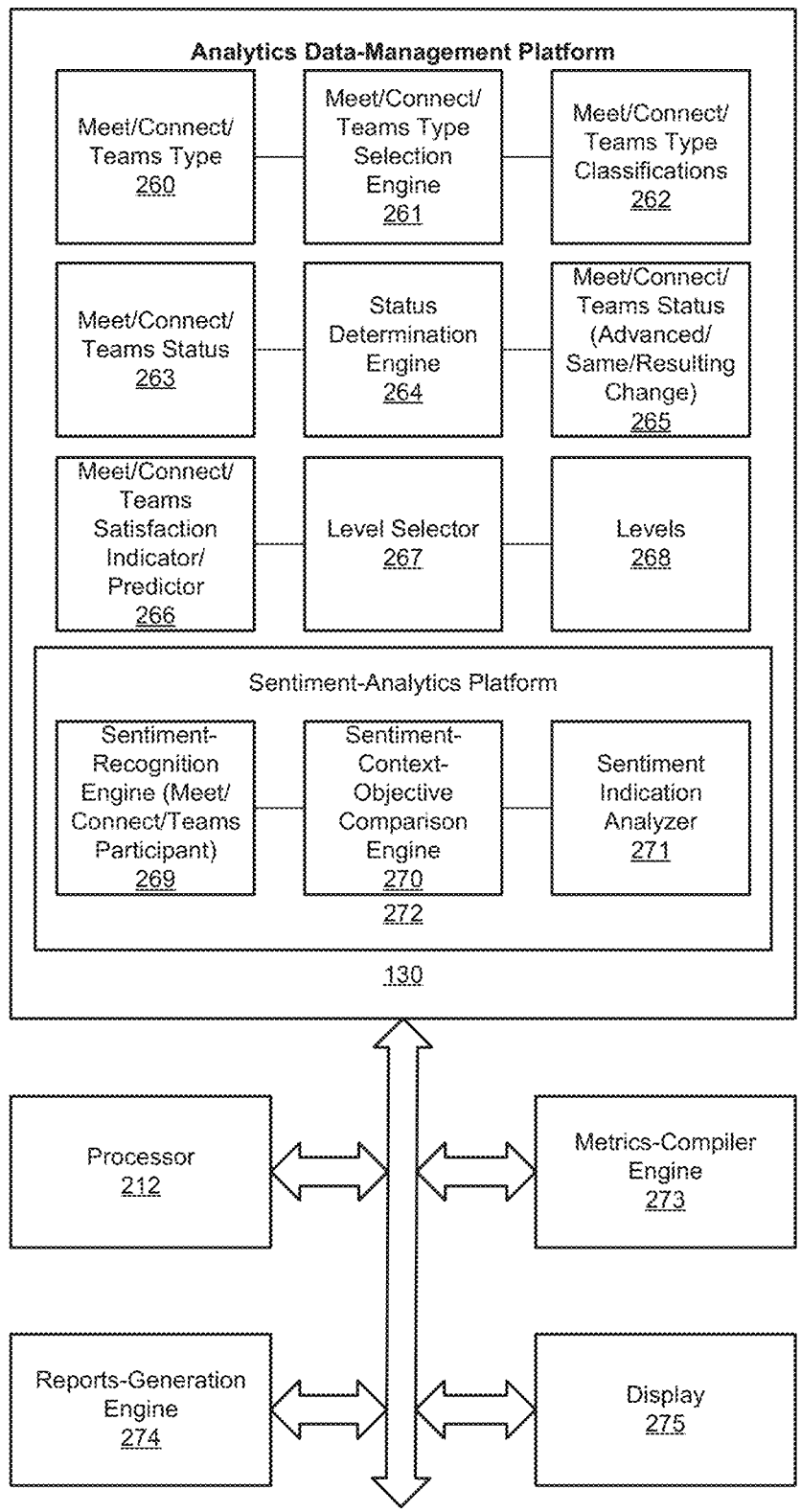
FIG. 2A is block diagram illustrating the system engines in the analytics data-management system and their interaction with the metrics-compiler engine and the reports-generation engine.

Referring now to FIG. 2A, the analytics data-management platform 130 (also in FIG. 1) gathers and compile data by distinct criteria. In some embodiments, the analytics data-management platform 272 comprises meet/connect/teams type 260 coupled to a meet/connect/teams type selection engine 261, which is coupled to meet/connect/teams type classifications. These data structures collaborate to select and connect teams based on classifications. In some embodiments, the meet/connect/teams status unit 263, is coupled a status determination engine 264, and a meet/connect/teams status designator 265. The status designator informs on whether a meeting has advanced, is the same, or resulted in no change. In some embodiments, the analytics data-management platform 130 comprises a meet/connect/teams satisfaction indicator/predictor 266 coupled to a level selector 267 and a levels indicator or index 268. Each of these module and data structures collaborate and engage to provide interface actions that indicate and/or predict satisfaction levels (for participants or meetings) from pre-defined levels. Examples of these pre-defined levels may be expressed by ratings, percentages, barometers, or emojis and in other ways known to those skilled in the art.

The analytics data-management platform 130 (also in FIG. 1) further comprises a sentiment-analytics platform 272 including a sentiment-recognition engine 269 for recognizing sentiments expressed by participants, teams, particular connections in teams, and/or during meetings. The sentiment-context-objective comparison engine 270 may compile sentiment data and expressions by context or by objectives. Data that is compiled across various meetings (sequential or recurring) may track sentiment evolution and/or progress and indicated by a sentiment-indication analyzer 271. By way of example, in an initial meeting, a leader may not be pleased at the solutions discussed, but in subsequent meetings, he or she may be satisfied that progress has advanced. Each of these modules are software instructions that program the processor 212 to execute functions. A metrics-compiler engine 273, a reports-generation engine 272 are coupled to a display 275 that is configured to display any metric or report to a party who is designated. The metrics-compiler engine 273 compiles all categories of data and the reports-generation engine 272 generates and provides reports.

Referring now to FIG. 2B, in some embodiments, a scoring engine 140 is coupled to a net-promoter scoring engine 276, the SS Scoring engine designated as 277, a predictor engine 278, and a participant scoring engine 279. The net-promoter scoring engine 276 is coupled to a repository of net-promoter scores 280, for example "AA," "BB" and/or "CC." The SS scoring engine 277 is coupled to a repository of soft skill scores 281, for example, "DD," "EE," and/or "FF." The predictor engine 278 is coupled to a repository of predictive scores 282, for example "GG," "HH," and/or "II." The participant scoring engine 279 is coupled to a repository of participant scores 283, for example, "JJ," "KK," and/or "LL." These repositories serve as a scoring index 284 and may be pre-defined, tailored by need, and/or dynamically updated as they are accorded to participants/meetings/teams/leaders and/or organizations. In particular with respect to the predictor engine 278, predictions are provided for composition of participants 278a, work group/teams 278b, and/or companies/organizations 278c.

Figure 2C:
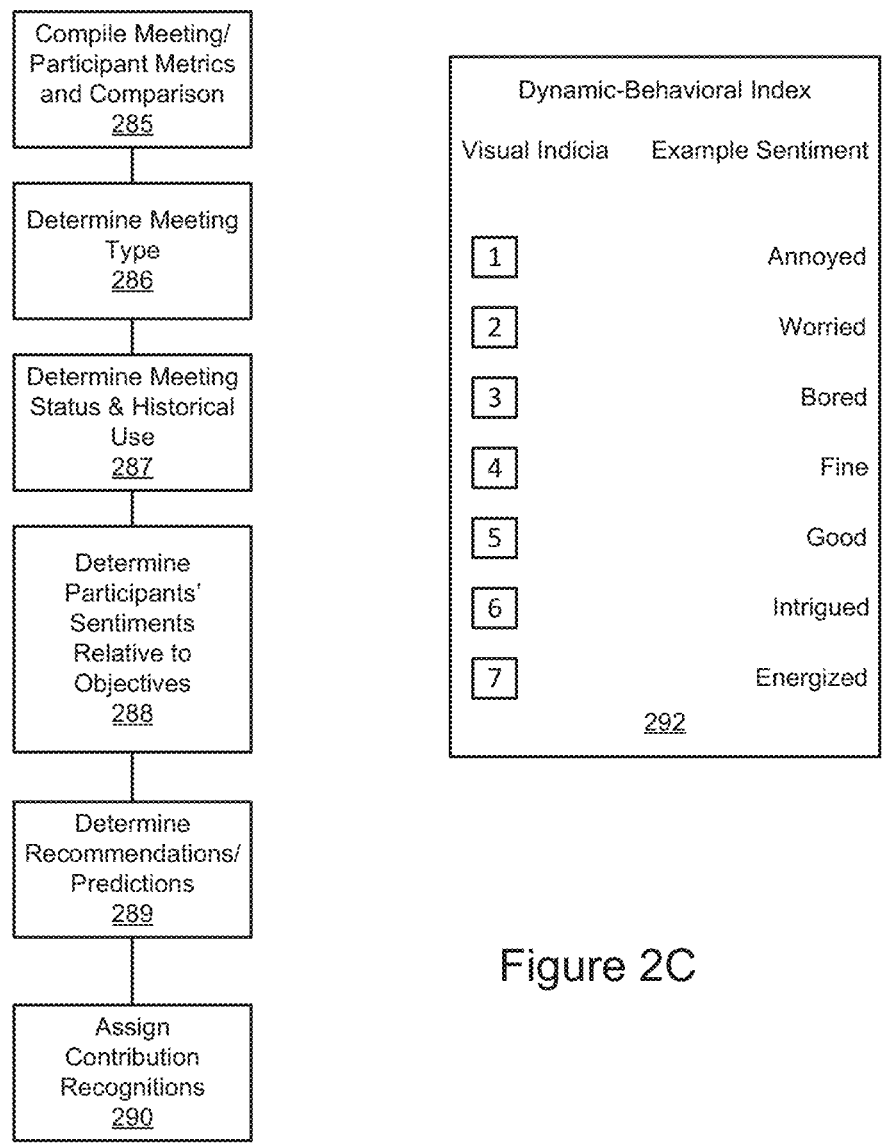
FIG. 2C is a flow chart illustrating a process flow and a dynamic-behavioral index of the system in accordance with the present invention.

Referring now to FIG. 2C, in some scenarios, the process flow begins with compiling a meeting or event based on participant metrics and comparisons. These operations are designated by reference numeral 285. Based on comparative operations, a meeting type is determined, as designated by reference numeral 286. The process flows to the next block of operations for determining the meeting status and historical user, as designated by reference numeral 287. The process flow may include determining participant sentiments relative to objectives, as designated by reference numeral 288. The process flow determines recommendations and predictions as designated by reference numeral 289. The process may conclude with assigning contribution recognition as designated by reference numeral 290. A dynamic-behavioral index 292 illustrates example visual indicia and example sentiments. The visual indicia may be a rating system from 1 to 7 and the example sentiments may be one or more of "annoyed," "worried," "bored," "fine," "good," "intrigued," and/or "energized."

Figure 2D:
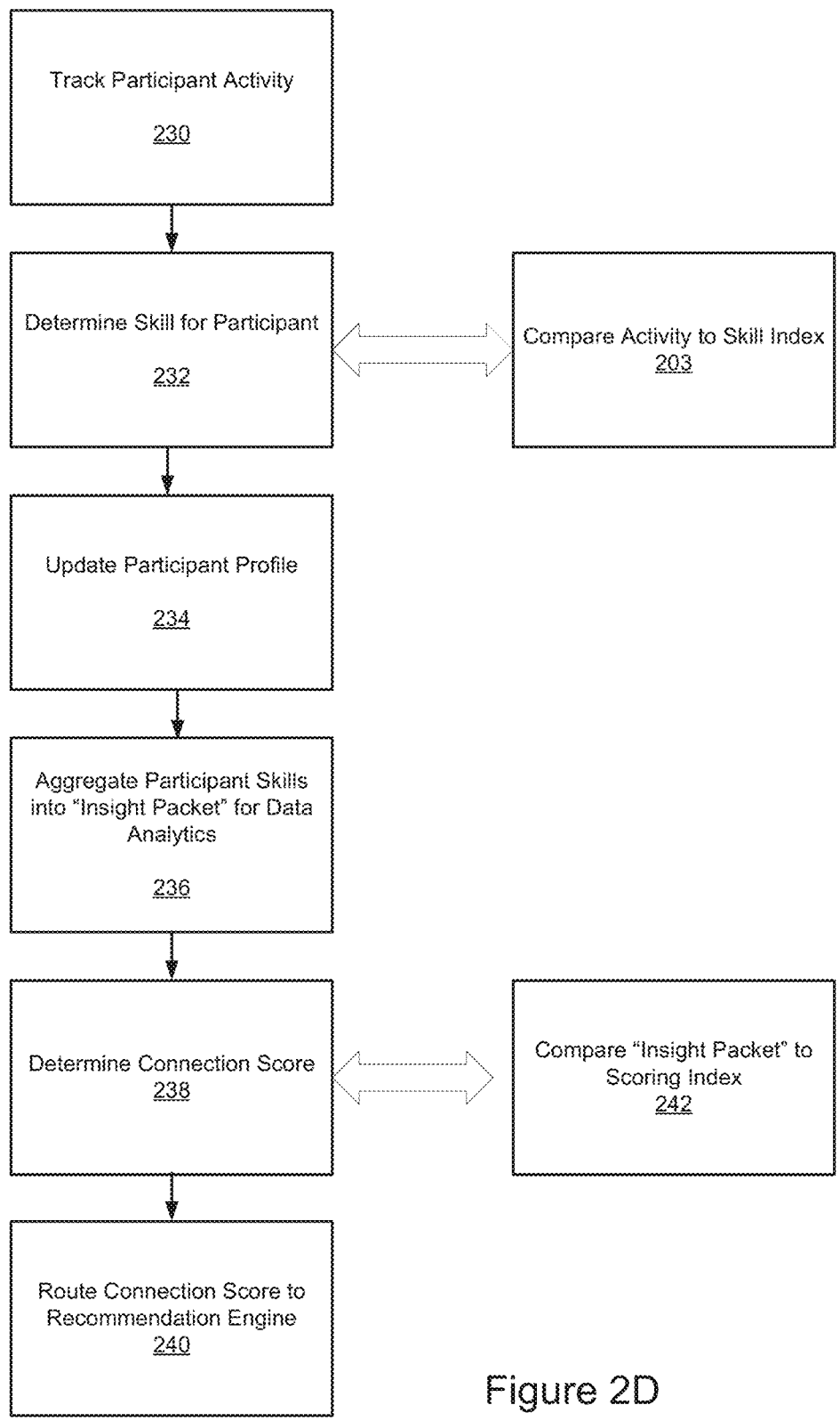
FIG. 2D is a flow chart illustrating participant-related activities and skills in accordance with the present invention.

Referring now to FIG. 2D, the integrated system 100, in some embodiments tracks participant activity (block 230) and determines the skill for a participant (block 232). It is coupled to a skill index and compares activities to the index (block 203). It continuously updates the participant profile (block 234) and aggregates participant skills into insight packets for data analytics (block 236). The system 100 determines connection scores (block 238), in some instances, by comparing the insight packets to the scoring index (block 242). The system routes the connection score to the recommendation engine (block 240).

Figure 3:
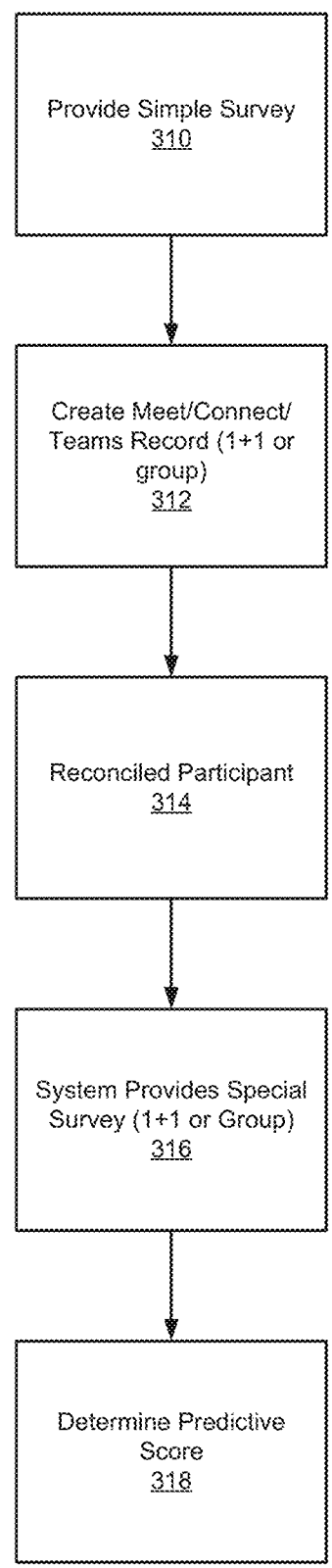
FIG. 3 is a high-level flow chart illustrating an example flow including provision of surveys and determining predictive scores.

Referring now to FIG. 3, in some embodiments, the process involves generating and serving a simple survey, shown by step designated by reference numeral 310, generating a meeting record, shown by step 312, reconciling participants, shown by step 314, generating a special survey, shown by step 316, and assigning a predictive score, shown by step 318. During the meeting, information is collected on when participants enter and leave, when they speak, and any other information concerning how the participants interact. When the meeting is closed out the resulting meeting record is analyzed. The meeting or event generates a reporting data packet transmitted to a system control informing on who actually attended the meeting or event versus the participants invited. This reflects an attendance rate, which may be used to gauge interest. The system control can easily figure out from the reporting data packet, a list of attendees who showed up without an invitation. A simple survey is generated based on the meeting record that is sent out to each of the participants and a special survey is generated for the host participant or meeting leader.

The survey that is generated is meant to favor ease of response over detail. The survey collects a limited set of information by posing anywhere from three to ten questions. The goal is to encourage maximum participation rather than obtain a few highly detailed surveys. One goal is to solicit information regarding the performance of the other participants at the meeting. The intent is to correlate the surveys with the participants in order to create a "participant score" that is retained from meeting to meeting. It is also possible to learn enough from these surveys to determine which participants work well together. It is also possible to learn some of the relative strengths and weaknesses of the participants or "soft skills" that are personal habits and traits that shape how people work, on their own and with others. The system also generates a score for the meeting itself based on these surveys. Using these various scores and meeting records, the system generates a meeting graph that maps the interactions between different participants over the span of time and over many meetings.

Post-meeting the surveys are collected and analyzed. The record of the meeting is updated. The scores of each of the participants are updated. The system includes a feature by which scores generated for participants, leaders, companies etc., may be sorted based on criteria (to filter information). For example, a particular individual when he or she is a leader versus when he or she is an attendee (e.g., "participant status") or when the particular individual is in a brainstorming meeting versus a decision-making meeting (e.g., "meeting activity") or a media company versus financial services company (e.g., "company type"). Scores for companies may also be generated. In some instances, scores for particular teams or departments may also be generated. The system may be configured to generate scores for all types of entities, organizations or participants. Finally, a report is created for each of the participants and the host detailing the meeting as well as detailing for the participants how they might adjust their behavior in future meetings.

Over time participants receive useful feedback from which they can choose alter their behavior in meetings. The system can generate suggestions and insights based on scores that can advantageously help participants improve their performance over time. The system also informs people at a particular point in time and over time, on what their soft skill levels are or those of others. This permits users to see what happens when they follow insights about how they can improve their performance (as measured by scores, rankings, badges, etc. Trends are not static. Data gathered can also be sliced and diced to granular levels or by holding a variable constant. For example, users who are participants may be judged on how they fare with one meeting leader versus another. In some instances, users who are participants may be judged on how they fare as a participant versus a meeting leader. In some instances, users who are participants or meeting leaders may be judged on how they fare with one organization versus another. In other instances, determinations may be made of an employer as a whole versus a project with a particular employer. Meeting leaders can look at participant scores to help anticipate how to set up a useful and productive meeting. Participants can be added to the system by simply including the system's email address to invitations to the meetings.

Figure 4:
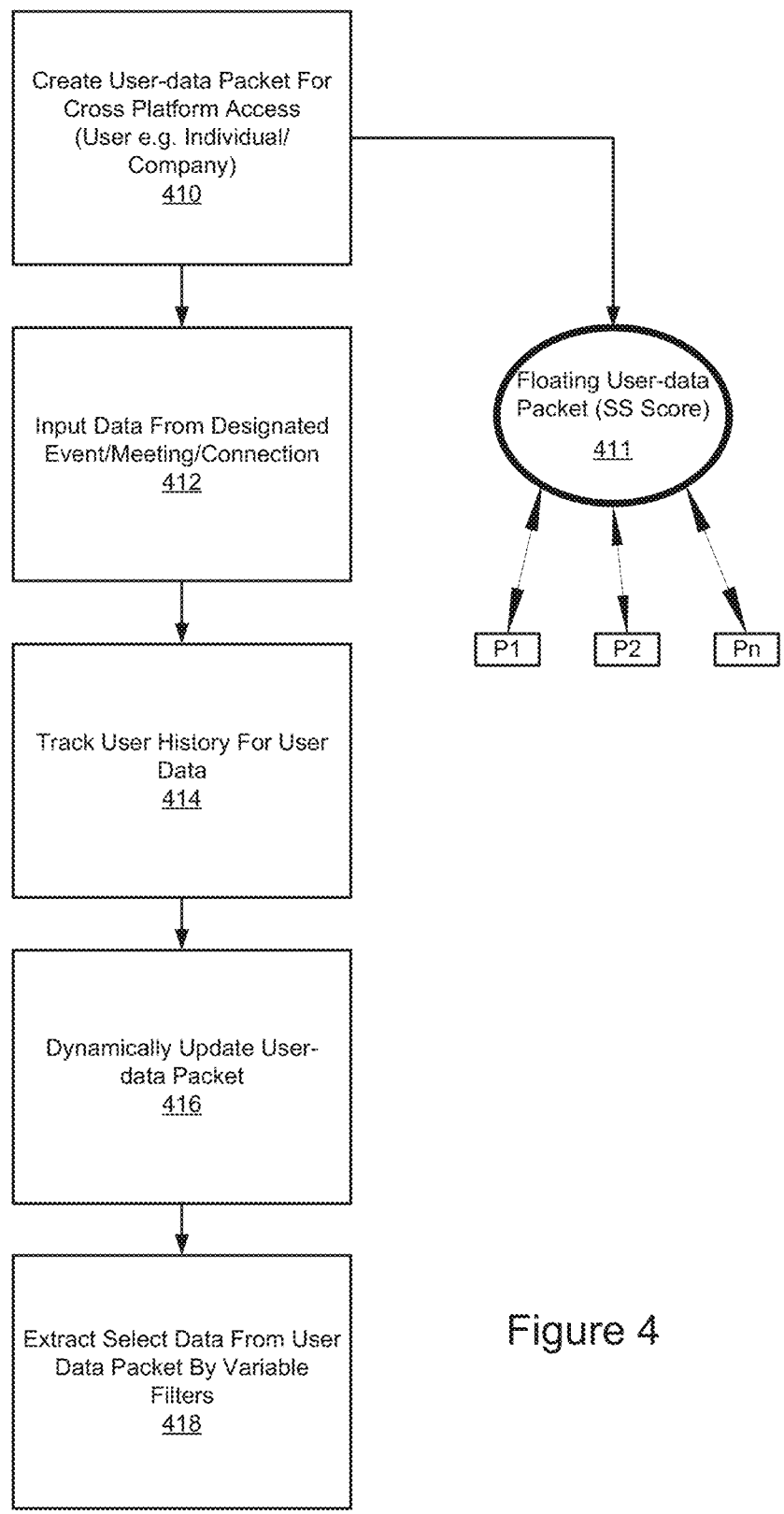
FIG. 4 is a block diagram illustrating dynamic creation of a user data packet or user data kernel that is "floating" and may be accessed cross platform or as needed.

Referring now to FIG. 4, the system and method advantageously creates a user data packet for cross platform access and use. Each user data packet is configured for each individual user, which may be a person, a group, or an entity such as a company or enterprise. At the start for a first-time presence, the user data packet is created and starts to evolve dynamically with additional data acquired with each instance of presence in or invitation to an event, such as a meeting. These operations are designed at block 410. Input data is acquired from various sources, either comprehensively, or with some filters in place. Input feeds may be automatically received and the user data packet updated or input feeds may be designated at any point or designated times etc. These operations are collectively indicated by block 412. In some embodiments, the system tracks the user history for each user to acquire data to update the user data packet, as designated by block 414. In operation, the user data packets once created are dynamically updated, as designated by block 416. The user data packets are "floating" packets of data that are easily accessible across platforms, creating a repository of user information that is dynamically compiled and instantly usable as needed. A floating user data packet is illustrated at 411 and is accessible by different platforms, designated at P1, P2, and Pn, as many as authorized to access the user data. In some embodiments and uses, the user data packet may have a component that provides a "reputation score" for a user. This "reputation score" is created and dynamically updated based on user conduct, behavior, skill level etc. An interactive interface from a platform query for the "reputation score" may input a filter category, in response to which the system intelligence would provide a specific "reputation score" with data responsive to the platform query. For example, if an entity wants to determine a "reputation score" on an individual relating to a skill level (whether a soft skill or some other type of skill), the platform query would specify so, and the system intelligence would extract the data from the user data packet on "skill," compile the data identified and provide a skill-based reputation score. These scores may be easily exported to reporting agencies within an organization or outside as a financial or FICO score is reported in response to credit check inquiries. These operations are collectively illustrated within the block 418. These reputation scores advantageously provide a mechanism for either users or entities to obtain useful fact-based data for users and entities that may be used as decisioning criteria to evaluate either individuals or companies of interest. This technology provides an equitable check and balance that is dynamically available.

Figure 5:
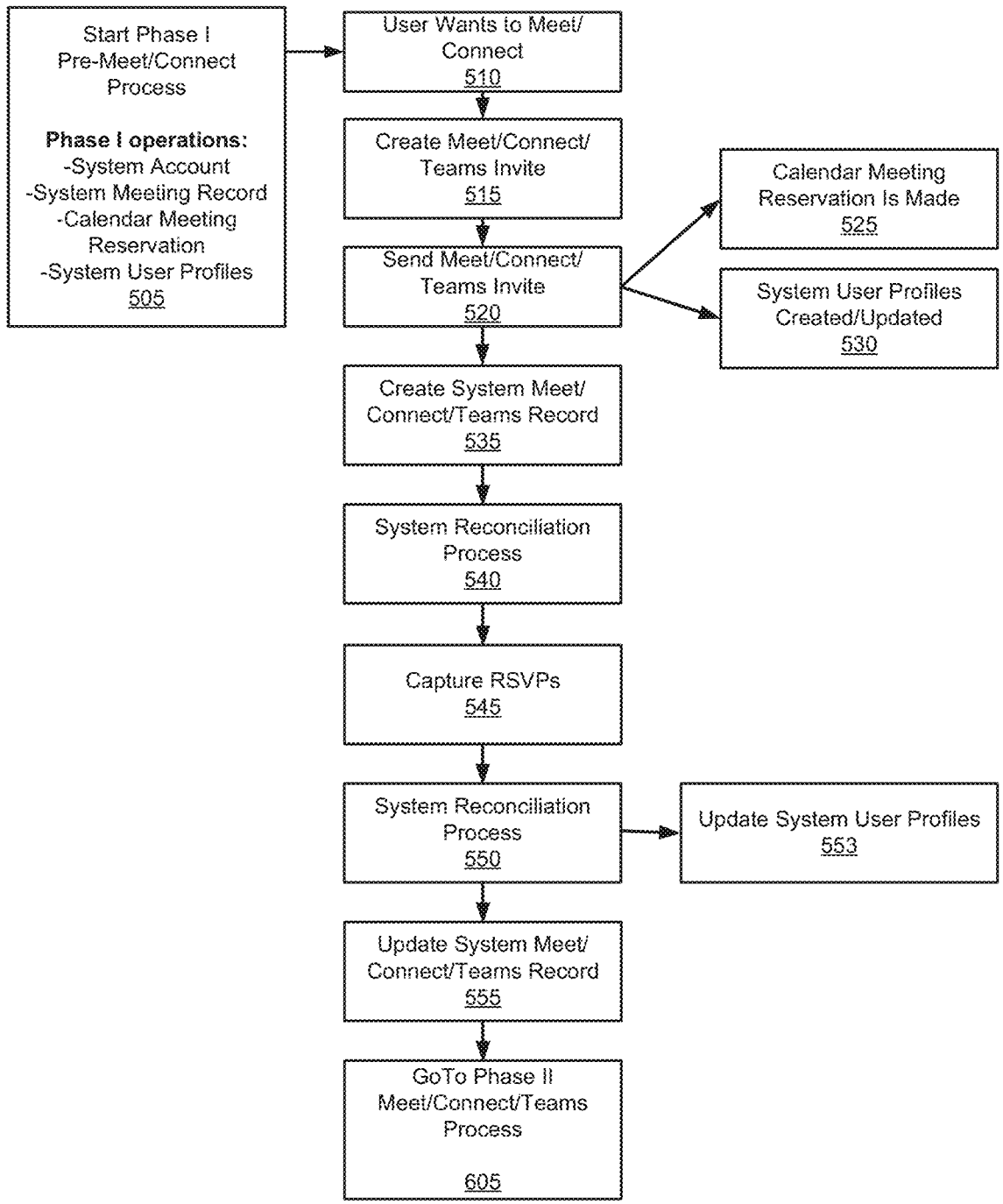
FIG. 5 is a flow chart illustrating phase one including the pre-meet or connect process in accordance with the present method.

Referring now to FIG. 5, the pre-meet/connect module and process 505 (phase I) has various software modules for generating invitations, create meeting records, collect RSVPs, and reconciling information. In the pre-meeting phase, the system 100 (FIG. 1) uses software modules in several ways that facilitate the present invention's solution. First, the system 100 makes it very simple for participants to be invited into the system. This is true for participants who the system 100 has seen before as well as new participants or even participants who are using different contact information than they used before. Participants may be invited to the meeting using a traditional meeting scheduling platform. The meeting and its participants can be added to system 100 simply by including an email address for the system 100 so that the system 100 knows that it has been invited. FIG. 5 illustrates the following processes: user wants to meet/connect (block 510), create meet/connect/teams invite (515), send meet/connect/teams invite (520), create system meet/connect/teams record (535), system reconciliation (and/or resolution with inference) process (540), capture RSVPs (545), system reconciliation (and/or resolution with inference) process (550) with updating user system profiles (and credentials) (553), update system meet/connect/teams record (555), at which point, the next phase is triggered (605).

Figure 6:
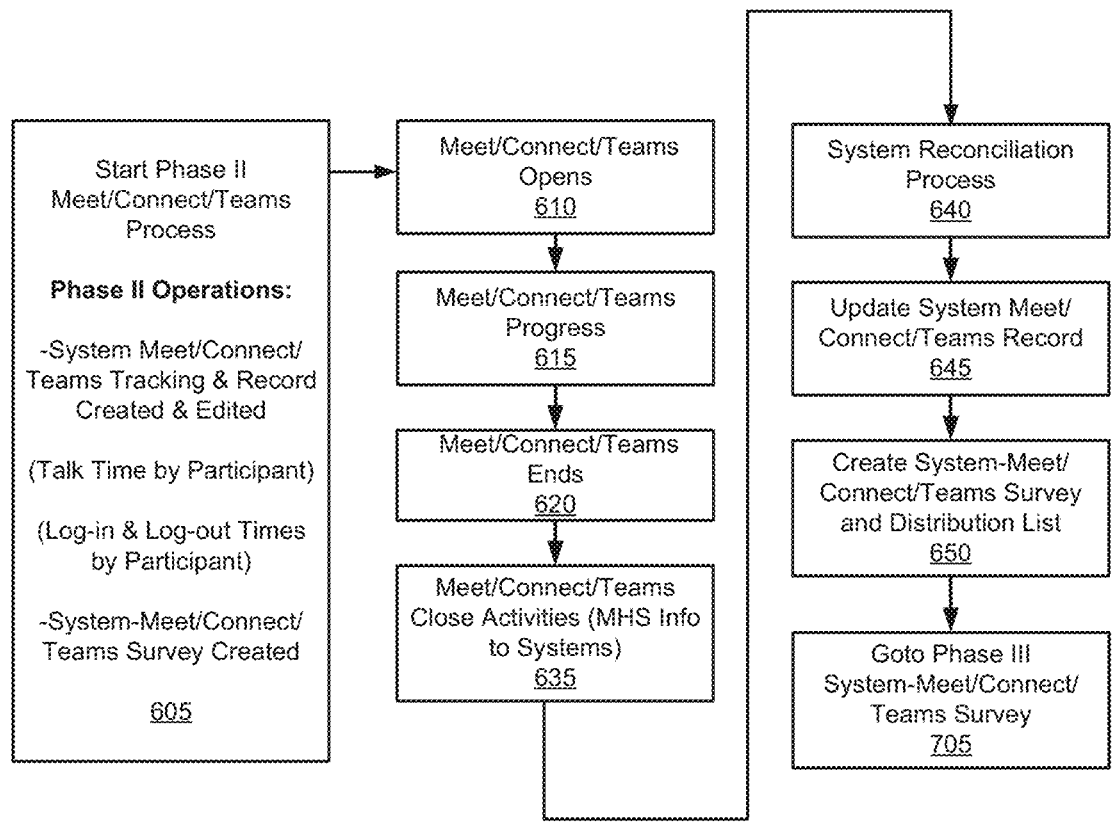
FIG. 6 is a flow chart illustrating phase two including the meet or connect process for creating teams in accordance with the present method.

Referring now to FIG. 6, the system 100 has processes 605 including meet/connect/teams open operations (610) (phase II), meet/connect/teams progress (615), meet/connect/teams ends (620), meet/connect/teams close activity operations (635), system reconciliation process (640), update system meet/connect/teams record (645), create system-meet/connect/teams survey and distribution list (650), with the process proceeding to the next phase of generating surveys (705).

Figure 7:
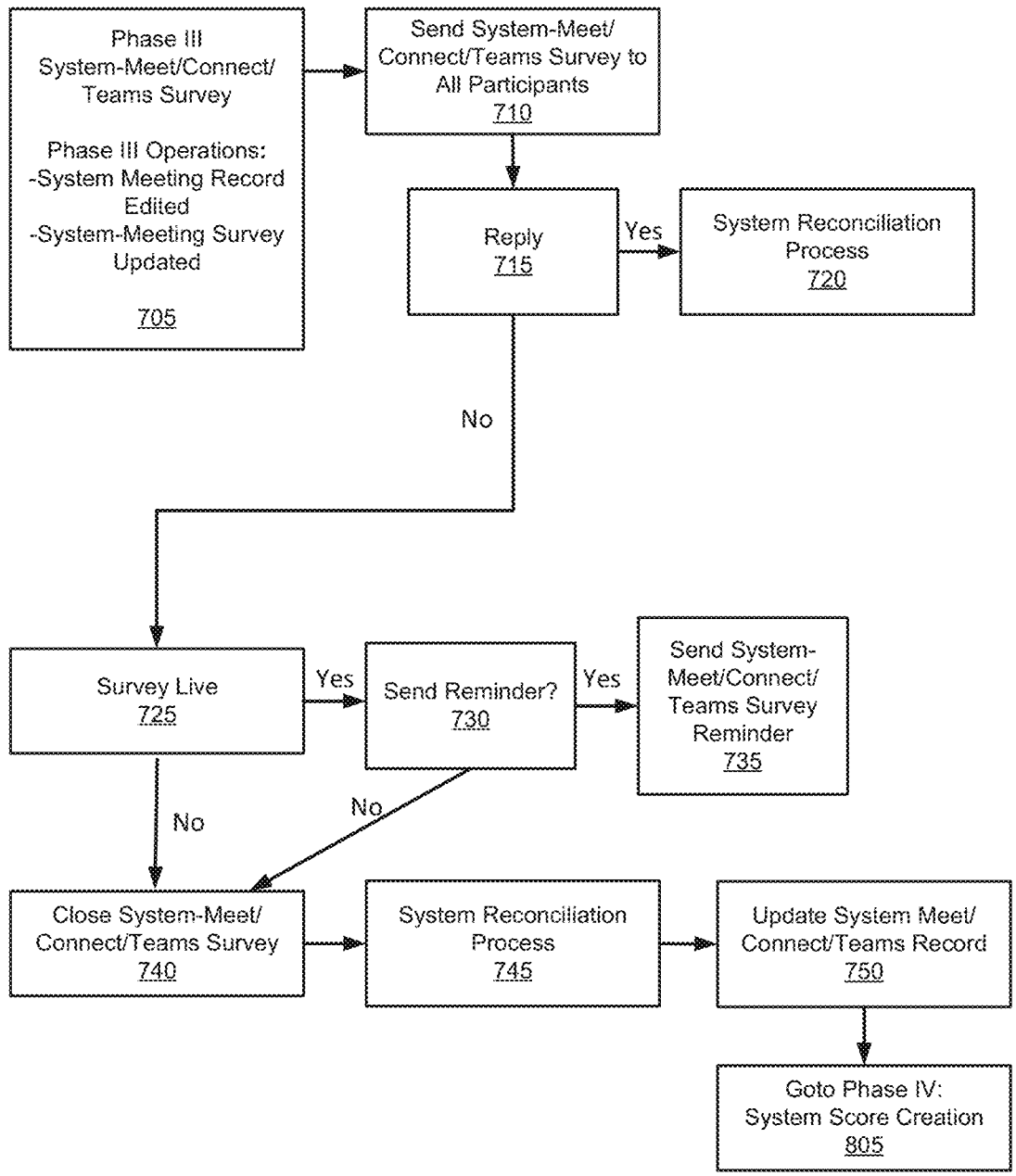
FIG. 7 is a flow chart illustrating phase three including the meet or connect process for performing team survey in accordance with the present system and method.

Referring now to FIG. 7, phase III (705) includes operations for sending system/meeting/connect/teams survey to participants (710), generating a reply (715), system reconciliation process (720) if the answer is affirmative and performing a live survey (725) if the answer is negative. If the answer is affirmative, the process includes sending a reminder (730), and sending a survey reminder (735). If a reminder is not required, the live meeting survey closes (740) and the system reconciliation process takes place (745), followed by updating meeting records (750) and moving the process to phase IV (805). In some instances, unknown users are tagged as new users and given provisional identity credentials for access to an event or meeting session.

Figure 8:
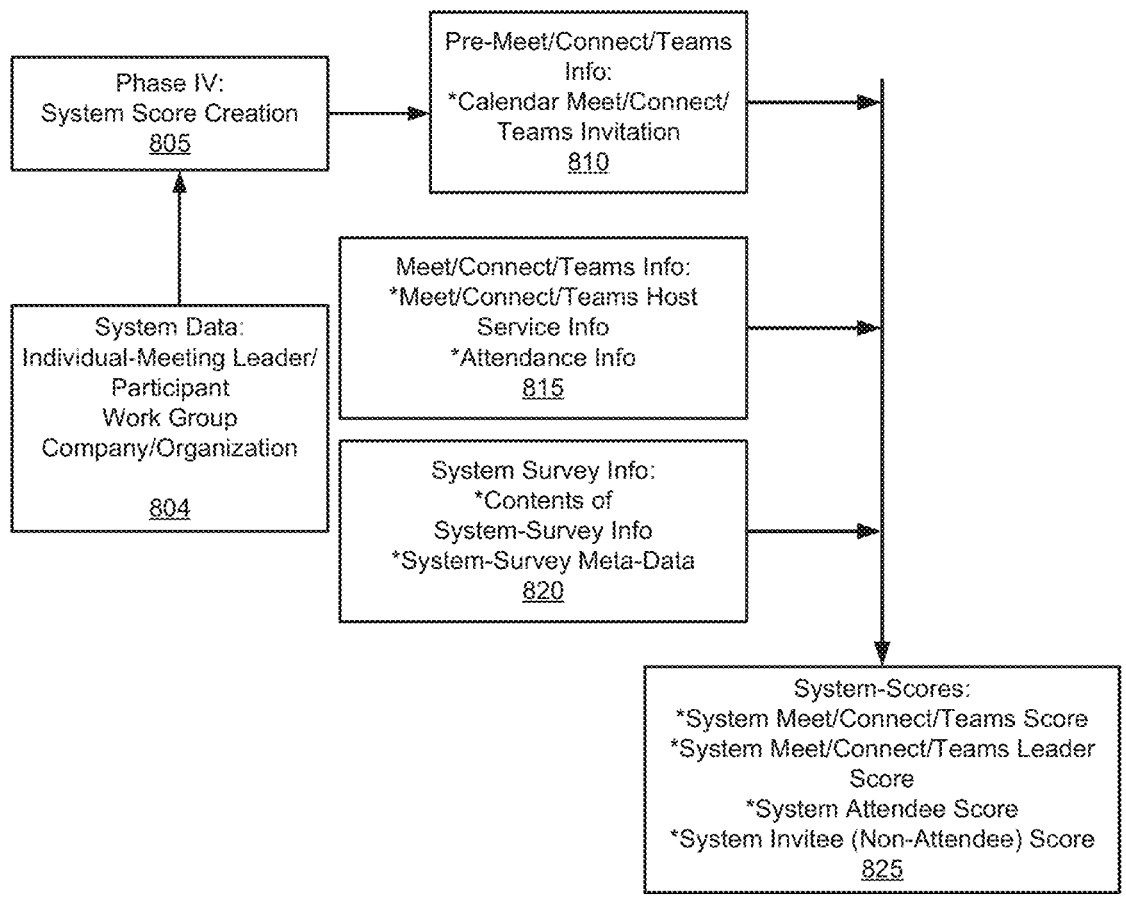
FIG. 8 is a flow chart illustrating phase four of the process including system scores creation based on system data compiled for participants or organizations.
Figure 9:
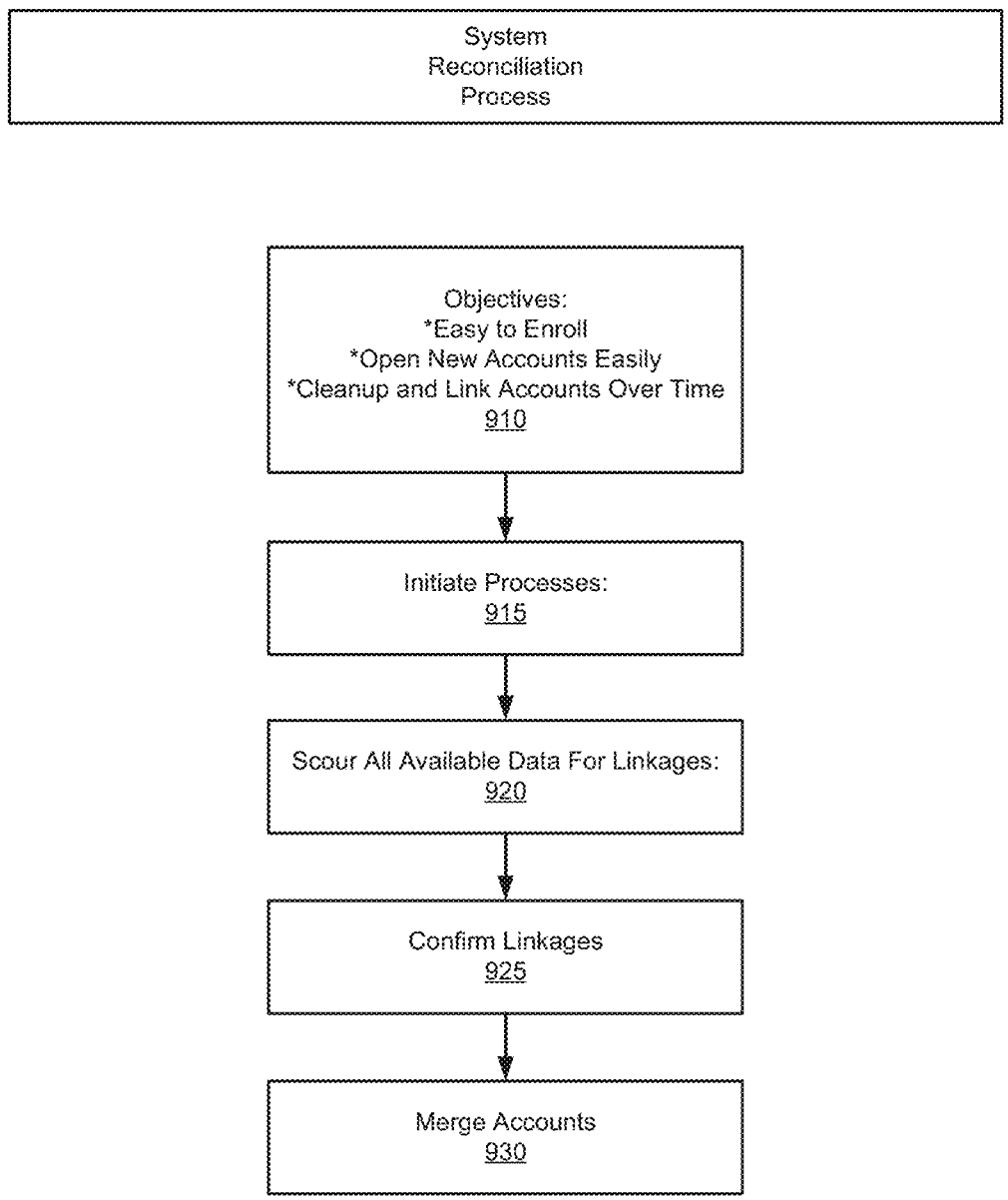
FIG. 9 is a flow chart illustrating the system reconciliation or resolution process in accordance with the present invention.

Referring now to FIG. 8, in some embodiments, phase IV (805) with system data (804) includes calendaring meeting invitation operations (810), connecting operations (815) with known and/or unknown participants, system survey operations (820) and generating system scores (825). FIG. 9 illustrates other operations in accordance with some embodiments, in particular the system reconciliation process. The objectives are indicated (910), processes are initiated (915), all available data for linkages are scoured (920), linkages are confirmed (925) and accounts are merged (930). In some instances, the system 100 identifies participants if known or recognized by comparing identity credentials with those of record and if unknown or unrecognized adds them as provisional participants for subsequent confirmation. Upon later confirmation, the unrecognized participants are added to the records in storage with their current identity credentials. Identity credentials or participant profiles are reconciled or resolved to eliminate duplicate use of identities and to ensure that each participant has a unique identity and presence. Multiple participant presence instances are resolved to combine and identity by a single identity or profile.

Figure 10:
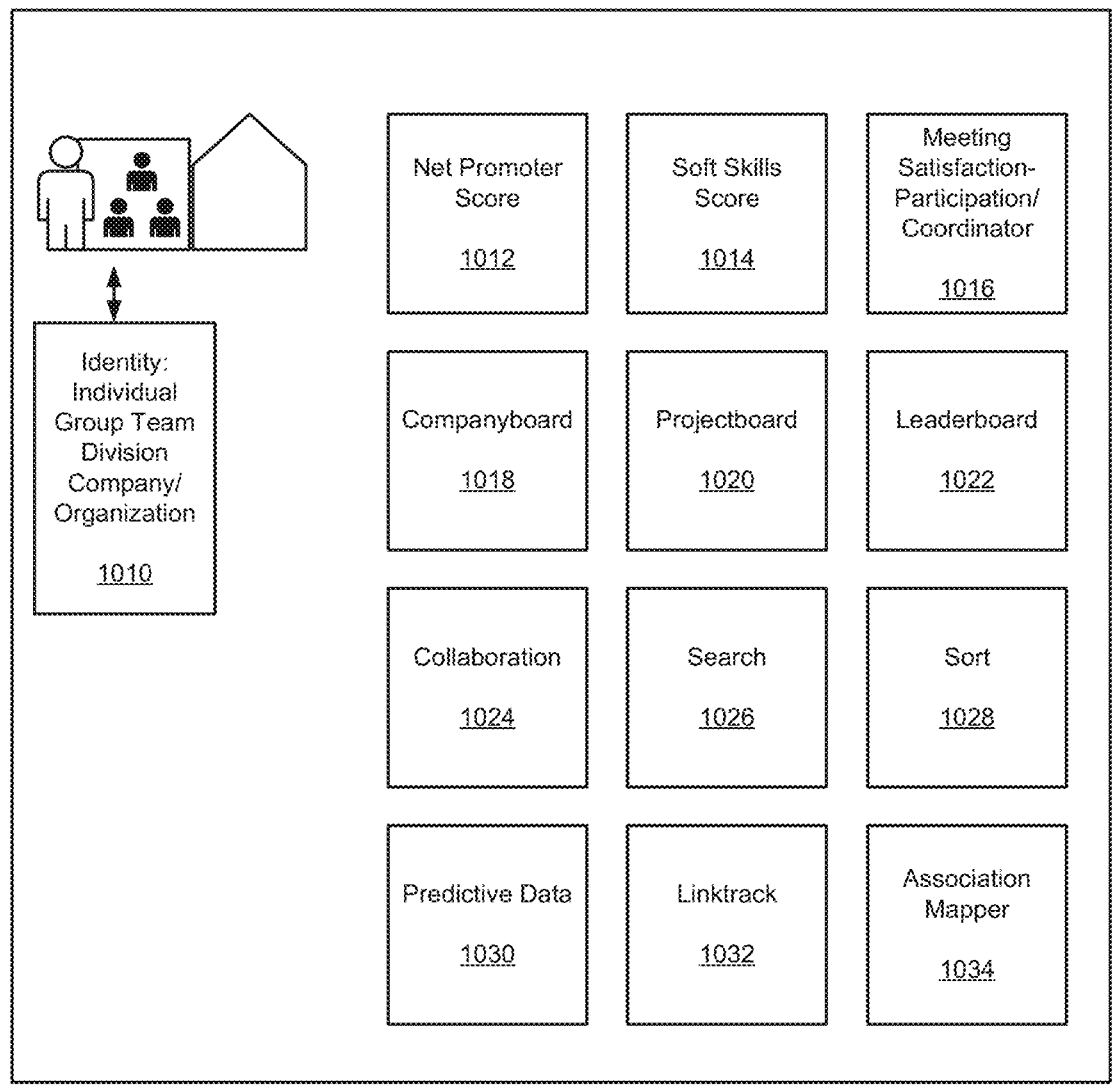
FIG. 10 is an example dashboard for an individual participant, a team, or an organization.

Referring now to FIG. 10, an example dashboard (1010) is illustrated, for any of an individual, group, team division, company, or organization. The dashboard may display the net promoter score 1012, the soft skills score 1014, the meeting satisfaction-participation/coordinator 1016, companyboard 1018, projectboard 1020, leaderboard 1022, collaboration 1024, search 1026, sort 1028, predictive data 1030, linktrack 1032, and association mapper 1034.

Figure 10A:
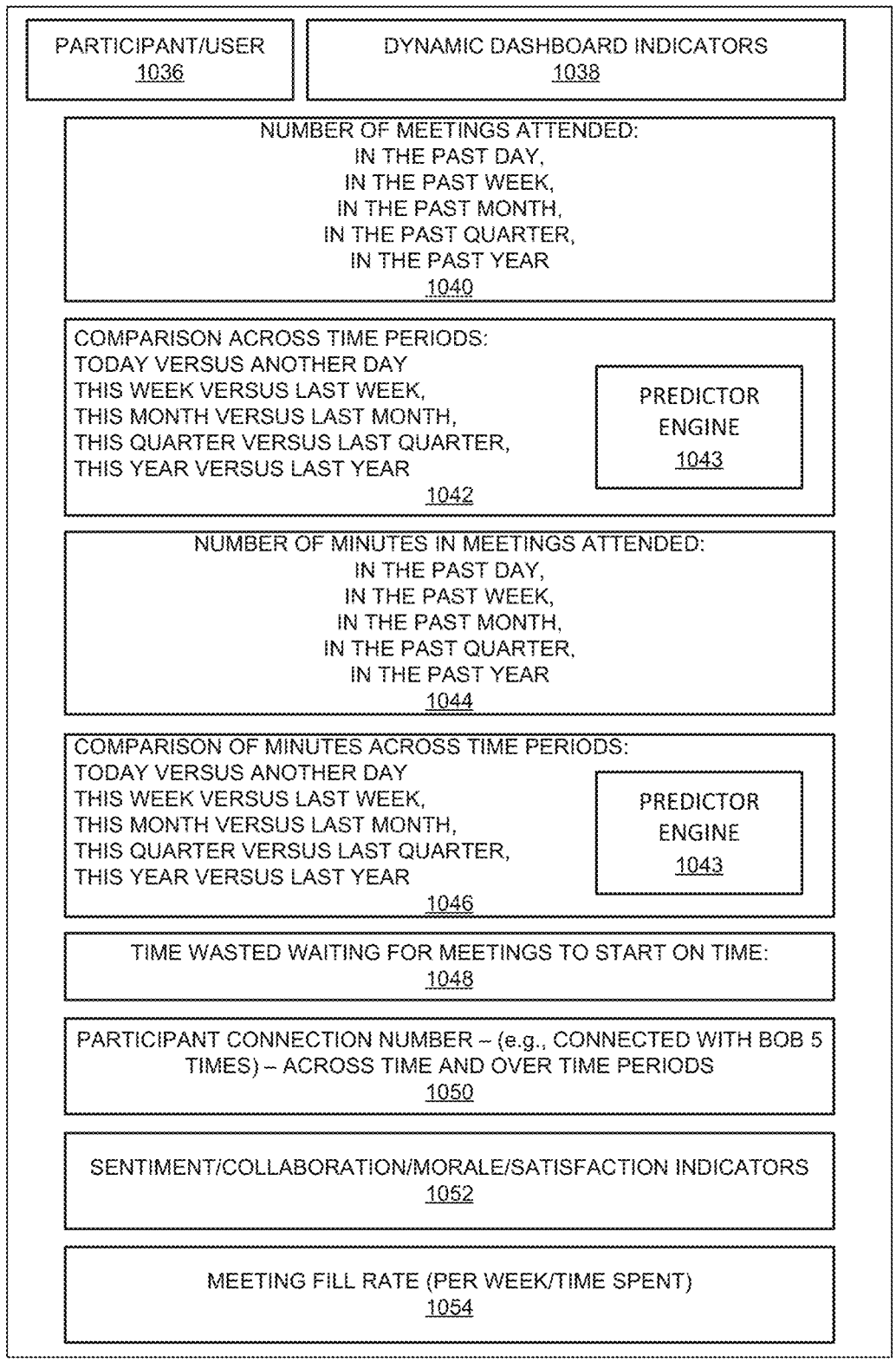
FIG. 10A is an example personal dashboard for each individual participant with dynamic display of data to the individual or team participants (leader or attendees).

FIG. 10A illustrates a dashboard with dynamic display of data for a participant 1036. The dynamic dashboard indicators 1038 include number of meetings attended 1040 (e.g., in the past day or week), comparison across time periods 1042 (e.g., today versus another day) with a predictor engine 1043, a number of minutes in meetings attended 1044 (e.g., in the past day), comparison of minutes across time periods 1046, coupled to the predictor engine (1043). The indicia also display the time wasted for waiting for meetings to start 1048, participant connection number, across time and over time periods (1050), sentiment/collaboration/morale/satisfaction indicators (1052) and meeting fill rate (1054).

Figure 10B:
FIG. 10B is an example notification report in accordance with some embodiments of the present invention.

FIG. 10B illustrates a participant user 1036 and an example notification report 1056 with indicia indicated at 1058 including meeting ID, subject, leader, number of participants, meeting satisfaction, meeting metrics, participant queries, participant answers, acceptance and display, meeting assessment metrics, follow up recommendations, sentiment rating/barometer, one-on-one/group meetings, and insights/recommendations.

In operation, when the present system 100 sees that it has been invited to the meeting, the system 100 harvests the email addresses or other contact information for the other participants. These indicia for the participants are reconciled with existing records of prior participants and meetings to determine if the system 100 has seen them before or if they are genuinely new. This process makes adding new participants very simple. The system 100 also tracks participants as they use different or changing contact information. The present system 100 can also track participants regardless of what meetings they are in and what types of meetings they are, independent of the "situation" or company associated with their meetings. If the system 100 finds that it has genuinely new participant solicitations, they can be sent to have them added to the system 100 or they are kept as guests.

Once the system 100 determines that it has been included in a meeting invitation, a record is created to hold information related to the upcoming meeting. It should be recognized that meetings may be scheduled from anywhere (e.g., mobile devices etc., as shown in FIG. 1) In operation, the system 100 or the hosting platform or each device (or in combination) creates an object representative of the meeting request and assigns the object a global identification number which uniquely identifies the object to other devices which encounter the object. Other devices which encounter the meeting request are capable of identifying it as a unique meeting request in order to alleviate the problem of duplicate meeting request transmissions. To track emails and/or invitations, an electronic mail application or calendar application on the mobile/other device obtains a fully qualified electronic mail address for the potential attendees from an address book or directory stored or prior use. The hosting platform or system 100 or devices create the meeting object and the electronic mail meeting request object using a set of properties which are supported by a plurality of Personal Information Managers (PIMs) that may receive the objects. This provides compatibility with an increased number of devices which are likely to encounter the objects. Localizers implement a plurality of templates (for surveys) used in formatting the properties of the objects associated with the meeting request. A data stream representative of the meeting request is parsed by the device and placed in pre-defined fields in the appropriate templates for surveys or whatever. The device (mobile/computer) includes an application program and object store. All devices are linked to the system 100 or the platform hosting the meetings or meeting platform in a distributed environment by one of a plurality of connection mechanisms.

In one example, the application program on the device is a personal information manager (PIM) which supports electronic mail messaging, scheduling and calendaring and an address book containing contact information. PIM applications are not always integrated. For instance, some scheduling programs do not contain electronic mail features, but interface with whatever electronic mail program is provided, and vice versa. PIM solutions (whether it be a single application, a single integrated application or multiple interfaced applications) can be configured to support a wide variety of other features, such as task lists and personalized address books in project management, to name a few. Object store is a memory which is configured to store a plurality of individual records or objects, each comprising a plurality of fields or properties related to the inventive features.

Once the system 100 determines that it has been included in a meeting invitation, by the meeting module, a record is created to hold information related to the upcoming meeting.

During the meeting, the meeting module 238 accesses previously created meeting records. During the meeting, information is collected on when participants enter and leave, when they speak, and any other information concerning how the participants interact. After, the meeting module 238 executes a meeting close out and further executes algorithms to analyze the resulting records. Under control of the meeting module 238, a simple survey is generated based on the meeting record that is sent out to each of the participants and a special survey is generated for the host participant or meeting leader.

The survey that is generated is meant to favor ease of response over detail. In one embodiment, the survey collects a limited set of information from three to ten questions. The goal is to have maximum participation rather than a few highly detailed surveys. One goal is to solicit information regarding the performance of the other participants at the meeting. The intent is to correlate the surveys with the participants in order to create a participant score that is retained from meeting to meeting. It is also possible to learn enough from these surveys to see which participants work well together. It is also possible to learn some of the relative strengths and weaknesses of the participants. The system 100 also generates a score for the meeting itself based on these surveys. Using these various scores and meeting records, the system 100 generates a meeting graph that maps the interactions between different participants over the span of time and over many meetings. In some embodiments, in addition to standard questions in a survey, there is an interactive element that enables the system to recommend to meeting leaders, additional or customized questions that they may add to focus on areas of further interest and developed from prior meeting responses. In some instances, the interactive element may be configured to advise them that the survey questions being proposed may be deficient, inappropriate, unclear, or otherwise not address an intended purpose in the best way.

In some embodiments, a survey may be structured with a section of questions that are required. For example, the questions may include any one or more of the following:

"1. Did the meeting address your specific needs?"
"2. What made the most valuable contributions? Select as many people as you like?"
"3 What would you rate the meeting overall (on a scale of 1 to 5, with 5 being the highest—a mess, somewhat helpful, okay, very productive, amazing)."

In some embodiments, a survey may be structured with a sectional that is optional. For example, the questions may include any one or more of the following:

"1. Who asked useful questions?"
"2. Who drove the meeting forward?"
"3. Who said something interesting?"
"4. Who helped bring others into the conversation?"

The post-meeting module 240, executes algorithms to collect and analyze the surveys. This post-meeting module also updates the record of the meeting. The scores of each of the participants are updated. Finally, the reports module 248 creates a report for each of the participants and the meeting leader or host (in some instances a host may be someone other than the meeting leader who is designated to initiate) detailing the meeting as well as detailing for the participants how they might adjust their behavior in future meetings. In some embodiments, a report is created for a meeting or event that considers actual event metrics. As one example, the report may show a metric based on what occurred during the meeting, for example, the percentage of users who arrived on time versus those who did not. As another example, a "talk-time-per-participant" may reflect participation levels. Participation levels may be correlated against another metric that the system knows about the participant (such as department, on-time arrival, score, or the like). Yet another example metric may consider survey completion rate. Participation levels reflect more than one metric at a time.

Over time participants receive useful feedback from which they can choose to alter their behavior in meetings.

Meeting leaders can look at participant scores to help anticipate how to set up a useful and productive meeting without forcing the participants into a one-size fits all solution for all meetings. It should be recognized that ratings reflect the norms and culture of the individual company, situation, group as participants typically respond to the survey within the context of the company, situation, or world view rather than an outside software's opinion of what is right or wrong; in other words, the one-size fits all model. Participants can be added to the system by simply including the system's email address to invitations to the meetings. The system includes learning algorithms that may be configured to incrementally supplement the user packet data by each individual user. Either all or a portion of the user packet data are used by the system to adapt to each user's meeting style, format, and culture. The reports module 248 (in FIG. 2) creates reports using any one or more of the following sources: calendar invitation information, meeting hosting service information, survey information, meeting report, meeting score, and participant score.

The graphical display of a meeting survey as illustrated in FIG. 11 shows visual icons: 1101 (system/company name or logo), 1102 (settings), 1103 (minutes remaining), 1104 (date and/or time), 1105 (user name or identity), 1106 (meeting survey), 1107 (meeting survey question), 1108 (meeting survey question 1 possible responses), 1109 (meeting survey question 2 valuable contributions), 1110 (meeting survey response meeting participants), 1111 (available responses swipe for additional meeting participants), 1112 (survey question 3 rate the meeting), 1113 (rate the meeting survey responses), 1114 (submit button).

The graphical display of part two of the meeting survey (with questions that change over time) illustrated in FIG. 12 shows visual icons including: 1201 (system/name or logo), 1202 (settings), 1203 (minutes remaining), 1204 (date and/or time), 1205 (user name or identity), 1206 (meeting survey), 1207 (survey question 4 useful questions), 1208 (survey responses meeting participants with swipe for more participants), 1209 (survey question 5 moved meeting forward), 1210 (survey responses meeting participants with swipe for more participants), 1211 (survey question 6 something surprising), 1212 (survey responses meeting participants with swipe for more participants), 1213 (survey question 7 bring others in), 1214 (survey responses meeting participants with swipe for more participants), 1215 (DONE! button), 1216 (Skip these questions link).

The graphical display of the Meeting Report for Non-Recurring Meeting for All Participants illustrated in FIG. 13 shows visual icons including: 1301 (system/name or logo), 1302 (settings), 1303 (user's picture), 1304 (date and/or time), 1305 (user name or identity), 1306 (meeting report), 1307 (mail notification), 1308 (time tracker), 1309 (participation metric), 1310 (survey response), 1311 (meeting rating), 1312 (cross meeting ranking—focused on meeting ranking), 1313 (cross-meeting ranking—focused on a participant), 1314 (artificial intelligence/system insights), 1315 (survey feedback), and 1316 (Got it!), 1317 (screen swipe for more artificial intelligence/system insights), 1318 (screen swipe for more artificial intelligence/system insights). It should be recognized that the time tracker 1308 shows what percentage of attendees arrived at the start of the meeting and within [5] minutes of the scheduled start time. Alternatively, the 5 minutes window may be 7 minutes or any other desired number. This designated period that is pre-set (by a function that the meeting leader/host can change to conform to his/her particular situation) is also referred to as the "fill rate" period for an event or meeting. This serves as a proxy for starting on time and is an important metric. In some instances, this may be used as a "starting on time" metric. The icon 1315 for survey feedback is another artificial/intelligence insight that informs the users that there is a correlation between completing the survey and how the users are rated by their colleagues (even though the colleagues rate them without knowing whether or not the user has completed the survey. This can only be correlated with artificial intelligence system insights.

Another graphical display of the Meeting Report for Recurring Meeting for All Participants illustrated in FIG. 14 shows visual icons including: 1401 (system/name or logo), 1402 (settings), 1403 (user's image), 1404 (date and/or time), 1405 (user name or identity), 1406 (meeting report), 1407 (mail notification), 1408 (time tracker), 1409 (average recurrence rate for all associated recurring meetings; in some instances the average may be a median), 1410 (participation metric), 1411 (survey response percentage this meeting), 1412 (average participation percentage calculator across associated recurring meetings; in some instances the average may be a median), 1413 (survey response average across recurring meetings), 1414 (meeting rating), 1415 (recurring meeting rating), and 1416 (meeting metrics), 1417 (recurring meeting trends), 1418 (artificial intelligence/system insight—participation metric); 1419 (screen swipe—more artificial intelligence/system insights), and 1420 (Got it!). The icons 1416-1419 are configured to provide soft skills assessments, trends, and predictors of behavior based on artificial intelligence/system insights. In some instances, icons 1413-1416 may be variously configured to provide meeting metrics that are tied to survey response questions. As illustrated, one is for a current meeting, the other relates across associated recurring meetings. Yet others, for example, 1414 and 1415 may be tied to different survey questions. It should be recognized that the time tracker 1408 shows what percentage of attendees arrived at the start of the meeting and within 5 minutes of the scheduled start time. Alternatively, the 5 minutes window may be 7 minutes or any other desired number. This designated period is also referred to as the "fill rate" period for an event or meeting. This serves as a proxy for starting on time and is an important metric. In some instances, this may be used as a "starting on time" metric. In some instances, the icon 1415 for survey feedback is another artificial/intelligence insight that informs the users that there is a correlation between completing the survey and how the users are rated by their colleagues (even though the colleagues rate them without knowing whether or not the user has completed the survey. This can only be correlated with artificial intelligence system insights.

Another graphical display of the Meeting Report for Recurring Meeting for Meeting Leader illustrated in FIG. 15 shows visual icons including: 1501 (system/name or logo), 1502 (settings), 1503 (user's picture), 1504 (date and/or time), 1505 (user name or identity that identifies the Meeting Leader), 1506 (meeting report or representative of what is displayed on the screen), 1507 (mail notification), 1508 (time tracker), 1509 (time metric—median recurrence rate for all associated recurring meetings; in some instances the average may be a median), 1510 (participation tracker), 1511 (survey response rate this meeting), 1512 (participation metric—average percentage calculator), 1513 (survey response rate—median percentage calculator), 1514-1517 (survey questions 1 and 3 of the first survey screen shown in FIG. 1), 1518-1519 (survey questions 2 (FIG. 1) and the four questions in FIG. 2; these are soft skills-related and provide real-time assessment, trend, behavior projections, and insights on how to improve soft skills), and 1520 (Got it!). The screenshot illustrated here, with the visualization 1518 and 1519 shows a comparison between the most recent meeting and the other recurring meetings associated with this most recent meeting of survey questions associated with the soft skills of the meeting participants. It is the basis of artificial intelligence and system analysis that is used to generate soft skills assessments, predictions of future behavior of the participants individually and as a team, and measures behavior change over time. This feature is key feature of the present invention. It should be recognized that the time tracker 1508 shows what percentage of attendees arrived at the start of the meeting and within 5 minutes of the scheduled start time. Alternatively, the 5 minutes window may be 7 minutes or any other desired number. This designated period is also referred to as the "fill rate" period for an event or meeting. This serves as a proxy for starting on time and is an important metric. In some instances, this may be used as a "starting on time" metric. The icon 1515 for survey feedback is another artificial/intelligence insight that informs the users that there is a correlation between completing the survey and how the users are rated by their colleagues (even though the colleagues rate them without knowing whether or not the user has completed the survey. This can only be correlated with artificial intelligence system insights.

Another graphical display of the Meeting Report for Recurring Meeting for All Participants illustrated in FIG. 16 shows visual icons including: 1601 (system/name or logo), 1602 (settings), 1603 (user's picture), 1604 (date and/or time), 1605 (user name or identity that identifies the Meeting Leader), 1606 (meeting report or representative of what is displayed on the screen), 1607 (mail notification), 1608 (time tracker), 1609 (time metric—median recurrence rate for all associated recurring meetings; in some instances the average may be a median), 1610 (participation tracker), 1611 (survey response rate this meeting), 1612 (participation metric—average percentage calculator), 1613 (survey response rate—median percentage calculator), 1614-1616 (survey questions 1 and 3 of the first survey screen shown in FIG. 1), 1614 (meeting rating), 1615 (recurring meeting rating), and 1616 (all leader meeting rating), 1617 (attendance analysis—this meeting vs. all meetings led), 1618 (survey response graph—this meeting and recurring meetings); and 1619 (Got it!). The screenshot illustrated here, with the visual icon 1615 (recurring meeting rating) is from the perspective of a meeting leader and shows a comparison between the most recent meeting and the other recurring meetings associated with this most recent meeting. In some embodiments, it also shows a comparison among this meeting and the average of the recurring meetings that this meeting is associated with, and the average of all meetings that the meeting leader has led. This feature is a key feature of the present invention.

Figure 17:
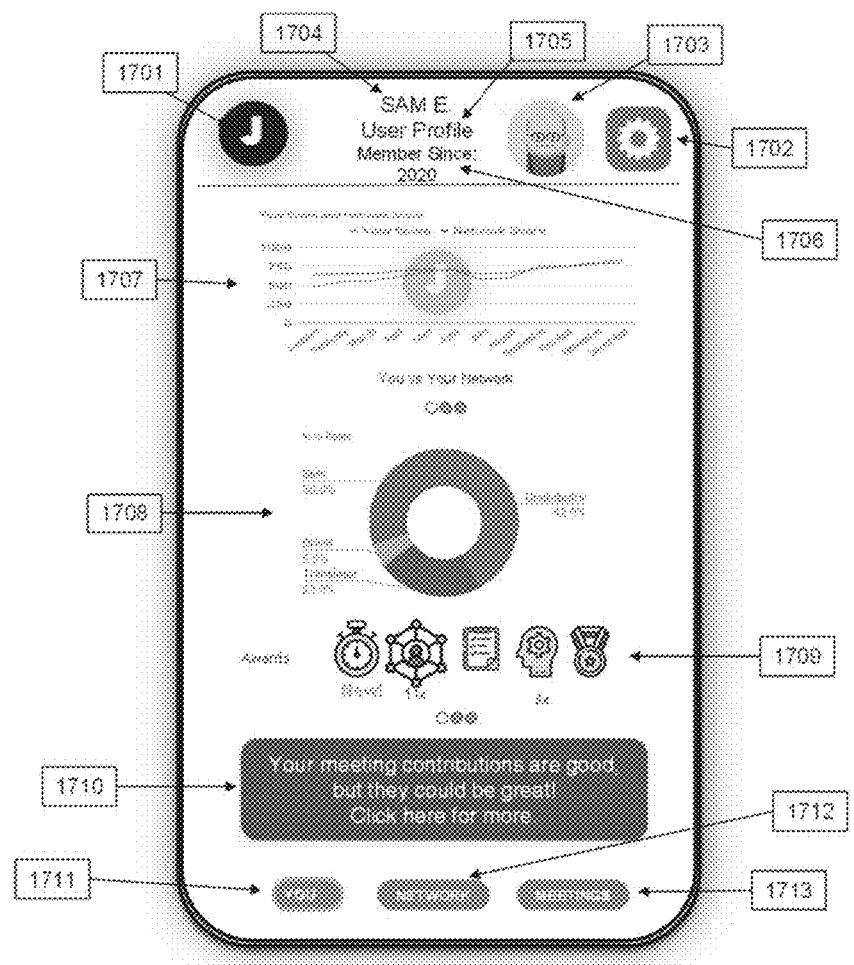
FIG. 17 is a graphical illustration of a graphical user interface (display) of a user profile overview.

Another graphical display of an example User profile is illustrated in FIG. 17 to show visual icons including: 1701 (system/name or logo), 1702 (settings), 1703 (user image), 1704 (user name), 1705 (user profile), 1706 (member since/history), 1707 (graph comparing user's score with others in user's network), 1708 (donut chart—comparison of user to user's network against key contribution skills, such as soft skills), 1709 (awards—user earned over time with swipe for more), 1710 (contribution feedback and insights based on artificial intelligence/system insights), 1711 (you—view), 1712 (network—view), and 1713 (meetings—view). The screenshot illustrated here with the visual icons 1707, 1708, 1711, 1712, and 1713 shows a perspective comparison for user as individual, across user's network, and across all user's meetings. This is a key feature of the present invention. The screen shot illustrated here with the visual icon 1709 shows awards user has earned across all of their meetings, not just the current meeting. This is a key feature of the present invention. The screenshot illustrated here with visual icon 1710 provides insights to help user improve their behavior and performance based on actual information from current meetings, recurring meetings, and all of user's meetings. This is a key feature of present invention. The screenshot illustrated here with the visual icon 1708 shows one visual illustration of the system's floating score or data packet generated for the user, organization or a particular team within the organization. This is a key feature of present invention.

Figure 18:
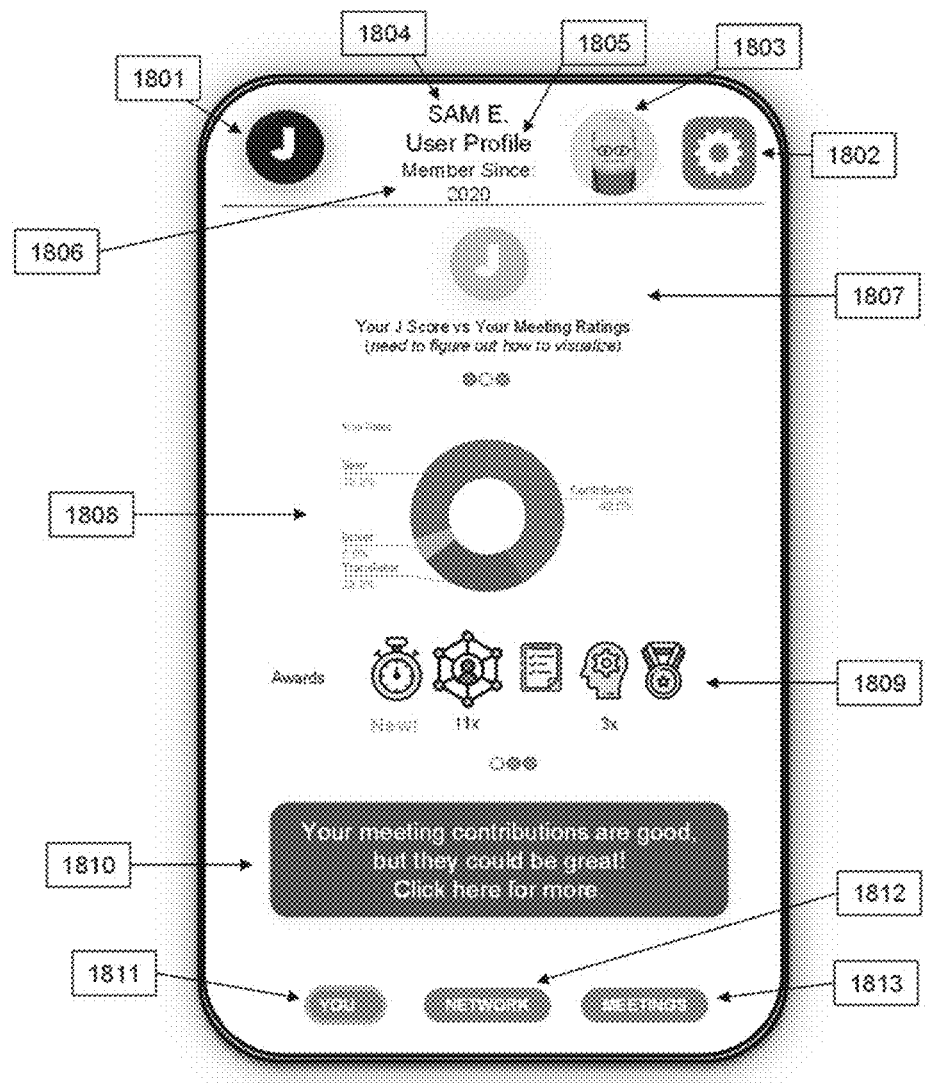
FIG. 18 is a graphical illustration of a graphical user interface (display) showing another view of a user profile used in the present system.

Another graphical display of another example User profile is illustrated in FIG. 18 to show visual icons including: 1801 (system/name or logo), 1802 (settings), 1803 (user picture), 1804 (user name), 1805 (user profile), 1806 (member since/history), 1807 (graph and/or image of user score against user meeting ratings), 1808 (donut chart comparison of user to user's network against roles in meetings), 1809 (awards—user earned over time with swipe for more), 1810 (contribution feedback and insights based on artificial intelligence/system insights)), 1811 (you—view), 1812 (network—view), and 1813 (meetings—view). The screenshot illustrated here with the visual icons 1807, 1808, 1811, 1812, and 1813 shows a perspective comparison for user as individual, across user's network, and across all user's meetings. This is a key feature of the present invention. The screen shot illustrated here with the visual icon 1809 shows awards user has earned across all of their meetings, not just the current meeting. This is a key feature of the present invention. The screenshot illustrated here with visual icon 1810 provides insights to help user improve their behavior and performance based on actual information from current meetings, recurring meetings, and all of user's meetings. This is a key feature of present invention. For 1808, please see description above.

Figure 19:
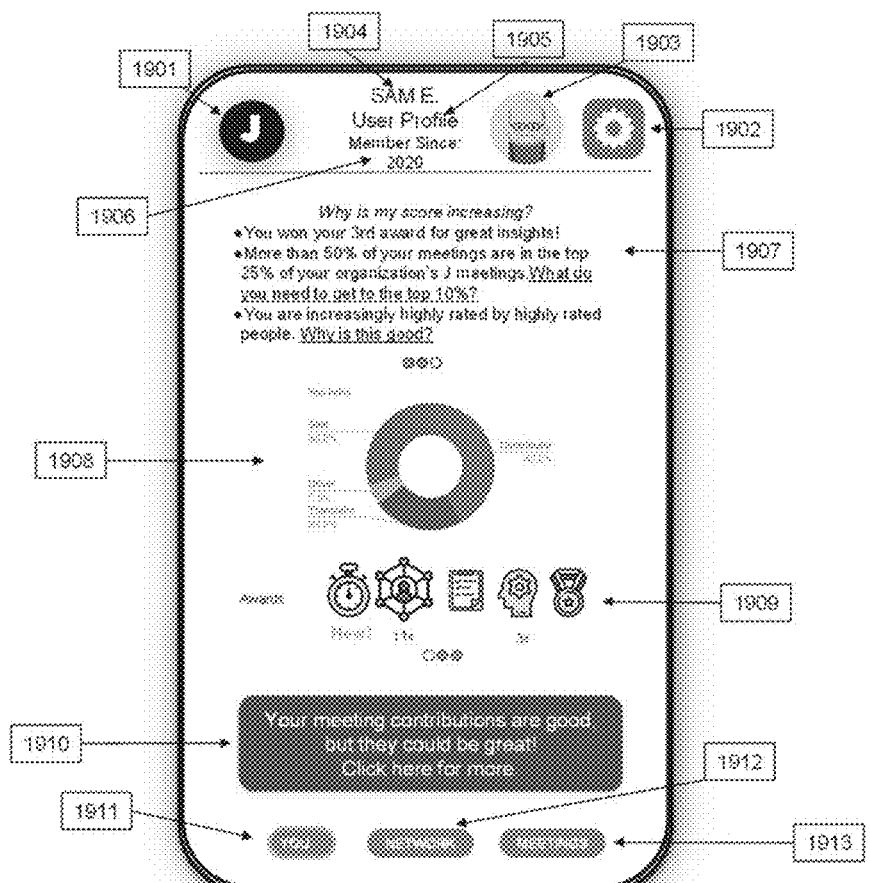
FIG. 19 is a graphical illustration of a graphical user interface (display) showing yet another view of a user profile used in the present system.

Another graphical display of another example User profile is illustrated in FIG. 19 to show visual icons including: 1901 (system/name or logo), 1902 (settings), 1903 (user picture), 1904 (user name), 1905 (user profile), 1906 (member since/history), 1907 (query on score increase artificial intelligence/system analytics and insights on user score and trends), 1908 (donut chart—user roles in meetings), 1909 (awards earned at meetings with swipe for more), 1910 (contribution feedback based on artificial intelligence/system analytics), 1911 (you—view), 1912 (network—view), and 1913 (meetings—view). The screenshot illustrated here with visual icon 1907 shows user information about user's score, trends, comparison to others, and insights on why and meaning of the user score and what user can do to increase user score. This is a key feature of present invention. For 1908, please see description above.

Figure 20:
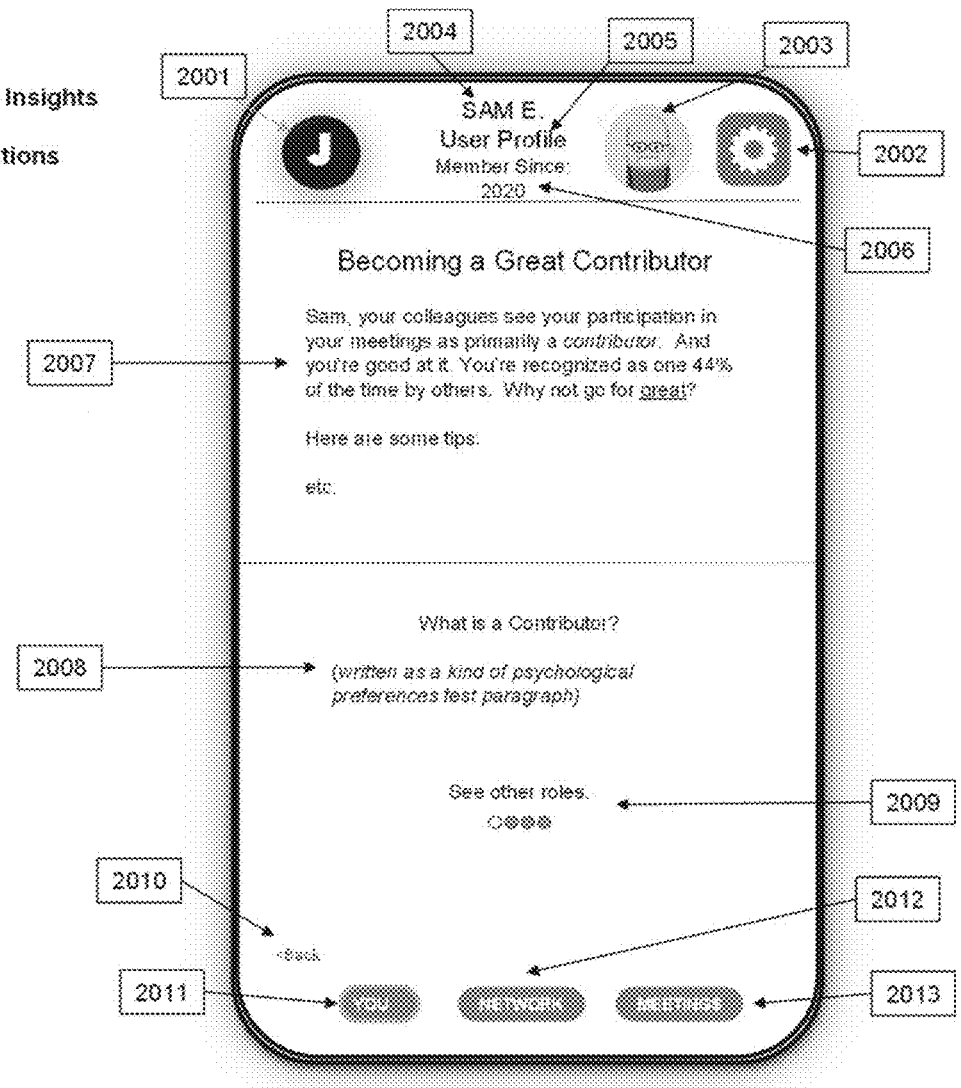
FIG. 20 is a graphical illustration of a graphical user interface (display) of a user profile with insights and recommendations.

Another graphical display of another example User profile is illustrated in FIG. 20 to show visual icons including: 2001 (system/name or logo), 2002 (settings), 2003 (user picture), 2004 (user name), 2005 (user profile), 2006 (member since/history), 2007 (contributor tip with swipe for more), 2008 (contributor personality type), 2009 (reference to other roles with swipe for more), 2010 (back), 2011 (you—view), 2012 (network—view), and 2013 (meetings—view). The screenshot illustrated here with visual icon 2007 shows user insights and tips relative to their user score, based on artificial intelligence/system analytics. This is a key feature of present invention. This screenshot illustrated here with visual icons 2008 and 2009 show information associated with contributor roles (see donut icon 1908, 1808 and other figures). This is a key feature of the present invention.

Figure 21:
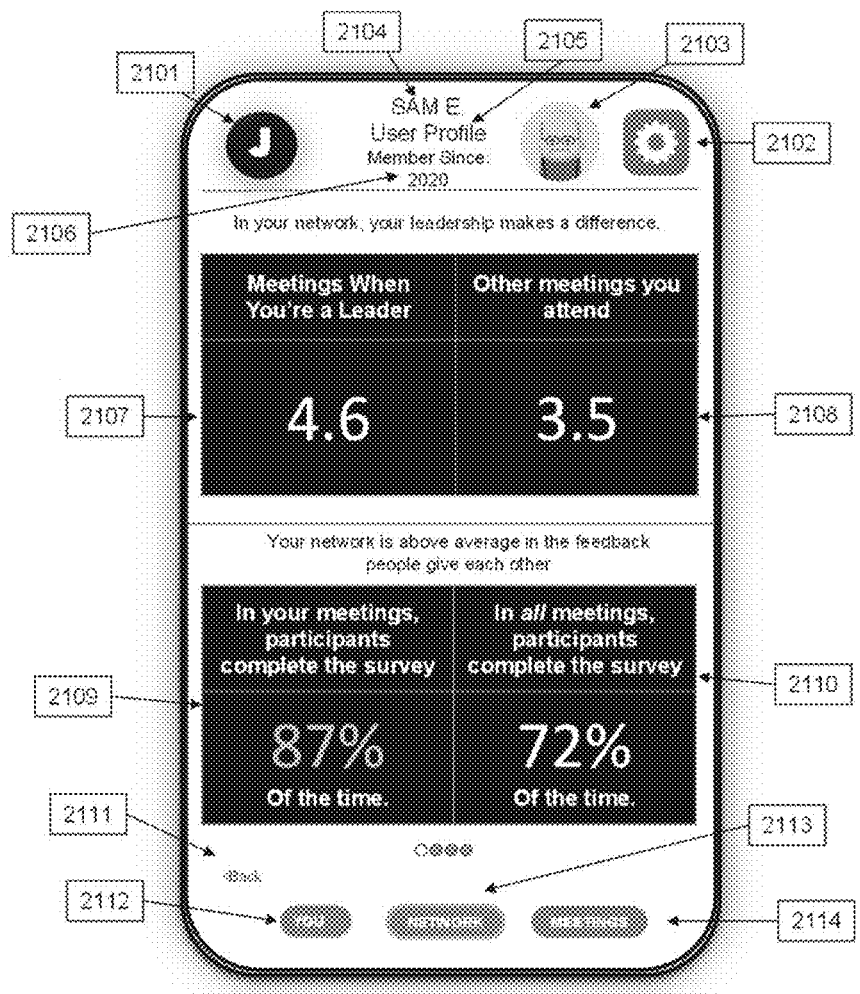
FIG. 21 is a graphical illustration of a graphical user interface (display) of a user profile for a meeting leader as used in the present system.

Another graphical display of another example User profile for a meeting leader is illustrated in FIG. 21 to show visual icons including: 2101 (system/name or logo), 2102 (settings), 2103 (user image), 2104 (user name), 2105 (user profile), 2106 (member since/history), 2107 (leadership tracker—for example meeting ratings for meetings led), 2108 (meeting metrics—all meetings meeting leader attends and not leads), 2109 (survey completion metrics for meeting leader leads), 2110 (survey completion rate for all meetings), 2111 (back and swipe for more metrics), 2112 (you—view), 2113 (network—view), and 2114 (meetings—view). This screenshot illustrated here with visual icons 2107, 2108, 2109, 2100, 2111 show information associated with meeting leader leadership and effectiveness for meeting leader's meetings compared to meetings in general. This is a key feature of the present invention. The icons 2107, 2108, 2109, 2110, and 2111 allows for comparisons to be drawn on meeting leaders, in particular the quality and ratings of the particular meetings led by each as compared with meetings in general and/or meetings he or she attended or participated in when not the leader.

Figure 22:
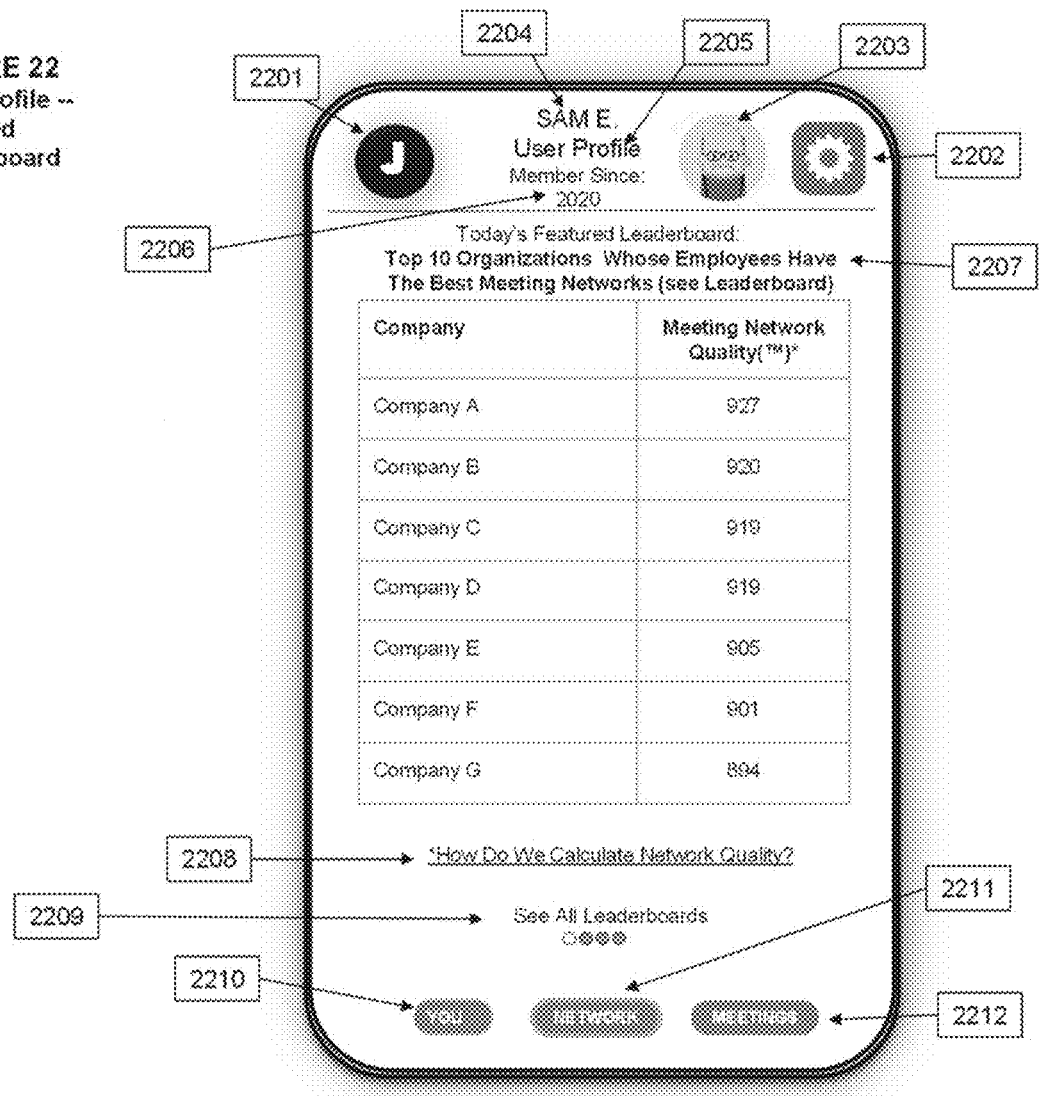
FIG. 22 is a graphical illustration of a graphical user interface (display) of a user profile showing an example leaderboard comparing company scores.

Another graphical display of another example User profile for a meeting featured leaderboard is illustrated in FIG. 22 to show visual icons including: 2201 (system/name or logo), 2202 (settings), 2203 (user image), 2204 (user name), 2205 (user profile), 2206 (member since/history), 2207 (featured leaderboard), 2208 (network quality), 2209 (leaderboards), 2210 (YOU—view), 2211 (network—view), and 2212 (Meetings—view). The network quality is one metric that may be used to compile a score for a company or organization. The network quality is based on an algorithm that analyzes the scores, ratings or the like of people who a particular user has participated with in a meeting or people in a particular user's reference group (e.g., all director-level people in the company where the user works or everyone at the company where the user works including all employees or consultants (on specific projects or by industry)). The network quality allows users to evaluate where they stand relative to their reference group. In some cases, users may evaluate how a potential new hire may perform and/or how their employees, consultants, staff are performing. This is a key feature of the present invention.

Figure 23:
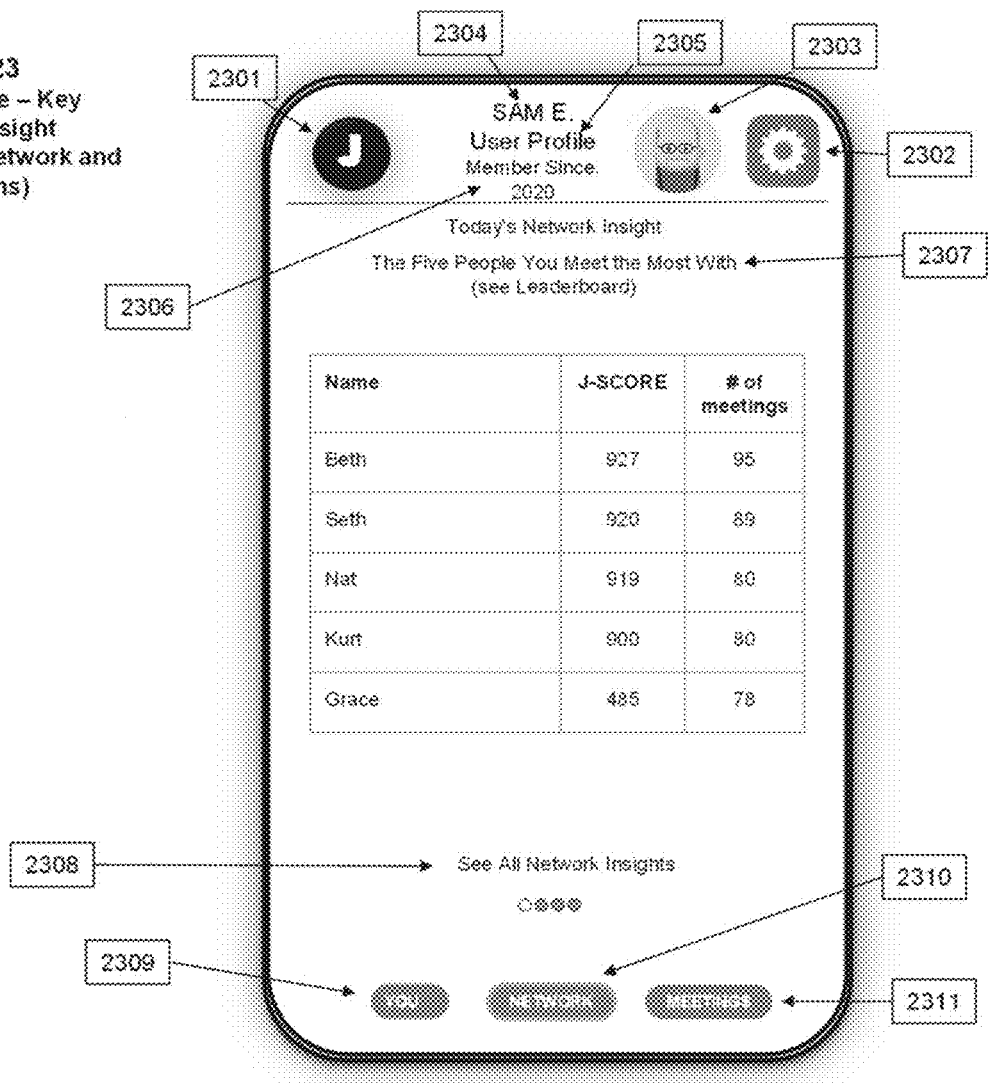
FIG. 23 is a graphical illustration of a graphical user interface (display) of a user profile illustrating key network insight (current network and connections). This illustration shows people frequently encountered but not within a particular "network." This illustration demonstrates slicing the information based on one axis-frequency of meeting.

Another graphical display of another example User profile with a Key Network Insight is illustrated in FIG. 23 to show visual icons including: 2301 (system/name or logo), 2302 (settings), 2303 (user picture), 2304 (user name), 2305 (user profile), 2306 (member since/history), 2307 (current network insight), 2308 (all network insights with swipe for more), 2309 (You—view), 2310 (network—view), and 2311 (Meetings—view). The screenshot illustrated here with visual icon 2307 shows user scores, ratings, or like relative to people in one type of reference group (e.g., people they most often meet with). Visual icon 2308 allows the user to find additional network insights relative to other user reference groups. This is a key feature of the present invention.

Figure 24:
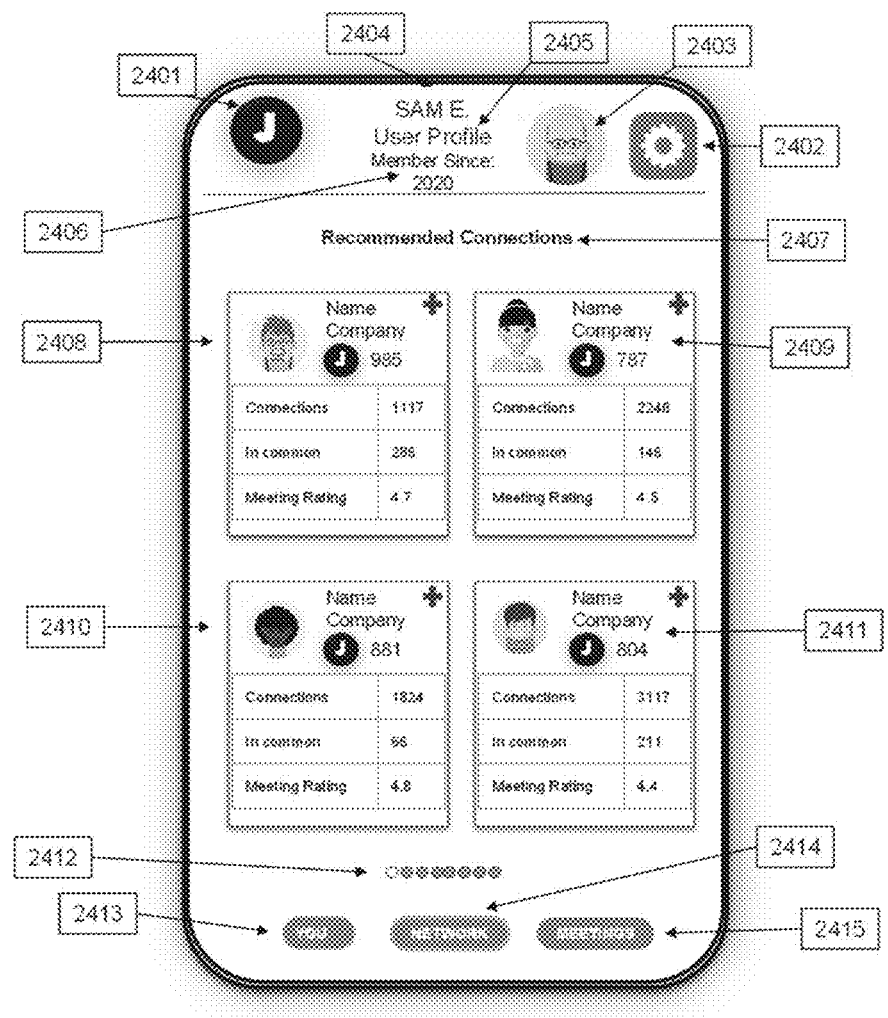
FIG. 24 is an example graphical illustration of a graphical user interface (display) of an example user profile showing information and recommended connections who are not in the user network.

Another graphical display of another example User profile with information about recommended connection is illustrated in FIG. 24 to show visual icons including: 2401 (system/name or logo), 2402 (settings), 2403 (user icon), 2404 (user name), 2405 (user profile), 2406 (member since/history), 2407 (recommendation reason), 2408 (recommended connection with key information about recommended connection), 2409 (recommended connection with key information about recommended connection), 2410 (recommended connection with key information about recommended connection), 2411 (recommended connection with key information about recommended connection); 2412 (swipe for more recommended connections), 2413 (You—view), 2414 (network—view), 2415 (meetings—view). The icon 2407 is a recommendations engine, which operates by artificial intelligence and systems analytics. The reason for recommended connections are varied and may be based on a query made by a user or based on an analysis of the meetings the user has attended or the user's own performance as one example. The screenshot illustrated here with visualizations 2407, 2408, 2409, 2410, 2411, 2412 show a list of custom recommended connects for the user based on artificial intelligence/system analytics. Such custom list may be sorted and prioritized based on various criteria and need and may be segmented according to reference group (e.g., same company, same industry, score, roles). Segmentation may be performed automatically by the system or as a result of user query. This feature is a key feature of the present invention.

Figure 25:
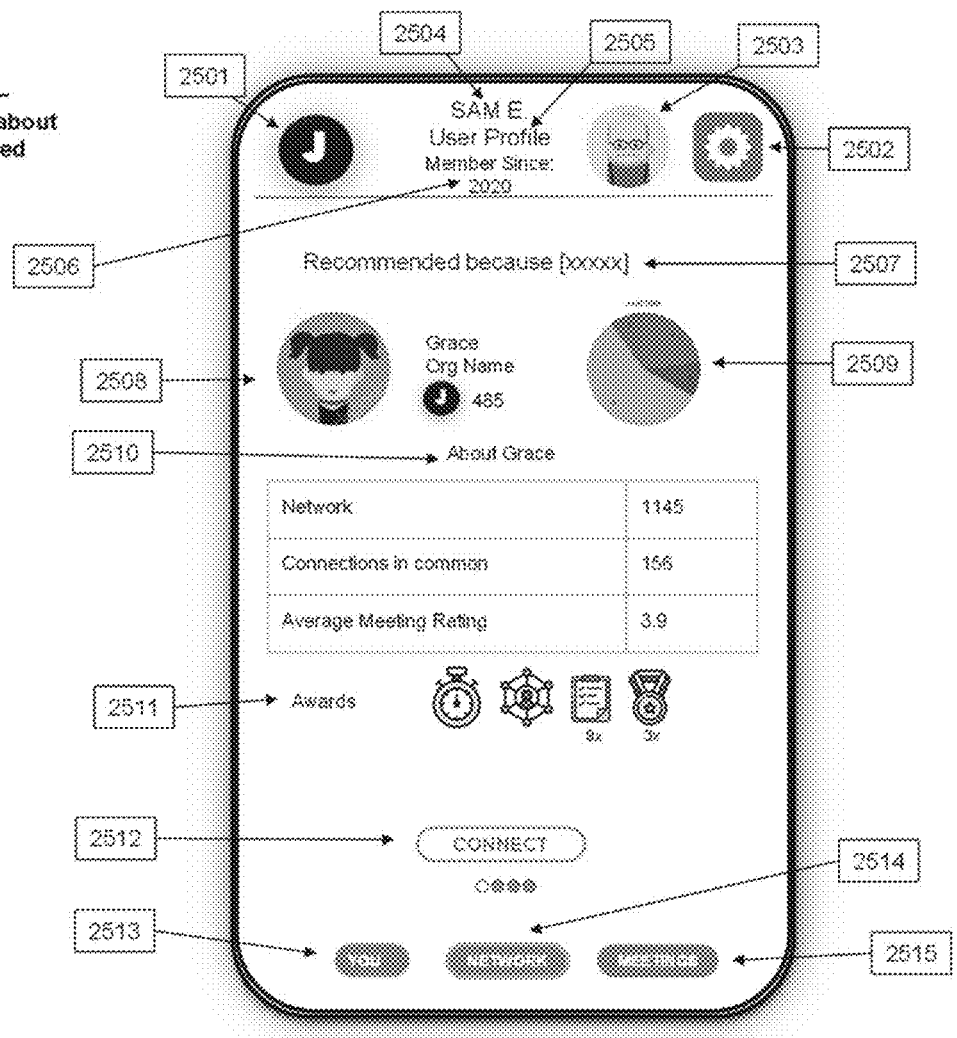
FIG. 25 is an example graphical illustration of a graphical user interface (display) of an example user profile showing information about recommended connections (whether or not they are in user network with this image illustrating someone who is not already in the user network). This display results from a click through on one of the persons who was recommended in FIG. 24. Recommendations or recommended connections are generated by observing and analyzing user behavior during meetings or events or considering the scores that reflect this type of analysis and generating predictive behavior patterns by analyses of past behavior in meetings or events that may be identified by classifying them (e.g., type of meeting such as accounting, HR etc.). In some instances, recommendations are proposed based on who the other participants are.

Another graphical display of another example User profile with recommended connection is illustrated in FIG. 25 to show visual icons including: 2501 (system/name or logo), 2502 (settings), 2503 (user picture), 2504 (user name), 2505 (user profile), 2506 (member since/history), 2507 (recommendation reason), 2508 (recommended connection—name, image, score or ranking), 2509 (pie chart visualization of their roles and/or score), 2510 (about recommended connection), 2511 (Awards); 2512 (connect), 2513 (You—view), 2514 (network—view), 2515 (meetings—view). The screenshot illustrated here with visualizations 2507, 2508, 2509, 2510, 2511, shows information about the recommended connection that is the basis for the recommendation and is based on artificial intelligence/system analytics derived from actual user performance over time and in multiple modalities and meeting types. This feature is a key feature of the present system.

Figure 26:
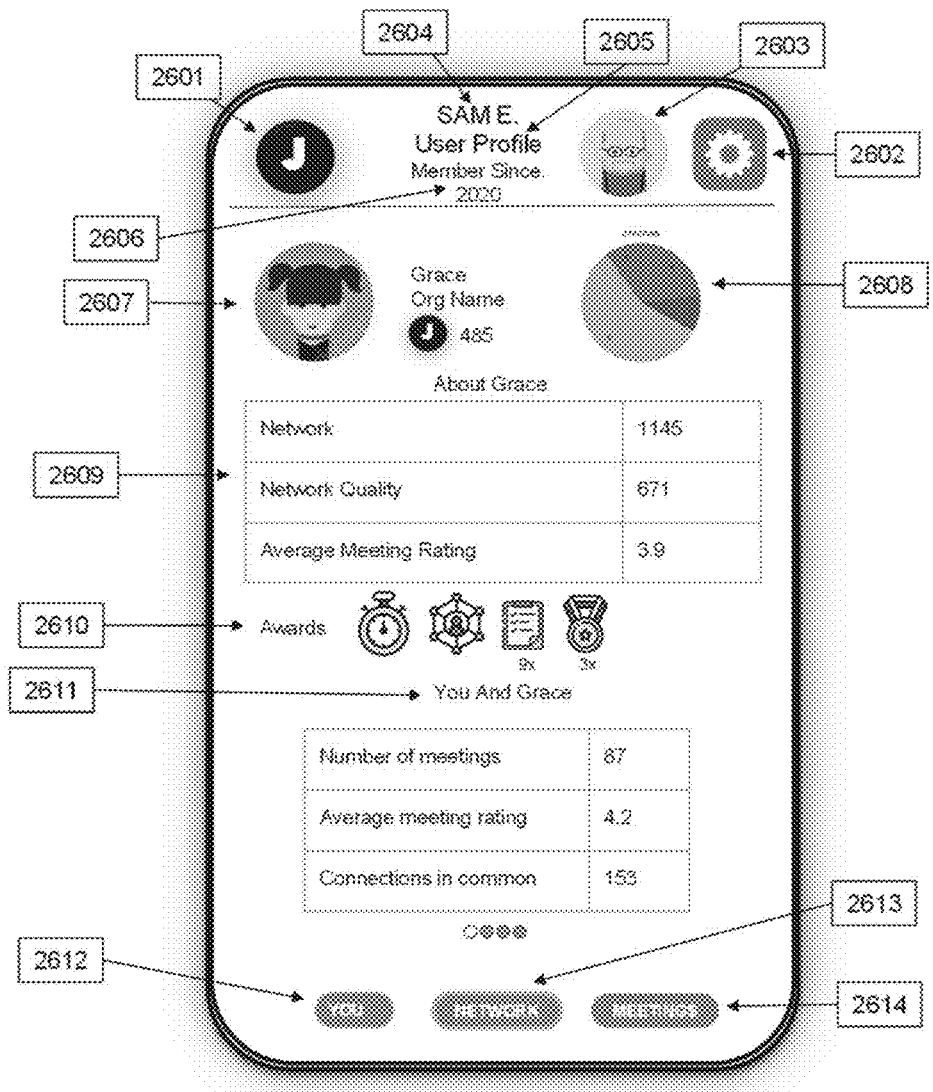
FIG. 26 is the graphical illustration of a graphical user interface (display) showing an example user information of another user (second user) in a user network and her/his relationship with the first user.

Another graphical display of another example User profile with recommended connection information and relationship to You is illustrated in FIG. 26 to show visual icons including: 2601 (system/name or logo), 2602 (settings), 2603 (user picture), 2604 (user name), 2605 (user profile), 2606 (member since/history), 2607 (user picture—name, image, score or ranking), 2608 (pie chart visualization of their roles and/or score), 2609 (about recommended connection—select information), 2610 (awards), 2611 (user and recommended connection comparison against select information with swipe for more comparisons based on additional select information), 2612 (You—view); 2613 (network—view), 2614 (meetings—view). The screenshot illustrated here with visualization 2611 shows a comparison of user with recommended connection against select criteria (e.g., connections in common, meetings in common, role ranking) all derived from actual user performance over time and generated by artificial intelligence/system analytics. This feature is a key feature of the present system.

Figure 27:
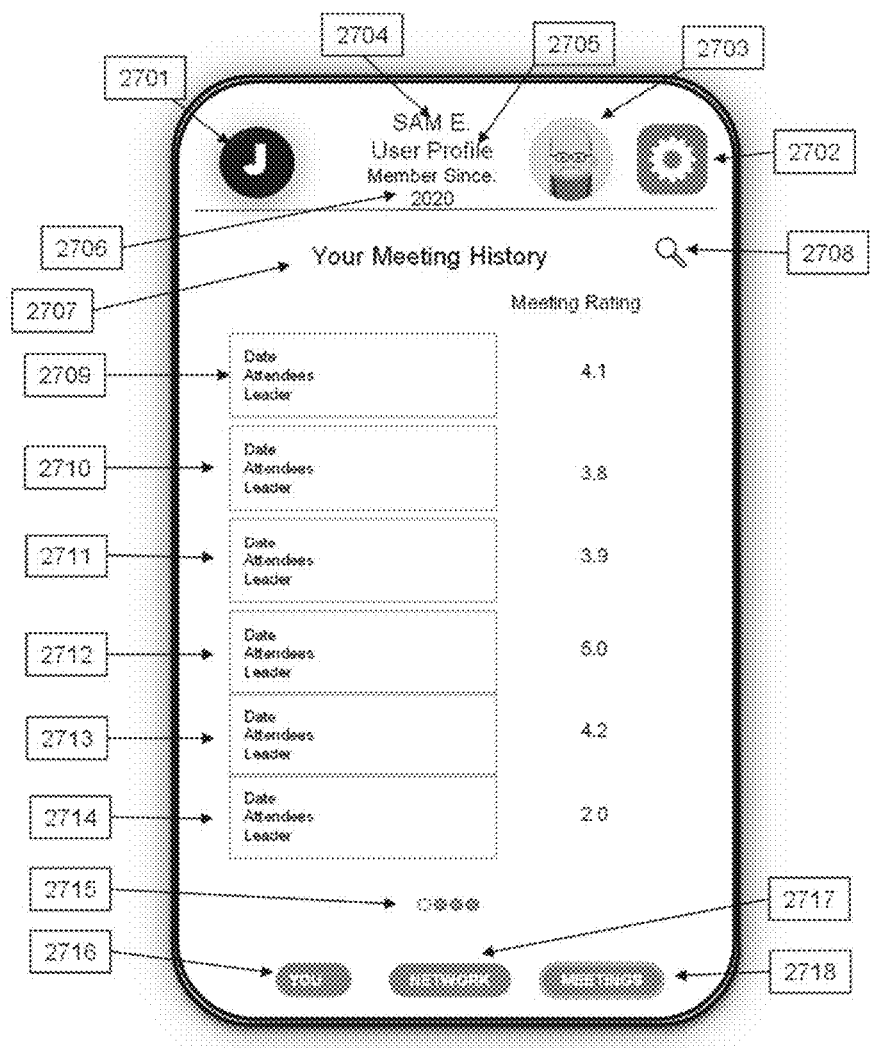
FIG. 27 is the graphical illustration of an example graphical user interface (display) illustrating an example user profile with a user meeting history.

Another graphical display of another example User profile with your meeting history is illustrated in FIG. 27 to show visual icons including: 2701 (system/name or logo), 2702 (settings), 2703 (user picture), 2704 (user name), 2705 (user profile), 2706 (member since/history), 2707 (meeting history), 2708 (search meeting history), 2709-2714 (individual meetings with meeting rating), 2715 (more meeting history with additional relevant meeting information), 2716 (You—view); 2717 (network—view), 2718 (meetings—view).

It should be recognized that the system and method illustrated in the figures operates in a computing environment including a plurality of user/client computing devices (tablet, phone etc.) and the system 2300 is capable of executing different application types for platforms that the user/client computing devices are accessing. The system architecture may use one or more backup servers; one or more cloud services; one or more web services, communicatively coupled to execute the functions described. A network that couples the various platforms may include an Ethernet, Token Ring, Firewire, USB, Fiber Channel or other network type. The multiple different client/user computing devices may connect via the network over multiple sessions. An initial log-in display may be used and data may be synchronized with the cloud services as required. Each user/client's data may be stored in one or more backup servers, or synchronized with one or more web services or stored locally on user/client device, as required. Data may be encrypted on a per-client basis and encryption of data on the user/client device may be implemented using login credentials (a "passcode") as a portion of the encryption key. Any automated processes in the pre-meeting phase—for example, an encryption key that encrypts a client's data may be derived from the client's passcode.

A Backup server comprising a computing system may store each client's data in an encrypted form. Cloud services may include cloud-based services such as Apple iCloud®, Google Docs, a cloud storage service, or other service to which client device can synchronize data between the client device and cloud storage service.

Web services may include email, social networks, on-line classrooms, document storage services, such as Dropbox®, and other web-based services. Internal components of user/client device may include storages, operating system including kernel (connecting system hardware to application software), and user-space processes. Internal components of client device can communicate via inter-process communication, messaging, shared memory, sockets, or other communication channels. Storages can include RAM, ROM, flash memory, a hard disk, a solid-state disk, CD-ROM, DVD-ROM, rewriteable media, or other storage medium.

User information storage may include a library of user identification information such as users/clients that have accessed, or are permitted to access, the client device contains the user information storage. User information storage may further include information about each user, (type of user, a picture of the user, a name, identification number, and other user-related information).

System storage may include a system cache that can be persisted across users and reboots of the user-space, a "keybag" for a user that is currently logged in on the user/client device, synchronization manifests, a display screen image that is to be displayed during transition from a login interface as a system user to user home page interface when the user is logged in. The keybag can comprise a data structure that contains access keys for a user, wherein each access key provides access to one of: a user local storage, a backup server, one or more cloud services, or one or more web services etc.

When a user logs in using user/client device, login credentials may be authenticated and the one or more access keys may be generated from the login credentials. Login credentials may be stored locally or in cloud storage. Login credentials may be authenticated at the backup server, cloud services, or web service. The keybag of the current user may be stored in a system cache in system storage. The system cache may persist across reboots of user-space during a power sequence.

System storage may also include a synchronization manifest for each of one or more users. In some instances, at the application layer in the overall architecture, a synchronization manifest for a user may include a list of synchronization tasks to be performed on behalf of a first user, while the user/client device is being used by another user. A synchronization manifest may contain a synchronization task data structure for each item of data to be synchronized. A synchronization task may include a handle to a data structure to access the data to be synchronized, a handle to the application that generated the data to be synchronized, a "keybag" or pointer to a "keybag," that contains an access key to that enables access for that user to the service (e.g. backup server, cloud service, or web service) for each synchronization task, check-pointing information that indicates progress and current state of the synchronization task, scheduling information for scheduling the synchronization task with respect to other synchronization tasks in the synchronization manifest, and other information that facilitates completion of the synchronization task. There can be a synchronization manifest for each of users in system storage at a time. Synchronization manifests can be queued and scheduled according to scheduling logic, such as shortest task first, first-in-first-out, largest task first, data related to examinations first, and the like.

System storage can further include a system cache that stores information that can be persisted across users and user-space reboots, such as keybags, synchronization manifests, a login screen to be displayed during a user-space reboot, or a logout screen that is displayed while logout processes are being completed and user-space is being rebooted.

User storage may include data storage, such as one or more containers, in which each may store their respective meeting session data. In some embodiments, each user's data may be encrypted. In some embodiments, encryption may be based at least in part on a key generated at least in part using the user's passcode or other user credentials.

It should be recognized that user-space processes may include a launch daemon ("LD"). Launch daemon is an early boot task that can launch other daemons such as a user manager daemon, a user session manager or synchronization daemon. User-space processes may further include background processes and other processes within user-space. Other processes may include user applications and, client/user interface, and login interface. Launch daemon may launch user manager daemon ("UMD") as an early boot task. Functionality of user manager daemon may be exposed via user manager framework. Communications flow between the overall architecture framework and the application programming interface ("API").

User manager daemon may access user information data stored to retrieve the identification of a user of a user/client device. The user/client information may be passed to, e.g., login interface or user interface to display user identification information while the client device logs in a user or logs out a user. User manager daemon may act as an arbiter, or traffic manager, that facilitates log in and log out of users. User manager daemon may launch, or cause to be launched, user session manager ("USM"). User manager daemon can determine whether the computing device is performing a boot (e.g., a hard power on boot or device restart) and determine that the client device should boot as the system user, to the login screen.

User session manager may present an appropriate user-specific user interface for display to each user or participant. For example, during a boot or reboot to a login screen, the USM may launch a login interface to obtain login credentials from a user. During a logout process, USM may present a logout message on the user interface that is specific to a particular user. In one instance, user interface displays a status of a logout process while a logout and user-space reboot are underway. User-space processes, such as USM, user applications, login user interface, and user interface may register with UMD to receive a notification that a "User Switch Request" has been made. A user switch request indicates that user-space processes are to begin saving application state, generating synchronization tasks for storage in a synchronization manifest, and begin shutting down. Each user-space process may notify UMD when the process is about to be shut down by sending UMD, a "Ready to Switch Users" notification. Shutting down an application may include determining application data that needs to be synchronized to, e.g., a cloud service and storing a synchronization task record in a synchronization manifest in system storage for retrieval after reboot of user-space to another user.

It should be recognized that background processes in the application layer of the overall architecture may include daemons, e.g., cloud daemon, cloud docs daemon, and web work daemon. Daemons can spawn processes, e.g., sync cloud storage, synch cloud docs, and synch web work, that perform work on behalf of a particular user. The synchronization manifest may contain one or more references to data to be backed up or synchronized to one or more backup servers, cloud services, or web services on behalf of the particular user. The work can be performed by the applicable daemon generating a process on behalf of the user specified in the synchronization manifest. Daemons and processes may each register with UMD to receive a "Switch User Requested" notification. A switch user request may be generated by UMD in response to UMD receiving a "User Logout Request". A User Logout Request may be generated in response to a user initiating a log out process, by a user pressing a power on reset button, or by kernel initiating a system shutdown, such as due to the system running out of resources. A Switch User request can also be generated in response to a system-wide user logout command issued by a third-party administrator, e.g., at the end of a session.

In operating some example embodiments of the system, the following example phases are illustrated:

Pre-Meeting (Phase I)

1. Meeting Leader decides she wants to call a meeting (the "Meeting") and she wants to use the system and method of the present invention (referred to as "System" herein; note "System" is used to refer to the system and method or at least one of the system and the method).
   a. Uses Outlook or other Calendar program for the invitations. Or she could use the invite function that's part of her meeting hosting service (the "Meeting Invite").
   b. Invites a predefined number (e.g., four) colleagues (the "Invitees").
   c. Invites System (either using m or her System unique email address (i.e., name@getSystem.com)
   d. For the purposes of this disclosure in this document, the meeting hosting service is any currently used by a known hosting service).
2. When System receives the invitation, it:
   a. "collects" or "retrieves" from the invitation information including:
      i. List of Invitees (email addresses)
      ii. Scheduled start time
      iii. Scheduled end time
      iv. Zoom or meeting hosting service log in information
      v. Agenda or any other information about the meeting (likely free form)
      vi. Anything else that's included in the Meeting Invite
   b. "puts" or "inserts" or "creates" the Meeting on the calendar (the "Calendar Meeting Reservation"). In other words, System maintains a calendar (the "System Calendar") for its email addresses (general and for System User Unique emails)
3. Immediately (or as soon as possible but before the meeting), System runs or executes the System and method referred to here as the "Reconciliation Process" (see Section M below for fuller description)
   The System Reconciliation Process will be checking for, among other things:
   a. Whether there is an existing System-Meeting Record associated with the day and time and Meeting Leader. System-Meeting Records are created by the System during the Pre-Meeting phase.
      i. If not, System creates a System-Meeting Record for that Meeting.
      ii. If it does, then it updates that System-Meeting Record with any new or changed information
   b. Whether the Invitees (based on the email addresses) are already in the System and have a System Profile.
      i. If they do, then their System Profile is updated for the Meeting.
      ii. If not, then System attempts to match it with an existing System Profile that uses another email address.
         1. If not matched, then a new System Profile is created
         2. If matched, then an update is executed to the associated System Profile
      iii. System uses machine learning and algorithms, by which the system and method gather more data over time to figure out and identify System Users—to get stronger performance
4. If the Meeting Invitation is updated before the Meeting.
   a. Updates to the time and date of the meeting, or new Zoom information, or notes in the Meeting Invite itself.
      In this case, all Invitees will receive the updated Meeting Invite and System will capture those updates and update the associated System-Meeting Record for that Meeting. System will learn this information in its role as an Invitee to the Meeting.
   b. New Invitees receive the Meeting Invite.
      The System Calendar is automatically updated with any New Invitee. System will follow the same process for each New Invitee as it did for the original ones.
   c. RSVPs.
      The System Calendar is updated automatically for each RSVP—yes, no, maybe. System will collect the RSVP information from the System Calendar and update the appropriate System-Meeting Record.
5. System-Meeting Survey is initiated.
   Before the Meeting is held, System sets up the System-Meeting Survey for the Meeting pre-populating it with the relevant information from the Meeting Invite and associated System Calendar (such as name of the Invitees and day and time of the Meeting, plus any other information that the System-Meeting Survey needs that comes from those data sources.

This process is likely run or re-run right before the Meeting is held so it includes the most up-to-date information.

System-Meeting Survey use survey software (either third-party software such as Survey Monkey or a custom survey created for the System).

End of Pre-Meeting Status
  Meeting Leader/Organizer
  Meeting Invite: sent
  Invitees: basis for System Profiles
  System Data Records:
    System-Meeting Record: created and updated
    System Calendar: created and updated
    System-Meeting Survey: initiated
      The System-Meeting Survey has two parts. The system may recommend custom survey questions for individual meeting leaders that are case specific to them and address their needs or desires. These recommendations are generated by using artificial intelligence algorithms and machine learning that are used to identify the areas of interest based on which queries are generated. The artificial intelligence and machine learning may consider historical data, real-time data, or a combination of both. The artificial intelligence and machine learning algorithms are configured to derive historical and real-time data from visual perception, speech recognition, decision-making and translation between languages.
      Part 1: A set of predetermined (e.g., 3) questions that are always asked. At the end of which, the Participant (System-Meeting Survey Respondent) hits "submit". When they do, Part 2 comes up and they are asked if they are willing to answer an additional question
      Part 2: NPS-like questions on the Participants that are used for building the reputation and status that assess and measure and develop the soft skills of Participants and to assist in the creation of insights and recommendation generated by AI and machine learning and System-algorithms.
    System Profile: created or edited/updated
      Unconfirmed System Profile
      Confirmed System Profile
    System Reconciliation Process: run or execute multiple times
  Individual System Software Connections (not to imply that they handshake with each other independent of System)
    Invite and Calendar Software
    Meeting Hosting Service Software
    Survey Software The Meeting (Phase II)
  6. Grace and other Attendees "enter" the "Meeting Room." A "Meeting Room" is a virtual or physical space in which a meeting takes place. A virtual meeting is created by a location set by the meeting hosting service via a dial-in or web location that is provided in an invitation. It should be recognized that a virtual space is one that has the essence or effect of a space created by technology, but not the appearance or form of an actual physical space.
    a. Each Attendee (including Grace) enters the Meeting Room either using their unique participant ID (provided by the Meeting Hosting Service) ("Participant ID") or without it.
      If Attendee doesn't use their Participant ID, their phone number is used as ID for System's purposes (i.e., for use in the System Reconciliation Process that takes place after the Meeting).
      System doesn't care if Attendees must wait for the "host" to join, or not. Either way the videotelephony platform or audio service, for example Zoom, is configured to capture the entry time that each participant attempts to enter the virtual meeting room and System captures this information and updates the System-Meeting Record with it. The meeting starts when one or more of the participants decide to start it. In some instances, a meeting may start by a host or leader joining, which establishes the bridge for all others to join. In other instances, a meeting may start when a certain number of attendees are detected. In some instances, a meeting may start only upon all the attendees being present. This system works with any type of meeting set up. This system informs the participants if they are joining in time to encourage them to be timely. There may be an initial period set for "introductory chat" separate and apart from the actual meeting, which provides a grace period for all participants to show up. This feature provides a flexibility to the system. Information captured on timing is reflected in the meeting ratings derived from the surveys. All information is cross-related after it is passively captured and provided to improve the participant experience. The meeting experience is not a one-size fits all.
    b. During the Meeting, the Meeting Hosting Service collects the following information (sometimes referred to as the "Meeting Hosting Service Information" or the "Zoom Information":
      i. The arrival time for each participant/attendee
      ii. The exit time for each participant/attendee
      iii. List of all Participants/Attendees based on participant ID or phone number (irrespective of whether or not they are a Meeting Invitee).
      iv. How many minutes (talk time) each participant/attendee (by participant ID or phone number) talks
      v. If any participant IDs or phone numbers had two or more voices associated with it.
      vi. Transcript or audio file of the meeting, if available, or request creating at the outset
      vii. Any chat or text communication within the meeting hosting service that is sent to all Participants/attendees, if available End of The Meeting Status
  No System Data Record updates
  All Meeting Hosting Service Information is gathered
I. After Meeting—System-Meeting Survey Prep
  7. Zoom and System connect.
  System receives Meeting Hosting Service Information.
  8. System Reconciliation Process.
  System reconciles the Meeting Hosting Service Information with existing System Information as contained in the System-Meeting Record.
  For example, the Meeting's Participants vs. Invitees. This is used to decide, for example, who to include in the System-Meeting Survey itself (i.e., so they can be included in "voting" on contributions) and who receives the System-Meeting Survey (the "System-Meeting Survey Distribution List").

The System Reconciliation Process results in:
  a. Updates to:
    i. System-Meeting Record
    ii. System-Meeting Survey
    iii. System Profiles
  b. Initiation of the System-Meeting Report Pre-populates with everything that comes from Meeting Invite and Zoom. Awaiting System-Meeting Survey information.
  c. Segmentation of Invitees and Participants as follows:
    i. Invitees
      1. Attended ("Attendees")
      2. Didn't Attend ("Invitees")
    ii. Participants/Attendees
      1. Invited
      2. Not Invited
  d. Creation of the System-Meeting Survey Distribution List
  e. System-Meeting Survey is ready for distribution via:
    i. HTML5 in an email or text OR
    ii. Downloadable app End of After Meeting Status
  System Data Records:
    System-Meeting Record: updated
    System-Meeting Survey: updated
    System User Profile: created (for Participants who were not Invitees) and/or edited/updated
      Unconfirmed System Profile
      Confirmed System Profile
    System Reconciliation Process: run multiple times
    System-Meeting Survey Distribution List: created
    System-Meeting Report: created using System-Meeting Report template readying it for information that comes from Zoom Information and System-Meeting Survey responses.
  Individual System Software Connections
    (does not imply that they handshake with each other independent of System)
    Invite and Calendar Software
    Meeting Hosting Service
    Survey Software System-Meeting Survey—Part 1: 3 standard questions
  Question 1 is focused on satisfaction with the meeting and Question 3 is focused on the effectiveness of the Meeting
  Question 2 is focused on Meeting Participants
Part 2: Additional Questions
  After submitting the System-Meeting Survey, Part 2 comes up and they are asked if they mind answering up to four (4) additional questions.
  System-Meeting Survey Respondents can either (1) answer the questions, or a subset of them, (2) skip, or (3) quit. Regardless, the answers to Part 1 are captured and considered "enough" for the purposes of System-Meeting Survey validity.

System-Meeting Survey is Live
  9. System Meeting Survey is sent to System-Meeting Distribution List
    a. The System-Meeting Survey is circulated either:
      i. As meeting attendees exit the meeting; or
      ii. Within a given time after meeting ends (such as, 15 minutes)

The Meeting End Time is set as follows:
      Virtual Meeting: When they exit the Zoom Meeting Room (Note: for a virtual meeting there are additional data points provided by artificial intelligence and machine learning to compare the efficacy of in-person versus virtual meetings.)
      In-Person Meeting: At the scheduled end time for the meeting according to the Meeting Invite
    Options:
    Participants/Attendees that weren't on the invitation and therefore not in the pre-populated System-Meeting Survey may be added. One approach offers a manual step for the Meeting Leader to add names.
    Only actual participants are sent surveys. This is true even if they received an invitation but did not attend.
    System updates the System-Meeting Survey for the Participants/Attendees and for the distribution list.
    b. System-Meeting Survey is sent via:
      i. HTML5 in a text message or in an email, or
      ii. As in a downloadable app
      iii. May also be sent via third-party software such as Slack or Microsoft Teams or Zoom
    Options:
      It may be sent all the different ways. The users may be allowed to decide which method they prefer. Think of it as a notification, which typically are configured by users.
      One possibility is System has a minimal default (e.g., email or SMS depending on what information on the Invitee and Participants that the System knows). The Systems then make notification configuration part of the Reconciled System Profile process. And when a System User adds a service such as Slack, System will want to know this and ask if they want to update their notification settings.
    c. The System-Meeting Survey is "live" for a predetermine length of time, for example, [four (4) hours] after the meeting ends. This predetermined length of time may change over time or based on feedback from users received through the system.
    d. System requires at least two completed System-Meeting Surveys for the results to be considered valid for circulation in a System-Meeting Report or for "points" toward System-Score and other System Badges.
    e. While the System-Meeting Survey is live, System keeps track of System-Meeting Survey responses.
      All potential System-Meeting Survey Respondents who have not returned the System-Meeting Survey within [three (3)] hours of receipt of the System-Meeting Survey will receive a [one]-time reminder to complete and submit it.
      There may be additional reminders if System has not received at least two submitted System-Meeting Surveys for the Meeting. Such additional reminders may have different wording to encourage completion. For example, reminding them that they will miss out on earning System "benefits" such as System Badges if they don't return the System-Meeting Survey. This will be part of an overall System Communications Strategy. The System Communications Strategy will be informed by the artificial intelligence algorithms and machine learning based on historical information of the meeting participants and meeting information.
    f. The System-Meeting Survey "closes" (responses/submissions no longer accepted) four (4) hours after the meeting ends, as determined by the Meeting Invite.
        Upon closing of the System-Meeting Survey, System may communicate that the System-Meeting Survey is closed.
    End of System-Meeting Survey is Live Status
    System Data Records:
        System-Meeting Record: updated
        System-Meeting Survey: completed
        System Profile: created (for Participants who were not Invitees) and/or edited/updated
            Unconfirmed System Profile
            Confirmed System Profile
        System Reconciliation Process: run multiple times
    Software Handshakes
        Survey Software
Data Analysis
    10. System Reconciliation Process
        a. In preparation for Data Analysis and reporting, System collects and reconciles data from the following sources:
            i. Meeting Invite and Calendar
            ii. Meeting Hosting Service Information
            iii. System-Meeting Survey
            iv. Publicly available information
    11. System conducts pre-determined analysis that measures among other things:
        a. User Meeting Performance Information within the Meeting (a single Meeting)—this refers to analysis of information gathered from a meeting that is used gauge performance. The information gathered includes data gathered from a variety of sources before, during, and after the meeting.
        b. User Meeting Performance Information across multiple meetings Such analysis is based on the information gained from the sources identified in Step 10 above. It uses its proprietary algorithms and machine learning.

In addition, System may "run" ad hoc analysis as needed. In some instances, the System provides options for users to set up their own processes for performing ad hoc or standard analyses. The System operates its own standard processes, for example, to determine what is in the reports in the figures, but that is only a subset of what is possible. Each meeting leader, organization or user may have other factors that they want analyzed and reported on. As one example, the system may correlate Q1 (question 1) with arrival time or Participation balance with arrival time. The organization/user may want to determine a set of other factors, all of which are contemplated by the System, which may be configured and programmed to provide any type of desired information. The system incorporates a framework for machine learning to provide desired information. Machine learning is accomplished by sequential processes accomplished by an assembly of processors and computing machines. The initial process is "data collection." At this stage, the system defines the problem and assembles a data set. The quantity and quality of the data set collected is essential and serves in constructing an accurate model. Representation of data may be by a table or some other appropriate form of database, which is used for training decisioning criteria. The next process is "data preparation" for training the decisioning criteria. This process includes removing duplicates, correcting errors, dealing with missing values, normalization, data type conversions etc. This data preparation step may be automatic requiring no human intervention or may involve human decision making. In some instances, it may be best to randomize data, which eliminates the effects of the particular order in which data was collected and/or prepared. In some instances, this process may require visualizing data to help detect relevant relationships between variables or class imbalances or performing exploratory analysis. This process may also require training and splitting the data prepared into training and evaluation sets. The next process is "choosing a model" to construct different algorithms for different tasks. Each machine learning algorithm builds a mathematical model based on sample data. At this stage, it is essential to designate a suitable model for each task. These models can be used to categorize participants based on how the data distributes when applied to the models. The next process is "training the model," which is used to determine which factors may be more important than others. Each iteration in this process is a training step. The next process involves "evaluating the model," which includes choosing a measure of success and deciding on an evaluation protocol. The next process is "parameter tuning," which involves scaling up or developing a model to represent the best effort. The next process is enabling the system to make predictions or provide answers.

12. The results of the analysis yield User Performance Measurements.
    a. within the Meeting (a single Meeting)
    b. across multiple meetings
    as well as
    a. within a team
    b. within a project
    c. within a company
    d. across companies
    e. across projects
    f. other segmentations as appropriate Such results are shown in a variety of ways (collectively referred to as "Badges") including:
    Overall Meeting Score (for example, J-Score)
    Badges associated with individual Participant performance
    Leader Boards or Best Seller Lists
    System Badges are cryptographic tokens that are blockchain enabled and are linked to performance in the System.
    System Badges are visible both within the System (i.e., in System-Meeting Reports and System User Profiles) and externally (such as on resumes, LinkedIn, etc.) The ability to make a System Badge visible is based on a permission system. For example, only Reconciled System Profiles show System Badges on third-party sites. The permission system will vary over time.

System Reports
    13. Data analysis:
        a. The System-Meeting Record is updated
        b. System Profiles are updated.
        c. The System-Meeting Report is finalized.
    14. System-Meeting Report is circulated.
        Report includes link to recipients' System Profile—if they are a confirmed System User.
        If not, then they are encouraged to register (confirm) their System Profile.
            a. Sample Draft (unfinished) System-Meeting Report Note:
Bar on the left is to show arrival times of Attendees (Zoom Information)
Center is about participation (Calendar plus Zoom Information)
Right side is about System-Meeting Survey response rate
Meeting Rating is from System-Meeting Survey responses.

System Reconciliation Process

The System Reconciliation Process (the "SRP") is focused on scrubbing the data to ensure its accuracy. A primary focus is on figuring out the "identity" of the System User and building an accurate profile for users that takes into account multiple data sources (i.e., builds from a variety of inputs). This process also builds an accurate profile for the meeting itself and/or a series of recurring meetings. It automatically attributes meetings to the right organization, project etc.

SRP employs machine learning to help it "scrub" the data. For example, data that are close mis-spellings of each other are identified. Addresses that are slight variations of each are identified.

1. First-Time System User:

Check to see if any Participants are first-time System users. If so, include information on System so they understand the context.

The unique identifier for each System Profile is configured to be any one or more of a plurality of identifiers (such as phone number or email address or LinkedIn profile or User Name) keeping in mind that the unique identifier must be able to travel across entities (such as projects, employers, clients, organizations). For example, non-profit organizations may use unique identifiers to improve their own meetings and also to aid in the selection of new board members.

System checks these possible identifiers (examples) to learn if a Participant is a first-time System user:
Participant Phone Number: checks System Records to see if that phone number was used before in a System Meeting
Participant Email Address: checks System Records to see if that email address was used before in a System Meeting (this would come from a Meeting Invite)
LinkedIn profile:
System User Name:
If System finds that there is more than one email address associated with a single Participant (as evidenced by the other two identifiers being correlated, then System will add that factor to the System Profile for that Participant.
In some embodiments, there may be a requirement to set a default starting identifier. Not all services require this. In some embodiments, System may set one that is a proxy for User Name and part of the Reconciled System Profile process, which allows the user to pick a new name should it be available.

A System Profile is created for everyone who either "calls" a System Meeting or is an Invitee to or Participant in a System Meeting. (see definitions below for System Meeting).

There are two types of System Profiles:
1. Unconfirmed System Profile
A profile associated with possible identifiers (such as email addresses in a Meeting Invite) that has not been pro-actively confirmed by the person (Invitee, Participant, Attendee). Information accumulated by System related to a System User All System-related information is updated in the Unconfirmed System Profile waiting to become a Confirmed System Profile. People with Unconfirmed System Profile will not have the same "rights" as those with Confirmed System Profiles.
2. Confirmed System Profile
All the same as Unconfirmed System Profile plus the person associated with it has confirmed or otherwise edited the information. Confirmed System Profiles have rights that Unconfirmed System Profiles do not. For example, the ability to appear on "Best Seller Lists," or to earn System Badges that can travel outside the System-Meeting Report or share their reputation publically.
System through the System Reconciliation Process will figure out if Invitee has experienced System before. For example, System might cross reference based on the phone number used with the Meeting Hosting Service or infer based on who else has had meetings with that email address.
In some cases, there is a simple process where if the email address isn't recognized, System asks if you've been part of System before—not the same as having an official Confirmed System Profile or account. If yes, then goes through a consolidation/reconciliation process driven by the information provided by the person. If no, then goes to an email asking if they'd like to. A suitable script is used. This prompting may be initiated at different times. For example, upon receiving the Meeting Invite, after the System-Meeting Survey is sent, or timed around the System-Meeting Survey.
In some embodiments, System Users who don't have a Confirmed System Profile may be notified that a profile was created for them. This may make a conversion from Unconfirmed to Confirmed possible and practical.
Another option may be to provide a feature to Unsubscribe in the System.
i. Possible Software connections/integrations with existing systems:
Meeting/Calendar Software: Outlook, Google, other (such as iCal) or from Meeting Hosting Service directly such as Zoom
Meeting Hosting Service: Zoom, Skype, and other like platforms (existing or may be created)
Survey Software: Survey Monkey, Google Forms, Medallia, and other like survey software (existing or may be created)
ii. Glossary—Explanation of Terms Used in this Disclosure:
Meeting Leader: Person who "calls" the meeting. Likely also the person who decides who to invite and "runs" the meeting.
Meeting Invite: The invitation that people receive that tells them among other things, the time and date of the Meetings, its location (in the case of virtual meetings, the Meeting Hosting Service "dial-in" instructions), and the names of the Invitees. The Meeting Invite may be initiated from a meeting system calendar system, meeting hosting service.
Calendar Meeting Reservation: The reservation held on the System Calendar based on the Meeting Invite.
System Meeting: Any meeting that uses a System-Meeting Survey. Also referred to as the "Meeting".

Invitee: Person who receives an invitation to the Meeting in advance of that meeting.

Attendee: An Invitee who attends the Meeting.

Participant: A Person who goes to the Meeting. This person might be an Invitee and someone who attends the Meeting but did not receive the Meeting Invite.

System-Meeting Survey: The after-meeting survey that is sent to all Meeting Participants. It has a standard format that covers both meeting effectiveness and an NLP score for the Meeting itself and the Participants. It is a method for rating the Meeting and the Participants that is accurate and based on actual performance. The System-Meeting Survey is simple and easy to complete designed to take under five minutes to complete. They are constructed to be short, easy to use and useful after any occurrence to obtain scores that enhance reputation.

System-Meeting Surveys have several rules associated with them:
  Only Participants may complete them
  At least two completed System-Meeting Surveys from Participants other than the Meeting Leader are required for the results to be used publically.
  The System-Meeting Survey is live for four hours after the Meeting ends.

System-Meeting Survey Respondent: A Participant who submits or returns the System-Meeting Survey with at least one question answered.

System-Meeting Record: The data unit that collects and holds all information related to an individual Meeting. The System-Meeting Record is not visible to users, but various data in it are presented to users in different ways and at different times, e.g. Survey, Report, and Profile.

The System-Meeting Record (and associated reports, profiles, etc.) is persistent in the System database, and not deleted after the System-Meeting Report is sent and the System Profiles updated.

System-Meeting Report: The official report on an individual Meeting. Uses information from:
  Meeting Invite
  Meeting Calendar
  Meeting Hosting Service Information
  System-Meeting Survey and analyzes it to report results as well as insights and recommendations on how the Meeting could be better and/or how a Participant could better contribute and perform in the Meeting.

The System-Meeting Report also includes any available and relevant trend information. For example, related to,
  recurring meetings
  team performance
  individual performance
  meeting leader performance
  industry The analysis may be related to results within the overall System or within a company or project. In other words, there are various reference points for analysis and comparison purposes.

System User: A person who is invited to (Invitee) and/or is a Participant in a System Meeting. In other words, a person who is either receives a Meeting Invite or goes to the Meeting without having received a Meeting Invite.

System Profile: The aggregation of all information related to an individual System User. Aggregation includes meetings with different companies, consulting projects, teams. It is individual-centered, not company-centered. Designed to provide insight for that person that they can share publicly and also used for personal development. More valuable or at least complementary to their LinkedIn profile.

There are two types of System Profiles:
1. Confirmed System Profile: All the same as Unconfirmed System Profile plus the person associated with it has confirmed or otherwise edited the information. Confirmed System Profiles have rights that Unconfirmed System Profiles do not. For example, the ability to appear on "Best Seller Lists," or to earn System Badges that can travel outside the System-Meeting Report. A System Account gives privileges to the owner such as the ability to share publicly their System Badges and Reputation.
2. Unconfirmed System Profile: A profile associated with possible identifiers (such as email addresses in a Meeting Invite) that has not been pro-actively confirmed by the person (Invitee, Participant, Attendee). Information accumulated by System related to a System User. All System-related information is updated in the Unconfirmed System Profile waiting to become a Confirmed System Profile. People with Unconfirmed System Profile will not have the same "rights" as those with Confirmed System Profiles.

System Account:
  Paid
  Free
  Trial

System-Meeting Survey Distribution List: The list of Participants for the Meeting. Only Meeting Participants are qualified to receive and submit a System-Meeting Survey.

System Badges: System Badges are cryptographic tokens that are block-chain enabled and are linked to performance in the System. System Badges are visible both within the System (i.e., in System-Meeting Reports and System User Profiles) and externally (such as on resumes, LinkedIn, etc.) The ability to make a System Badge visible is based on a permission system. For example, only Reconciled System Profiles show System Badges on third-party sites. The permission system will vary over time.

Meeting Room: The location (virtual) that the Meeting Hosting Service creates where the Meeting is held. Maybe audio only or video and audio.

Participant ID: The unique number that the Meeting Hosting Service gives each Invitee to use when they enter the Meeting Room.

Meeting Hosting Service Information: The software service provider for audio and/or video conferencing. Examples include Zoom, Webex, Skype, Facetime.

System Calendar

Meeting Invitee Meeting Invite View—See all participants who received Meeting Invite and their RSVP status.

OR copy invitation within Zoom and then go to your Calendar and copy and paste the info below from Zoom.

System Network User UX

1. Overview

The System network screens on a user profile answer two primary questions for the user:

How do I compare to my peers and to the whole System universe?

What actions should I take to improve my standing/reputation in ways that matter to me?

The system is configured to facilitate permitting individuals to improve their behavior and performance in meetings—and help others do likewise—through a set of social nudges. Meetings are by definition social events. Because most meetings consist of people who know each other and meet together more than once, social dynamics are at least as likely to influence behavior change as individual learning.

Thus, the Network section of the User Profile is not just a social graph directory listing but an active component of System's functionality to improve individual performance in the context of workplace meetings.

2. Major UX Elements

To accomplish this, the System Network screens in the User Profile contains the following principal elements:

Size and quality of network at a glance
  Include definition of the network
  Include metrics of quality
Various rankings:
  You:network (various views)
  Network:global (various views)
  You:global (or a "You" profile listing)
An editable/searchable finder within your network and a way to contact individuals
A recommendation system
  Add new people to your network
  Suggest people already in your network whom you might want to engage more with
  Insights and recommendations on how to improve meeting performance (as a meeting leader and/or attendee) that is based on the AI and machine learning algorithms against data from prior meetings.
A "poke" system to nudge users to take a specific type of action 3. Network Definition The user's network is a social graph of all individuals who have a) formally participated in a System supported meeting and have some sort of account/registration status and b) have been added by the user whether or not they have participated in meetings together.

In some instances, the system determines the roles of 2nd and 3rd degree connections and the average path length (connectedness) between network members in display and quality measurement.

4. Metrics of Network Quality

As one approach, the system simply uses the average of all network member's System score. It's easy for users to understand, as well.

For example, a user with a network of 1000 users whose average System Score is 750 could be said to have a "superior" network than a similar user with the same sized network whose average is 600.

We recognize that using only the System score average is not a robust metric for network quality as it could be. For example, we will probably want to incorporate network size, connectedness and growth trends into overall consideration. This is just a starting point, so after v1 we will develop normalize the network quality metric with additional data.

5. Number of Networks Per User

In some instances, the system may determine that it is valuable to allow a user to be part of multiple networks, including self-defined networks, although these might often just be views not necessarily of networks so much as cohorts whose connections to each other are arbitrary. However, these additional networks will always be a subset of the user's overall network. Views of cohorts are not required to be a subset of the user's network and, in fact, might be useful for generating recommendations of people to add to the user's network.

An example of a "valid" extra network might be: a sub-network specifically of all individuals in my network working on a very large project. (nb: probably need a stronger, larger example).

An example of a view that is more a listings directory might be a J-Score based list of "all System members who are software development project managers anywhere, who are like me." Useful, but not a network.

Version 1.0 of System provides one main network for each user, but is architected to allow enhancements for additional networks and views.

If a user is able to customize networks, they are able to define and save those configurations.

6. Presentation of Network Views

The System creates a carefully curated list of views of the user's network, usually as a way to measure the user's own metrics against the relevant network metrics. This list is created with the user-centered goals of:

Driving user engagement with System
Driving user self-improvement
Driving user network expansion, including viral acquisition On the one hand, it seems intuitive that a user wants to have ratings that are better than the network average. For example, users will generally want to aspire for their J-Score to be higher than their network's average J-Score. On the other hand, and paying heed to the Groucho Marx adage of "not wanting to be a member of a club that would have me as a member" The system may well discover that users also want to challenge themselves by being in networks that require improvement on their part that is recognized by the network.

7. Rankings

The key design feature determines a minimally viable set of rankings that achieve the goals of the Network element and present them to the user in a compelling way. A few points to consider:

Rankings take two forms: leaderboards and comparisons. Leaderboards are fun but perhaps less directly meaningful. Comparisons (user vs network, user vs global, network vs global) combined with trends is easy to grasp for the user.

In some embodiments, there are three different rankings that are easily available to a user at any moment, regardless of what they are. Anything more is probably overload but possible.

In some embodiments of the present invention, there are additional rankings available in some sort of a repository or "library," but per the point about variation below, some rankings may get pulled from the library and highlighted based on certain conditions.

The rankings are intuitively clear.

The rankings are meaningful and imply that action should be taken on the part of the user.

There is enough variation in the presentation to prevent boredom. For example, there might be a relatively complicated and lower priority ranking that compares the user to their network with regard to the interaction between J-Score and % of a user's profile that is a Contributor. Normally this stays in the library, but if the user were to receive a badge that recognized some progress on Contribution, the system might choose to highlight. In one embodiment, there are top 3-5 rankings that would matter to people.

Mobile displays of rankings might be different than web displays.

In one embodiment, there is no drill-down capability (something that might be difficult to do on mobile, anyway) that allows a user to click/touch specific elements of the ranking and get more detail.

For any rankings the user requests or are set as a default, and that require more data than is available, the system displays a message that more data is needed, and specifies what's needed.

Candidate rankings in one embodiment include:

J-Score over time: user vs network

J-Score over time: user vs global

J-Score quartiles snapshot: network vs global

J-Score/meeting rating: user vs network
- This comparison may be difficult to display because the numeric scales of each metric are so different.
- While this is interesting, in some instances it may be necessary to determine if it actually displays meaningful information. In other words, what does it say if you have a low J-Score but are in highly-rated meetings, or a high J-Score but are in relatively low-rated meetings. Does this metric drive important actions?

Avg J-Score of people who rank you vs Avg J-Score of people who rank others who have your J-Score.
- One version shows this over time
- One version is a snapshot % of survey responses in your meetings (overall)
- Over time
- Snapshot Leader metric: % of survey responses in your led meetings
- Over time
- Snapshot Leader metric: J-Score over time: You as leader vs your meeting ratings Leader metric: Leader J-Score:meeting rating ratio your ratio compared to:
- Avg leader J-score:meeting rating in meetings where you're not a leader Fundamentals:
- Avg on-time of your meetings vs network
  - Snapshot
  - Trend
- Avg on-time of your meetings vs global
  - Snapshot
  - Trend
- Leader: avg on-time of your led meetings vs network
  - Snapshot
  - Trend
- Leader: avg on-time of your led meetings vs global
  - Snapshot
  - Trend
- Avg attendance rate of your meetings vs network
  - Snapshot
  - Trend
- Avg attendance rate of your meetings vs global
  - Snapshot
  - Trend
- Leader: avg attendance rate of your led meetings vs network
  - Snapshot
  - Trend
- Leader: avg attendance rate of your led meetings vs global
  - Snapshot
  - Trend There are also non-(or less) competitive rankings that may be included, as these can suggest useful actions the user could take.

The five people you meet the most with

The five people you give feedback to most often (for privacy reasons we will not show the five people who give you the most feedback, or anything similar).

The qualities people see the most in you

NOTE: Any of these rankings may be placed from time to time on the "YOU" tab's main screen to highlight them for the user.

8. Leader Boards

Leader boards are rankings that show information not necessarily connected to the user's own network. They are typically rankings of organizations, which is useful for career development. Examples of leader boards include:

Best organizations for meeting quality (normalization of all meeting ratings with average meeting participant J-Score).

Best organization for giving/getting feedback (normalization of meeting ratings to survey response rate)

Organizations with the best System networks (normalization of organization size, % of System users, network size, network quality, average System score, meeting ratings.)

9. Finder

In the Network section of the user profile, the Finder is a searchable, filterable, scrollable listing of everyone in your network.

Users can:

Display the overall Finder in different ways, such as:
- By J-Score ranking
- By number of meetings together
- By length of connection on the network
- By most connections in common
- By meeting rating Highlight useful, fun and interesting facts about aspects of your network, such as:

View any user's profile
- The profile view from the Finder is different than the user's view of their own profile. It is designed to be more compact, but in particular should contain information that describes the salient connection-related information, such as:
  - How many meetings you've been in together
  - The avg rating of meetings you've been in
  - How you have supported each other, which would be comprised of anonymized data about survey responses that indicates the strength of the connection, not the specifics.
- Optimally, be able to send a message from the profile page to another user Add new members to the network
- Respond to system recommendation (see below)
- Respond to another user's request to join your network
- Initiate an invitation to another individual
  - Invitee does not need to be an existing System member Export finder to .cvs, etc.
Question: the system wants to import from Contacts, be allowed?
   If so, System may recognize non-System members in the imported file and automatically send invites and/or create a "non-registered" account?
Web and mobile interfaces may be configured differently due to available screen real-estate.

10. Recommendations

As noted in Section 8, System may make recommendations to the user about individuals not currently in-network who might be valuable additions to the user's network. System will establish various triggers for making recommendations. Typically, these recommendations are 2nd degree connections to existing members of the user's network, but no matter what the recommendation is, includes an analysis of the overall social graph to optimize the user's network expansion (e.g., recommending highly connected users) and its perceived value to the user.

The value to the user might include the following elements:
  Career networking
  Individuals who might be models for self-improvement
  The prestige associated with a large network
    Triggers might include:
  2nd degree connections who have some threshold number of meetings in common with your highest J-Score network members
  2nd degree connections who work at companies relevant to the user who are on a leader board.

Recommendations are delivered primarily via e-mail, but active recommendations not yet responded to will have their own screen.

System may provide insights on performance (e.g., insights into why the score was what it was) and recommendations on how to improve performance (as a meeting leader, invitee, attendee).

11. Updating Network Views

The system updates and displays changes to network data in real-time. In some instances, it is acceptable to update at less-than-real-time rates, so long as the date of last update is displayed to the user on the network screens. These views may update no faster than the time it takes between a user's meeting to occur and when a meeting report for that meeting is generated, which could be an hour or more.

Functional Flow Diagrams

Step 1 (Phase I): Pre-Meeting
(a) Meeting Leader/Organizer creates a Meeting Invitation to the Meeting. They use their calendar system (such as, Outlook, Google, iCal) or Meeting Hosting Service ("MHS") (such as, Zoom) to set up the meeting. The Meeting Invite includes the names/email address of all Invitees, Time, Day of Meeting and MHS dial-in information. The Meeting Leader makes sure to invite either meetings@getSystem.com or ML@getSystem.com (their unique System email address). NOTE: A Reconciled System User is not required to use their System Email Address, they may use the generic one. System will sync behind the scenes during the System Reconciliation Process.
(b) The receipt by Meetings@getSystem.com or ML@getsystem.com of the Meeting Invite triggers the creation of (1) a Calendar Meeting Reservation in System and (2) a unique System-Meeting Record for the Meeting. At various points in the life cycle of an individual meeting, the System-Meeting Record is updated. If no actual meeting happens, then the System-Meeting Record
(c) See System Reconciliation Process. The reconciliation varies depending on which email address is "invited" to the meeting—the ML@getSystem.com or meetings@getSystem.com. In addition, the System Reconciliation Process will do a check to see if that just received meeting invitation is for (1) an actual new meeting or (2) an update to an existing meeting.
(d) Invitees RSVP. Their responses are captured in the Calendar Meeting Reservation and sent to the System-Meeting Record. (RSVP is one of the data fields). There is a loop that captures RSVPs until the time of the meeting. This is handled by the System's internal Calendar Meeting Reservation.
(e) System automatically runs its System Reconciliation Process as it gets new information.

Step 2 (Phase II): Meeting
(a) Meeting Leader or another Participant opens or starts the Meeting. In other words, the anyone can "open" the meeting—assumes that the setting is enable join before host and here is no waiting room. Ideally, the Participants enter using their MHS Participant ID but they don't have to.
(b) During the Meeting, MHS is collecting information such as Participant ID, phone numbers, audio recording, Participant arrival and departure time, amount of time each Participant speaks etc.
(c) The MHS ends when the "ends meeting for all" is pressed, or when the MHS otherwise ends it.
(d) Behind the scenes activities—Readies information from the Meeting for next step, System collecting the MHS-Information.
(e) The System Reconciliation Process is about data scrubbing. System receives MHS-Information then reconciles before putting into (updateing) the System-Meeting Record. For example, System matches phone numbers, MHS Participant IDs, emails, etc. to make sure duplicate System-Meeting Surveys don't go out. Also to make sure that the right System Profiles and System Accounts are updated. This is part of the preparation for sending out a Mo-Meeting Survey.
(f) Immediate update of System-Meeting Record with information such as Participants and all MHS-Information.
(g) Creates System Survey and Distribution List based on the information contained in the System-Meeting Record—the initial information from the Meeting Invite and then updated with the MHS-Information Step 3 (Phase III): System-Meeting Survey
(a) System-Meeting Survey is sent to Meeting Participants (not to all Invitees). The System-Meeting Survey is sent either (1) immediately after the Meetings ends or at 15 minutes.
(b) Data scrubbing: Prior to the System-Meeting Record being updated for System-Meeting Survey Responses, System performs a System Reconciliation Process to insure that there aren't duplicate responses, that the response is associated with the correct System Profile and System Account, etc.
(c) If no response, check to see if the System-Meeting Survey is still live. Need to decide how long it is open/live after close of the Meeting. In any case, not more than [4] hours.
(d) Have we already sent [1] reminder? If so, then not OK to send reminder.

(e) Keep sending reminders until the System-Meeting Survey is closed. Need to decide how often this loop should happen. Likely not more than twice after the initial send of the System-Meeting Survey.
(f) System-Meeting Survey is done, no longer live for that Meeting.
(g) See other Steps for more information. Final updates to the System-Meeting Record.

What is claimed is:

1. A real-time virtual live event computerized system, comprising: a processor;
   a memory storing executable code, the executable code causing the processor to create an online virtual live event meeting session among a plurality of participants accessing the online live event meeting session via a plurality of participant electronic devices, by performing functions defining routing of an invitation to the plurality of participants to enter the live event session with their presence to meet in the real-time live event, wherein the live event session is one of a plurality of sequential live event sessions created and occurring over time; and
   determine the user identity for each participant from an associated database to verify if the participant is of record in the database, the database comprising a list of participant user identities and user identity credentials for each participant in the database is dynamically and continuously updated in a user data packet, wherein a reconciliation action is performed by an inference engine configured to infer existence of a single user identity when the single user identity participates as multiple participants in a session from difference devices and wherein the reconciliation action comprises initiating processes to scour all data to determine one or more links among a plurality of accounts opened over time, confirm the links, merge the plurality of accounts, and conclude with a reconciled participant;
   a real-time event-session controller receiving the invitation and configured to track a plurality of online live events occurring in at least five phases of the live event session, the real-time event-session controller executing a sentiment-recognition engine during the live event session that recognizes sentiment expression data by context or objectives relating to the participants active in the live event session, the sentiment expression data compiled over the plurality of sequential live event sessions and used to indicate sentiment evolution of the participants;
   a phase synchronizer to execute the five phases relating to the live event session in sequence, comprising:
       a first pre-event phase, in which the invitation is routed to the plurality of participants;
       a second event session initiation phase, during which the real-time event-session controller starts and closes the live event session;
       a third post-event session phase, during which event data is analyzed;
       a fourth event-session reporting phase, during which scoring and predictive engines execute and deliver post-event data relating to the live event session; and
       a fifth feedback-phase during which a query survey is sent to the participants to solicit data on event satisfaction.

2. The real-time event system according to claim 1, further comprising:
   a login interface configured to automatically facilitate login for said plurality of participants by:
       identifying a first list of participants in a messaging system;
       checking user identity for each participant in a database to determine if each user identity is of record in the database;
       if the user identity is of record, automatically locating user identity credentials for each user identity and an associated event, in the event there is no record found, tagging the user identity as a provisional new user identity and assigning new user identity credentials to the provisional new user identity;
       performing at least one of resolution and reconciliation actions with other information found for the provisional new user identity to determine a status for the provisional new user identity, wherein the other information includes at least one of a real name, IP address and a telephone number; and
       if the status for the provisional new user identity determines no prior record of user identity credentials, adding the user identity as a new user identity with the new user identity credentials to the database.

3. The real-time event system according to claim 2, wherein a resolution action is performed by a collision-resolution engine to ensure that each user identity in the list of user identities stored in the database has unique identity credentials.

4. The real-time event system according to claim 3, wherein the user data packet is accessible across platforms and includes data indicative of participant soft skill scores, wherein the user data packet for a particular participant further comprises an insight packet representative of aggregated participant skills, wherein each skill is determined by comparison of a participant activity to a skill index, and further wherein the real-time event system determines a connection score by comparison of the insight packet to a scoring index, which connection score is usable by a recommendation engine.

5. A real-time virtual live event computerized system, comprising:
   a processor;
   a memory storing executable code, the executable code causing the processor to;
   create an online virtual live event meeting session among a plurality of participants accessing the online live event meeting session via a plurality of participant electronic devices, by performing functions defining routing of an invitation to the plurality of participants to enter the live event session with their presence to meet in the real-time live event, wherein the live event session is one of a plurality of sequential live event sessions created and occurring over time; and
   determine user identity for each participant from an associated database to verify if the participant is of record in the database, the database comprising a list of participant user identities and user identity credentials for each participant in the database is dynamically and continuously updated in a user data packet, wherein the user data packet is accessible across platforms and includes data indicative of participant soft skill scores, wherein the user data packet for a particular participant further comprises an insight packet representative of aggregated participant skills, wherein each skill is determined by comparison of a participant activity to a skill index, and further wherein the real-time virtual live event computerized system determines a connection score by comparison of the insight packet to a scoring index, which connection score is usable by a recommendation engine and a resolution action is performed by a collision-resolution engine to ensure that each user identity in the list of user identities stored in the database has unique identity credentials;

a real-time event-session controller receiving the invitation and configured to track a plurality of online live events occurring in at least five phases of the live event session, the real-time event-session controller executing a sentiment-recognition engine during the live event session that recognizes sentiment expression data by context or objectives relating to the participants active in the live event session, the sentiment expression data compiled over the plurality of sequential live event sessions and used to indicate sentiment evolution of the participants;

a phase synchronizer to execute the five phases relating to the live event session in sequence, comprising:
 a first pre-event phase, in which the invitation is routed to the plurality of participants;
 a second event session initiation phase, during which the real-time event-session controller starts and closes the live event session;
 a third post-event session phase, during which event data is analyzed;
 a fourth event-session reporting phase, during which scoring and predictive engines execute and deliver post-event data relating to the live event session; and
 a fifth feedback-phase during which a query survey is sent to the participants to solicit data on event satisfaction; and a login interface configured to automatically facilitate login for said plurality of participants by:
 identifying a first list of participants in a messaging system;
 checking user identity for each participant in a database to determine if each user identity is of record in the database;
 if the user identity is of record, automatically locating user identity credentials for each user identity and an associated event, in the event there is no record found, tagging the user identity as a provisional new user identity and assigning new user identity credentials to the provisional new user identity;
 performing at least one of resolution and reconciliation actions with other information found for the provisional new user identity to determine a status for the provisional new user identity, wherein the other information includes at least one of a real name, IP address and a telephone number; and
 if the status for the provisional new user identity determines no prior record of user identity credentials, adding the user identity as a new user identity with the new user identity credentials to the database.

6. The real-time event system according to claim 1, further comprising:
 identifying a plurality of user identity credentials for a user identity across a plurality of different messaging systems including email, text and telephone.

7. The real-time event system according to claim 1, wherein all information for each user identity in the list is collected and stored in a user identity information database, which is used by the prediction engine to make recommendations for each participant.

8. The real-time event system according to claim 1, wherein if a status for a provisional new user identity determines a prior record of user identity credentials, resolving the user identity credentials and updating a record for an existing user identity.

9. The real-time event system according to claim 5, wherein a notification is sent to the user identity of a reconciled participant when the user identity credentials are approved.

10. The real-time event system according to claim 1, wherein the query survey provides an insight that informs the participants of a correlation between completing the query survey and how participants are rated by their colleagues, the insight updating participant profiles usable for post-event analytics.

11. A method, comprising:
 providing a real-time virtual meeting live event sequence that dynamically tracks data across a plurality of virtual meeting live events, by a processor and a memory with executable code, the executable code causing the processor to:
  create a virtual meeting live event session among a plurality of participants by performing functions for routing an invitation to the plurality of participants to enter the virtual meeting live event session with their presence to meet in the virtual meeting live event session, wherein the virtual meeting live event session is one of a plurality of sequential live event sessions created over time;
  control the plurality of virtual meeting live events by tracking the plurality of virtual meeting live events as they occur, in a plurality of distinct phases including at least five phases of each virtual meeting live event session; and
  synchronize execution of the plurality of distinct phases relating to the live event session in sequence by a session controller that receives the invitation and responsive to the invitation, executes a sentiment-recognition engine during the live event session that recognizes sentiment expression data by context or objectives relating to the participants active in the virtual meeting live event session, further comprising:
   performing a reconciliation action by an inference engine configured to infer existence of a single user identity when the single user identity participates as multiple participants in a session from difference devices and wherein the reconciliation action comprises initiating processes to scour all data to determine one or more links among a plurality of accounts opened over time, confirm the links, merge the plurality of accounts, and conclude with a reconciled participant;
   performing functions defining transmission of the invitation in a first pre-event phase to the plurality of participants requesting their presence in the virtual meeting live event session;
   executing control of the event sessions in a second event session initiation phase by starting and closing each virtual meeting live event session;
   analyzing event data in a third post-event session phase, including the sentiment expression data relating to participants compiled over the plurality of sequential live event sessions to indicate sentiment evolution of the participants;
   executing scoring and predictive engines in a fourth event-session reporting phase to process and deliver post-event data relating to each virtual meeting live event session; and providing a query survey to the participants to solicit data on event satisfaction in each virtual meeting live event session.

12. The method of claim 11, further comprising:
automatically facilitating login for said plurality of participants by:
identifying a first list of participants in a messaging system;
checking user identity for each participant in a database to determine if each user identity is of record in the database;
in response to the user identity being of record, automatically locating user identity credentials for each user identity and an associated event, in the event there is no record found, tagging the user identity as a provisional new user identity and assigning new user identity credentials to the provisional new user identity;
performing at least one of resolution and reconciliation actions with other information found for the provisional new user identity to determine a status for the provisional new user identity, wherein the other information includes at least one of a real name, IP address and a telephone number; and
if the status for the provisional new user identity determines no prior record of user identity credentials, adding the user identity as a new user identity with the new user identity credentials to the database.

13. The method of claim 12, wherein the resolution action is performed by a collision-resolution engine to ensure that each user entity in the list of users in the database has unique identity credentials.

14. The method of claim 13, wherein a user data packet is accessible across platforms and includes data indicative of participant soft skill scores, wherein the user data packet for a particular participant further comprises an insight packet representative of aggregated participant skills, wherein each skill is determined by comparison of a participant activity to a skill index, and further wherein a real-time event system determines a connection score by comparison of the insight packet to a scoring index, which connection score is usable by a recommendation engine.

15. The method of claim 11, wherein the other information includes all of a real name, an IP address and a telephone number.

16. The method of claim 11, further comprising:
identifying a plurality of user identity credentials for a user identity across a plurality of different messaging systems including email, text and telephone.

17. The method of claim 11, wherein all information for each user identity in a list is collected and stored in a user information database, which is used by the prediction engine to make recommendations for each participant.

18. The method of claim 11, wherein if a status for a provisional new user identity determines a prior record of user identity credentials, resolving the user identity credentials and updating a record for an existing user identity.

19. The method of claim 15, wherein a notification is sent to the user identity of the reconciled participant when the user identity credentials are approved.

20. The method of claim 11, wherein the query survey provides an insight to the participants of a correlation between completing the query survey and how participants are rated by their colleagues, the insight updating participant profiles usable for post-event analytics.

* * * * *